US012624897B2

(12) United States Patent
Rousselet et al.

(10) Patent No.: US 12,624,897 B2
(45) Date of Patent: May 12, 2026

(54) TUBULAR MEMBRANE HEAT EXCHANGER

(71) Applicant: Baltimore Aircoil Company, Inc.,
Jessup, MD (US)

(72) Inventors: Yohann Lilian Rousselet, Boston, MA
(US); Kevin Ellsworth Egolf,
Hampstead, MD (US); Ellie M.
Litwack, Columbia, MD (US)

(73) Assignee: Baltimore Aircoil Company, Inc.,
Jessup, MD (US)

( * ) Notice: Subject to any disclaimer, the term of this
patent is extended or adjusted under 35
U.S.C. 154(b) by 1097 days.

(21) Appl. No.: 17/541,741

(22) Filed: Dec. 3, 2021

(65) Prior Publication Data

US 2022/0178619 A1     Jun. 9, 2022

Related U.S. Application Data

(60) Provisional application No. 63/121,063, filed on Dec.
3, 2020.

(51) Int. Cl.
 B01D 53/22     (2006.01)
 B01D 63/06     (2006.01)
     (Continued)

(52) U.S. Cl.
 CPC ......... F28D 7/0066 (2013.01); B01D 63/069
     (2022.08); B01D 69/107 (2022.08);
     (Continued)

(58) Field of Classification Search
 CPC ............... F28D 7/0066; F28D 1/05333; F28D
     21/0015; B01D 63/069; B01D 69/107;
     (Continued)

(56) References Cited

U.S. PATENT DOCUMENTS 1,152,066 A     8/1915   Wolff
2,612,350 A     9/1952   Stadler
     (Continued)

FOREIGN PATENT DOCUMENTS

AU     1248483 A     9/1983
CN     2764471 Y     3/2006
     (Continued)

OTHER PUBLICATIONS

"tubular" 1 page, https://www.thefreedictionary.com/tubular, American Heritage® Dictionary of the English Language, Fifth Edition. 2016 by Houghton Mifflin Harcourt Publishing Company. Published by Houghton Mifflin Harcourt Publishing Company. All rights reserved. (Year: 2016).*
     (Continued)

*Primary Examiner* — Anthony Shumate
(74) *Attorney, Agent, or Firm* — Fitch, Even, Tabin &
Flannery LLP

(57)     ABSTRACT

In accordance with one aspect of the present disclosure, a tubular membrane beat exchanger module is provided that includes an inlet header and an outlet header. The inlet header is configured to connect to an adjacent upstream tubular membrane heat exchanger module and form an upstream wetted compartment therewith. The outlet header is configured to connect to an adjacent downstream tubular membrane heat exchanger module and form a downstream wetted compartment therewith. The tubular membrane heat exchanger module further includes tubular membranes connecting the inlet header and the outlet header. The tubular membranes facilitate flow of process fluid from the upstream wetted compartment to the downstream wetted compartment. Further, the tubular membranes permit mass transfer between the process fluid in the tubular membranes and a fluid contacting outer surfaces of the tubular membranes.

17 Claims, 44 Drawing Sheets

(51) Int. Cl.

| | |
|---|---|
| *B01D 69/10* | (2006.01) |
| *F28D 1/053* | (2006.01) |
| *F28D 7/00* | (2006.01) |
| *F28D 21/00* | (2006.01) |
| F28F 9/16 | (2006.01) |

(52) U.S. Cl.
CPC ....... B01D 69/108 (2022.08); F28D 1/05333 (2013.01); F28D 21/0015 (2013.01); *B01D 2313/131* (2022.08); *F28F 9/167* (2013.01)

(58) Field of Classification Search
CPC .. B01D 69/108; B01D 2313/131; F28F 9/167
See application file for complete search history.

(56) References Cited

U.S. PATENT DOCUMENTS

| | | | |
|---|---|---|---|
| 3,398,091 A | 8/1968 | Greatorex | |
| 3,447,492 A | 6/1969 | Kreimann | |
| 3,480,147 A | 11/1969 | Kanyok | |
| 3,494,470 A | 2/1970 | Banfield | |
| 3,697,635 A | 10/1972 | Dietzsch | |
| 3,707,234 A | 12/1972 | Salemi | |
| 3,856,475 A | 12/1974 | Marx | |
| 3,926,813 A | 12/1975 | De Putter | |
| 4,117,884 A | 10/1978 | Frei | |
| 4,286,653 A | 9/1981 | Edwards | |
| 4,295,522 A | 10/1981 | Frei | |
| 4,321,911 A | 3/1982 | Offutt | |
| 4,461,707 A | 7/1984 | Thayer | |
| 4,657,743 A | 4/1987 | Kanno | |
| 4,802,982 A | 2/1989 | Lien | |
| 4,897,359 A | 1/1990 | Oakley | |
| 4,902,419 A | 2/1990 | Shibata | |
| 5,058,661 A | 10/1991 | Oshiyama | |
| 5,104,535 A | 4/1992 | Cote | |
| 5,119,552 A | 6/1992 | Sutou | |
| 5,154,832 A | 10/1992 | Yamamura | |
| 5,191,771 A | 3/1993 | Meckler | |
| 5,192,478 A | 3/1993 | Caskey | |
| 5,355,944 A | 10/1994 | Potier | |
| 5,401,406 A | 3/1995 | Johnson | |
| 5,467,818 A | 11/1995 | Buckley, Jr. | |
| 5,468,574 A * | 11/1995 | Ehrenberg | H01M 8/1067 521/27 |
| 5,528,905 A | 6/1996 | Scarlatti | |
| 5,540,278 A | 7/1996 | Chiba | |
| 5,595,690 A | 1/1997 | Filburn | |
| 5,647,227 A | 7/1997 | Lokhandwala | |
| 5,846,450 A | 12/1998 | Atkinson | |
| 6,038,768 A | 3/2000 | Rhodes | |
| 6,110,616 A * | 8/2000 | Sheikh-Ali | C08C 19/20 429/189 |
| 6,126,819 A | 10/2000 | Heine | |
| 6,142,219 A | 11/2000 | Korenic | |
| 6,383,391 B1 * | 5/2002 | Ehrenberg | B01D 71/281 210/640 |
| 6,413,294 B1 * | 7/2002 | Spencer | F42B 12/74 75/248 |
| 6,413,298 B1 * | 7/2002 | Wnek | H01M 8/1023 95/52 |
| 6,487,768 B2 | 12/2002 | Rhodes | |
| 6,684,649 B1 | 2/2004 | Thompson | |
| 6,841,601 B2 * | 1/2005 | Serpico | B01D 69/1071 524/413 |
| 7,160,463 B2 | 1/2007 | Beck | |
| 7,179,860 B2 * | 2/2007 | Cao | C08F 8/42 524/413 |
| 7,393,486 B2 | 7/2008 | Szabo | |
| 7,468,281 B2 | 12/2008 | Kallury | |
| 8,470,071 B2 | 6/2013 | Ehrenberg | |
| 9,061,251 B2 | 6/2015 | Hobbs | |
| 9,234,665 B2 | 1/2016 | Erb | |
| 9,389,025 B2 | 7/2016 | Lowenstein | |
| 9,533,261 B2 | 1/2017 | Teo | |
| 9,630,147 B2 | 4/2017 | Collignon | |
| 9,810,439 B2 | 11/2017 | Coutu | |
| 10,302,317 B2 | 5/2019 | Erb | |
| 10,352,628 B2 | 7/2019 | Erb | |
| 10,401,876 B1 | 9/2019 | Coleman | |
| 10,447,106 B2 | 10/2019 | Jang | |
| 10,712,024 B2 | 7/2020 | Lepoudre | |
| 10,928,082 B2 | 2/2021 | Coutu | |
| 11,092,349 B2 | 8/2021 | Lepoudre | |
| 11,143,430 B2 | 10/2021 | Ghadiri Moghaddam | |
| 11,408,681 B2 | 8/2022 | Lepoudre | |
| 11,624,558 B2 | 4/2023 | Egolf | |
| 2002/0162648 A1 | 11/2002 | Crook | |
| 2004/0076871 A1 * | 4/2004 | Gascoyne | H01M 4/9083 429/483 |
| 2008/0000629 A1 | 1/2008 | Viczena | |
| 2008/0152893 A1 | 6/2008 | Stroh | |
| 2010/0170776 A1 | 7/2010 | Ehrenberg | |
| 2011/0062082 A1 * | 3/2011 | Mordukhovich | B01D 63/0822 210/651 |
| 2011/0203311 A1 | 8/2011 | Wright | |
| 2011/0247494 A1 | 10/2011 | Dinnage | |
| 2011/0283720 A1 | 11/2011 | Martin | |
| 2013/0043187 A1 * | 2/2013 | Adams | B01D 63/043 210/321.89 |
| 2013/0157164 A1 | 6/2013 | Yamauchi | |
| 2013/0206658 A1 | 8/2013 | Wu | |
| 2013/0312445 A1 | 11/2013 | Isetti | |
| 2013/0319569 A1 | 12/2013 | Kikuno | |
| 2014/0150656 A1 | 6/2014 | Vandermeulen | |
| 2014/0238253 A1 | 8/2014 | Baptista | |
| 2014/0251810 A1 | 9/2014 | Lepa | |
| 2014/0305789 A1 | 10/2014 | Lowenstein | |
| 2015/0122715 A1 | 5/2015 | Collignon | |
| 2015/0233588 A1 | 8/2015 | Betts | |
| 2015/0233589 A1 | 8/2015 | Betts | |
| 2015/0233651 A1 | 8/2015 | Ueno | |
| 2015/0246314 A1 | 9/2015 | Constantz | |
| 2015/0300757 A1 | 10/2015 | Yang | |
| 2016/0046498 A1 | 2/2016 | Caton | |
| 2016/0341498 A1 | 11/2016 | Lynn | |
| 2019/0346212 A1 | 11/2019 | Erb | |
| 2019/0353358 A1 | 11/2019 | Allen | |
| 2020/0295386 A1 | 9/2020 | Eickhoff | |
| 2020/0353417 A1 | 11/2020 | Bahar | |
| 2020/0386481 A1 | 12/2020 | Egolf | |
| 2021/0060493 A1 | 3/2021 | Bahar | |
| 2021/0276231 A1 | 9/2021 | Sato | |
| 2021/0332993 A1 | 10/2021 | Coutu | |
| 2021/0396422 A1 | 12/2021 | Ghadiri Moghaddam | |
| 2022/0003437 A1 | 1/2022 | Lepoudre | |

FOREIGN PATENT DOCUMENTS

| | | |
|---|---|---|
| CN | 110856795 A | 3/2020 |
| DE | 69303535 T2 | 10/1996 |
| EP | 2208956 A2 | 7/2010 |
| EP | 3060856 B1 | 11/2022 |
| GB | 1151696 A | 5/1969 |
| GB | 1601429 A | 10/1981 |
| JP | S5842591 U | 3/1983 |
| JP | 5864491 A | 4/1983 |
| JP | H05071882 A | 3/1993 |
| JP | 2001027496 A | 1/2001 |
| KR | 101630448 B1 | 6/2016 |
| RU | 2121393 C1 | 11/1998 |
| RU | 180307 U1 | 6/2018 |
| RU | 2711860 C1 | 1/2020 |
| RU | 195987 U1 | 2/2020 |
| WO | 2009094032 A1 | 7/2009 |
| WO | 2011150081 A2 | 12/2011 |
| WO | 2012170887 A2 | 12/2012 |
| WO | 2014029003 A1 | 2/2014 |
| WO | 2024055099 A1 | 3/2024 |

OTHER PUBLICATIONS

(56)                    References Cited

OTHER PUBLICATIONS

"membrane" American Heritage Dictionary of the English Language, Fifth Edition. 2016 p. 1 (Year: 2016).*

Castro-Muñoz, Roberto et al., A new relevant membrane application: CO2 direct air capture (DAC); Chemical Enginerring Journal 446 (2022); https://www.sciencedirect.com/science/article/pii/S1385894722025396; 13 pages.

Carbon Capture: MTR's PolarCap™ process is based on our proven Polaris™ polymeric membrane from Membrane Techology & Research, Inc. website, https://www.mtrinc.com/our-business/carbon-capture/; believed to be publicly available Nov. 2022; 7 pages.

Electriduct ½" Heat Shrinkable Braiding Sleeving 10 ft; from Amazon https://www.amazon.com/Electriduct-Heat-Shrinkable-Braided-Sleeving/dp/B00U7UTODM; believed to be publicly available before Dec. 3, 2020; 11 pages.

Hollow Fiber Membrane Bioreactor (MBR) brochure from GreenPebble Technologies LLP at www.greenpebbletech.com/_files/ugd/e65e09_4f4c86da8e6249dc8f493c87e3185a53.pdf?index=true; believed to be publicly available before Dec. 3, 2020; 9 pages.

Polycoil Heat Exchanger image from http://plasticheatex.com/wp/wp-content/uploads/2015/01/IMG_7162c.jpg; believed to be publicly available before Dec. 3, 2020; 1 page.

U.S. Appl. No. 63/398,456, filed Aug. 16, 2022, entitled Tubular Membrane Heat Exchanger; 89 pages.

International Search Report and Written Opinion from International Application No. PCT/US2021/061760 dated Mar. 30, 2022; 11 pages.

Blue Frontier Ultra-Efficient, Packaged Rooftop HVAC for Commerical Buildings Summary Report from Technology Early Depolyment (TED), https://bluefrontierac.com/wp-content/uploads/2021/04/BlueFrontier-CA-TED-Summary-Report.pdf, Apr. 2021, 8 pages.

Kozubal, Eric et al.; Development and Analysis of Desiccant Enhanced Evaporative Air Conditioner Protype; Technical Report NREL/TP-5500-54755 Apr. 2012; National Renewable Energy Laboratory (NREL) http://ailr.com/files/1813/9966/3295/DEVapNRELApril2012.pdf; 78 pages.

Membrane Heat and Mass Exchanger from AIL Research, Inc. website https://ailr.com/our-technology/membrane-heat-and-mass-exchanger/, accessed May 2, 2023, 7 pages.

Microdyn Nadir Membrane Production: BIO-CEL®, screen captures from YouTube video https://www.youtube.com/watch?v=M94eD94jMk8 posted Jun. 16, 2016; 8 pages.

Modules overview from Alfa Laval Inc. website https://www.alfalaval.us/products/separation/membranes/modules/, accessed May 2, 2023; 7 pages.

Mulay, Veerendra; StatePoint Liquid Cooling system: A new, more efficient way to cool a data center; posted on Jun. 5, 2018 to Data Center Engineering, https://engineering.fb.com/2018/06/05/data-center-engineering/statepoint-liquid-cooling/, 5 pages.

Submerged PTFE Flat Sheet MBR Module overview from Membrane Solutions website https://www.membrane-solutions.com/fs_ptfe_MBR_module.htm, copyright 2022, 6 pages.

U.S. Appl. No. 18/077,561, filed Dec. 8, 2022, entitled Tubular Membrane Mass Exchanger, 125 pages.

U.S. Appl. No. 18/193,425, filed Mar. 30, 2023, entitled Tubular Membrane Heat Exchanger, 30 pages.

U.S. Appl. No. 63/464,445, filed May 5, 2023, entitled Sheet Membrane Apparatus; 36 pages.

3M™ Liqui-Cel™ product overview printed from Internet Archive Wayback Machine https://www.3m.com/3M/en_US/liquicel-us/; publicly available before Jun. 4, 2019; 3 pages.

Abdel-Salam, Mohamed R.H., et al., State-of-the-Art in Liquid-to-Air Membrane Energy Exchangers (LAMEEs): A Comprehensive Review; Renewable and Sustainable Energy Reviews, 2014. 39: p. 700-728.

Ali, Mohamed, et al., Humidification Technique Using New Modified MiniModule Membrane Contactors for Air Cooling. Advances in Mechanical Engineering, 2013. 5: p. 174016.

Article: Haier extends nanotech cooling deal from https://www.coolingpost.com/world-news/haier-extends-nanotech-cooling-deal/; Sep. 9, 2018; 2 pages.

Bakeri, G et al.; A Porous Polyethersulfone Hollow Fiber Membrane in a Gas Humidification Process; RSC Advances, 2015; 5(19): p. 14448-14457.

Bazhenov, Stepan D., et al.; Gas-Liquid Hollow Fiber Membrane Contactors for Different Applications. Fibers, 2018. 6(4): p. 76.

Breakthrough from the National Labs: "Desiccant Enhanced Evaporative Air Conditioning" video from https://www.youtube.com/watch?v=_3TEkCqw-64, posted Apr. 25, 2012; screen captures with transcribed audio, 10 pages.

Charles, Nicholas T., et al.; The Occurrence and Characterization of Fouling During Membrane Evaporative Cooling; Journal of Membrane Science, 2008. 319(1): p. 44-53.

Chen, Dongmei, et al.; An Experimental Study and Model Validation of a Membrane Humidifier for PEM Fuel Cell Humidification Control; Journal of Power Sources, 2008. 180(1): p. 461-467.

Chen, Xiangjie, et al., Experimental Investigations of Polymer Hollow Fibre Integrated Evaporative Cooling System with the Fibre Bundles in a Spindle Shape; Energy and Buildings, 2017. 154: p. 166-174.

Chiari A.; Air Humidification with Membrane Contactors: Experimental and Theoretical Results; International Journal of Ambient Energy, 2000; 21(4): p. 187-195.

Cobetter Filtration Equipment Co., Ltd; Arrayforce™ Membrane Contactor product overview from https://www.cobetterfiltration.com/Industries/General-Industry/Water-Treatment/Condensate-Polishing/products/Arrayforce-Membrane-Contactor.html; publicly available before Jun. 4, 2019; 3 pages.

Cui, Xin, et al., Performance Analysis of a Hollow Fiber Membrane-Based Heat and Mass Exchanger for Evaporative Cooling; Applied Energy, 2020. 271: p. 115238.

Energy-efficient graphene-based membrane cooling systems of Evercloak, Inc .; Canadian government investment in energy innovation from https://www.nrcan.gc.ca/science-and-data/funding-partnerships/funding-opportunities/current-investments/energy-efficient-graphene-based-membrane-cooling-systems/22631; Mar. 19, 2021; 4 pages.

Englart, S., An Experimental Study of the Air Humidification Process Using a Membrane Contactor; E3S Web Conf., 2017. 17: p. 00021.

Finalist Profile of Kraton Corporation, IIT Bombay, Porus Laboratories and Infosys from https://globalcoolingprize.org/kraton-iitbombay-porus-and-infosys/; Nov. 15, 2019; 3 pages.

Hollow Fiber Membrane Manufacturing Systems brochure from MEMS website https://www.membranefilter.co.kr/hfm-system, believed to be publicly available Sep. 2021; 5 pages.

Hollow Fibre Series overview from PCI Membranes website https://www.pcimembranes.com/products/pci-hollow-fibre-series/), believed to be publicly available Sep. 2021; 4 pages.

Invitation to Pay Additional Fees from related International Application No. PCT/US2021/061760 dated Feb. 3, 2022; 2 pages.

Johnson, D.W., et al.; Analysis of Heat and Mass Transfer Phenomena in Hollow Fiber Membranes used for Evaporative Cooling; Journal of Membrane Science, 2003. 227(1): p. 159-171.

Khayet, M., et al.; Modeling and Optimization of Sweeping Gas Membrane Distillation; Desalination, 2012. 287: p. 159-166.

Khayet, M., et al.; Theoretical and Experimental Studies on Desalination Using the Sweeping Gas Membrane Distillation Method; Desalination, 2003. 157(1): p. 297-305.

Khayet, Mohamed, et al.; Nature of Flow on Sweeping Gas Membrane Distillation; Journal of Membrane Science, 2000. 170(2): p. 243-255.

Khayet, Mohamed, et al.; Theory and Experiments on Sweeping Gas Membrane Distillation; Journal of Membrane Science, 2000. 165(2): p. 261-272.

Kraton Corporation: NexarCool™ Technology video from https://www.youtube.com/watch?v=KNISA8mOoOU, posted Jan. 3, 2020; screen captures (no dialogue); 12 pages.

(56)         References Cited

OTHER PUBLICATIONS

Kulaç, Hande; Experimental and Theoretical Aspects of Membrane Based Water Cooling System, in Department of Chemical Engineering; 2017, Middle East Technical University: Ankara, Turkey; 149 pages.

Labban, Omar, et al.; Next-generation HVAC: Prospects for an limitations of desiccant and membrane-based dehumidification and cooling; Applied Energy 200 (2017) 330-346.

Loeb, Sidney; Membrane Evaporative Cooling to 30 Degrees C or Less: 1. Membrane Evaporative Cooling of Contained Water. Ann N Y Acad Sci, 2003. 984: p. 515-27.

Mansourizadeh, A., et al.; Hollow Fiber Gas-Liquid Membrane Contactors for Acid Gas Capture: A Review; Journal of Hazardous Materials, 2009. 171(1): p. 38-53.

Membrane Filtration overview from Koch Separation Solutions website https://www.kochseparation.com/technologies/membrane-filtration/, believed to be publicly available Sep. 2021; 7 pages.

Metz, Sybrandus Jacob; Water Vapor and Gas Transport Through Polymeric Membranes; University of Twente, Enschede, The Netherlands; 2003; 143 pages.

Norteck Air Solutions, LLC; product brochure for StatePoint™ Liquid Cooling Data Center Technology; publicly available before Jun. 4, 2019; 2 pages.

NORTEK™ StatePoint overview from Nortek Air Solutions LLC website https://www.nortekair.com/product/statepoint/, publicly available before Dec. 3, 2020; 3 pages.

Pandey, Ramendra, et al.; Modelling of Water-to-Gas Hollow Fiber Membrane Humidifier; Chemical Engineering Science, 2018. 192: p. 955-971.

Park, Se-Kyu, et al.; Characteristics of Membrane Humidifiers for Polymer Electrolyte Membrane Fuel Cells; Korean Journal of Chemical Engineering, 2005. 22(6): p. 877-881.

PermSelect® Silicone Gas Exchange Membranes; Air/Gas Humidification overview printed from Internet Archive Wayback Machine http://permselect.com/markets/gas%20humidification; publicly available before Jun. 4, 2019; 1 page.

PolyCool Introduction 2018 video from https://www.youtube.com/watch?v=DPULpwa_pfA&feature=emb_logo; published May 28, 2018; 11 pages.

Portacool Jetstream Series product overview from Portacool Evaporative Coolers website https://portacool.com/jetstream-evap-coolers/; publicly available before Dec. 3, 2020; 3 pages.

Products page from PCI Membranes website https://www.pcimembranes.com/products/, believed to be publicly available Sep. 2021; 8 pages.

Qu, Ming, et al., Isothermal Membrane-Based Air Dehumidification: A Comprehensive Review; Renewable and Sustainable Energy Reviews, 2018. 82: p. 4060-4069.

Ramya, K., et al.; Study of a Porous Membrane Humidification Method in Polymer Electrolyte Fuel Cells; International Journal of Hydrogen Energy, 2011. 36(22): p. 14866-14872.

Said, Ibrahim A., et al., Sweeping Gas Membrane Distillation (SGMD) for Wastewater Treatment, Concentration, and Desalination: A Comprehensive Review; Chemical Engineering and Processing—Process Intensification, 2020. 153: p. 107960.

Smith, Benjamin D.; Sweeping Gas Membrane Evaporative Cooling for the Enhanced Performance of Vapour Compression Refrigeration; in Department of Chemical and Biological Engineering; 2010, University of Ottawa, Canada; 111 pages.

StatePoint® Indirect Cooling Technology brochure from https://www.nortekair.com/wp-content/uploads/2019/12/184F-1019-Nortek-StatePoint-Brochure.pdf; publicly available before Dec. 3, 2020; 12 pages.

Suez Water Technologies & Solutions; ZeeWeed Ultrafiltration product guide from https://www.suezwatertechnologies.com/products/zeeweed-ultrafiltration; publicly available before Jun. 4, 2019; 3 pages.

The Membrane overview from Blue Foot Membranes website https://www.bluefootmembranes.com/ the-membrane/, believed to be publicly available Sep. 2021; 2 pages.

Translation of EP2208956A2 entitled TRANSLATION-EP2208956A2 (Year: 2010); 7 pages.

Tubular UF Membrane Modules brochure from Berghof Membranes website https://www.berghofmembranes.com/tubular-uf-membrane-modules/, believed to be publicly available Sep. 2021; 7 pages.

U.S. Non-Final Office Action from U.S. Appl. No. 16/891,598, dated Feb. 2, 2022; 38 pages.

U.S. Appl. No. 63/287,586, filed Dec. 9, 2021 entitled Tubular Membrane Heat Exchanger; 101 pages.

Woods, Jason; Membrane processes for heating, ventilation, and air conditioning; Renewable and Sustainable Energy Reviews 33 (2014) 290-304.

X-Flow Tubular Membranes overview from Pentair website https://xflow.pentair.com/en/spectrum/membrane-technology-in-general/tubular-membranes, believed to be publicly available Sep. 2021; 1 page.

Xu, Y., et al., A Review on Polymer-Based Membranes for Gas-Liquid Membrane Contacting Processes: Current Challenges and Future Direction; Separation and Purification Technology, 2019; 229: p. 115791.

Yang, Minlin, et al.; Experimental Investigations of a Quasi-Counter Flow Parallel-Plate Membrane Contactor Used for Air Humidification; Energy and Buildings, 2014. 80: p. 640-644.

Zhang, Li-Zhi, et al.; Coupled Heat and Mass Transfer in a Counter Flow Hollow Fiber Membrane Module for Air Humidification; International Journal of Heat and Mass Transfer, 2011. 54(5): p. 1055-1063.

Zhao, Shuaifei, et al., Condensation Studies in Membrane Evaporation and Sweeping Gas Membrane Distillation; Journal of Membrane Science, 2014. 462: p. 9-16.

Zhao, Shuaifei, et al., Condensation, Re-Evaporation and Associated Heat Transfer in Membrane Evaporation and Sweeping Gas Membrane Distillation; Journal of Membrane Science, 2015. 475: p. 445-454.

Decision to Grant from related Russian Patent Application No. 2023114937 with English translation dated Feb. 21, 2025; 44 pages.

* cited by examiner

TUBULAR MEMBRANE HEAT EXCHANGER

CROSS-REFERENCE TO RELATED APPLICATION

This application claims the benefit of U.S. Provisional Patent No. 63/121,063, filed Dec. 3, 2020, which is hereby incorporated herein by reference in its entirety.

FIELD

This disclosure relates to heat exchangers and, more specifically, to heat exchangers having tubular membranes that facilitate heat transfer between two fluids.

BACKGROUND

Heat exchangers come in a wide variety of configurations and are used in a wide variety of applications. One type of heat exchanger is a hollow fiber membrane heat exchanger. Hollow fiber membrane heat exchangers have hollow fibers with an inner diameter of less than 1 mm through which a process fluid is directed. Another fluid, such as air, is directed over the exterior of the hollow fiber membranes. The hollow fiber membranes have sidewalls that facilitate heat transfer between the fluid streams on the interior and the exterior of the hollow fiber membranes.

BRIEF DESCRIPTION OF THE DRAWINGS

FIG. 13A is a cross-sectional view of a slide connection between a lower header of an upper tubular membrane heat exchanger module and an upper header of a lower tubular membrane heat exchanger module;

FIG. 21 is a cross-sectional view of a tubular membrane assembly including a tubular membrane, a tube, and a fitting connecting the tubular membrane and tube;

FIG. 24 is a schematic view of tubular membrane heat exchanger modules having a support member connecting a support plate of the tubular membrane heat exchanger module to a surface;

FIG. 27 is a cross-sectional view of a support plate of a tubular membrane heat exchanger module showing tubular membranes extending in openings of the support plate and annular surfaces of the support plate holes encircling the tubular membranes;

DETAILED DESCRIPTION

Figure 1A:
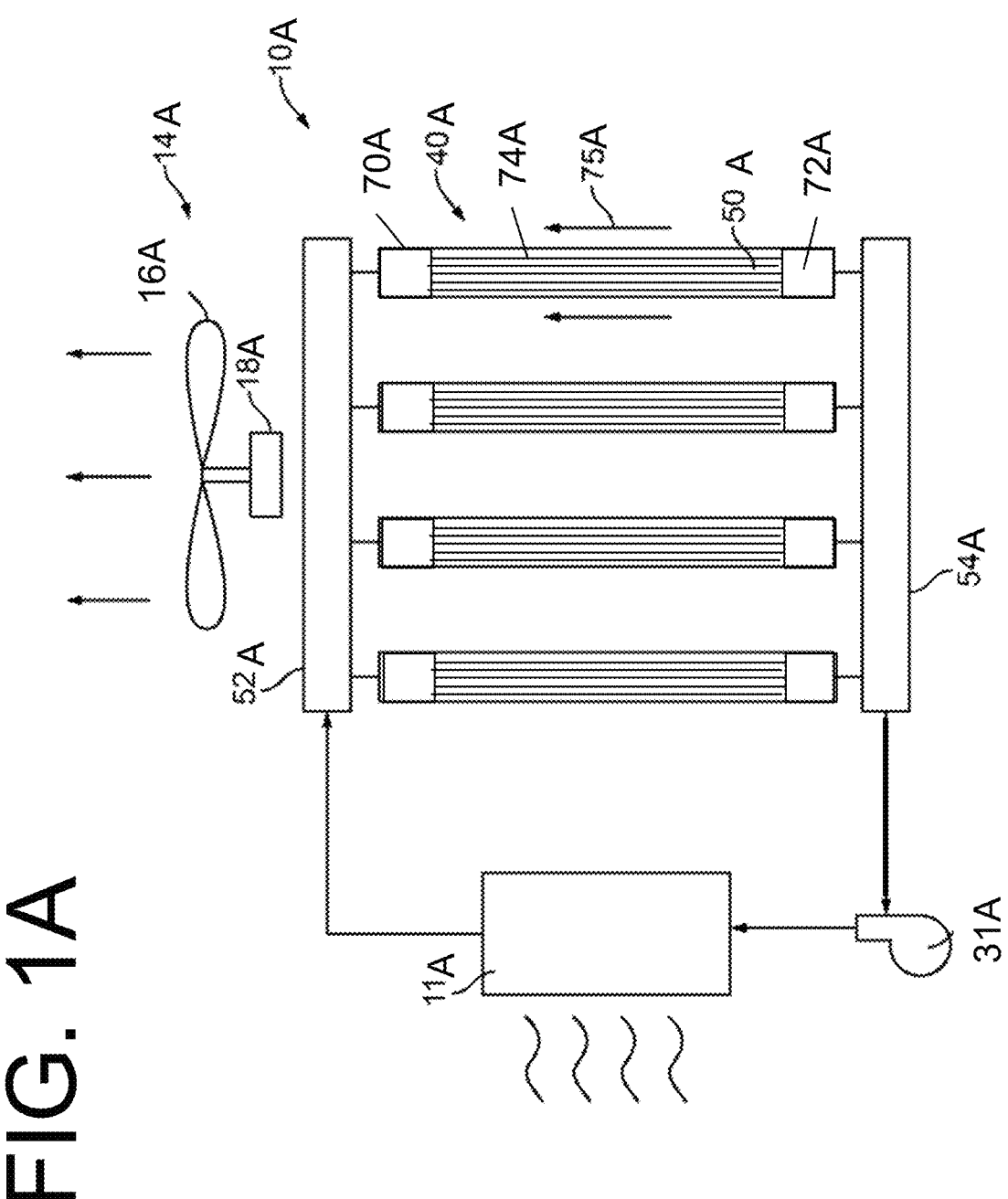
FIG. 1A is a schematic view of a heat exchanger system including tubular membrane heat exchanger assemblies.

In accordance with one aspect of the present disclosure, a tubular membrane beat exchanger module is provided that includes an inlet header and an outlet header. The inlet header is configured to connect to an adjacent upstream tubular membrane heat exchanger module and form an upstream wetted compartment therewith. The outlet header is configured to connect to an adjacent downstream tubular membrane heat exchanger module and form a downstream wetted compartment therewith. The tubular membrane heat exchanger module further includes tubular membranes connecting the inlet header and the outlet header. The tubular membranes facilitate flow of process fluid from the upstream wetted compartment to the downstream wetted compartment. The tubular membranes also permit mass transfer between the process fluid in the tubular membranes and a fluid contacting outer surfaces of the tubular membranes. The wetted compartments formed by connecting the inlet and outlet headers with adjacent tubular membrane heat exchanger modules operate as internal manifolds that collect and distribute the process fluid between the tubular membranes of the connected tubular membrane heat exchanger modules.

In one embodiment, the tubular membranes have a circular cross-section and lumens with an inner diameter sized to provide highly laminar flow of process fluid in the tubular membranes. The laminar flow allows diffusion and conduction to occur rapidly within the lumen. The inner diameter of the tubular membrane lumens may be at least 1 mm, such as in the range of approximately 1 mm to approximately 10 mm, such as approximately 1 mm to approximately 5 mm. The term "approximately" as used herein in the context of tubular membrane lumen diameter is intended to reflect manufacturing variances, such as +/−0.2 mm.

In accordance with another aspect of the present disclosure, a modular heat exchanger system is provided that includes an upstream tubular membrane heat exchanger module and a downstream tubular membrane heat exchanger module. The upstream tubular membrane heat exchanger module has an upstream inlet header to receive process fluid, an upstream outlet header, and a plurality of upstream tubular membranes that facilitate flow of the process fluid from the upstream inlet header to the upstream outlet header.

The downstream tubular membrane heat exchanger module includes a downstream inlet header configured to be secured to the upstream outlet header of the upstream tubular membrane heat exchanger. With the upstream outlet header and downstream inlet header secured together, the downstream inlet header receives the process fluid from the upstream outlet header. The downstream tubular membrane heat exchanger module further includes a downstream outlet header and a plurality of downstream tubular membranes.

The upstream and downstream tubular membrane heat exchanger modules provide a series of tubular membrane heat exchanger modules that sequentially exchange heat between the process fluid and a fluid external to the tubular membranes of the upstream and downstream tubular membrane heat exchanger modules. Further, the upstream and downstream tubular membrane heat exchanger modules may be secured to one or more additional tubular membrane heat exchanger modules in series with the upstream and downstream tubular membrane heat exchanger modules to provide additional heat transfer if required for a particular application.

The present disclosure also provides a tubular membrane heat exchanger module having an inlet header to receive a process fluid, an outlet header, and a plurality of tubular membranes connected to the inlet header and the outlet header that facilitate flow of process fluid from the inlet header to the outlet header. The tubular membranes provide tortuous paths for the process fluid as the process fluid flows from the inlet header to the outlet header. The tortuous paths each include a plurality of abrupt turns or changes of direction for the process fluid. The tubular membranes may extend the entirety of the tortuous path and include bends that redirect the process fluid. In another embodiment, the tubular membrane heat exchanger module includes one or more intermediate headers along the tortuous path. For example, the tubular membranes may include first, second, and third pluralities of straight tubular membranes and the tubular membrane heat exchanger module includes first and second intermediate headers connecting the first, second, and third pluralities of straight tubular membranes. The first intermediate header changes the direction of the process fluid from the first to the second pluralities of straight tubular membranes and the second intermediate header changes the direction of the process fluid from the second to the third pluralities of straight tubular membranes. The second pluralities of straight tubular membranes extend transversely to the first and third pluralities of straight tubular membranes such that the first, second, and third pluralities of straight tubular membranes direct the process fluid in different directions along the tortuous paths.

The tortuous paths for the process fluid create turbulence in the process fluid that may enhance heat transfer between the process fluid and a fluid external to the tubular membranes. Another advantage of the tortuous process fluid paths created by the tubular membranes is that longer tubular membranes may be used within a given envelope of a heat transfer apparatus such as a cooling tower. For example, the tubular membranes may be routed around internal structures of the cooling tower such as a fan or a load-bearing member. Further, the longer tubular membranes permit fewer tubular membranes to be used for a particular embodiment while providing the same surface area as a greater number of shorter tubular membranes. Fewer tubular membranes permit fewer connections between tubular membranes and inlet/outlet headers which simplifies manufacture and service of the tubular membrane heat exchanger module.

In accordance with another aspect of the present disclosure, an air handler system is provided that includes an outer structure, a tubular membrane heat exchanger having tubular membranes in the outer structure, and a fan operable to generate airflow in the outer structure relative to the tubular membranes. The air handler system further includes a process fluid supply configured to provide either of a first process fluid and a second process fluid to the tubular membrane heat exchanger, the second process fluid including a liquid desiccant.

The air handler system has a controller operatively connected to the fan and the process fluid supply. The controller has a standard mode wherein the process fluid supply provides the first process fluid to the tubular membrane heat exchanger to transfer heat between the first process fluid and the airflow. The controller further has a second mode wherein the process fluid provides the second process fluid comprising the liquid desiccant to the tubular membrane heat exchanger to remove humidity from the airflow. The air handler system may thereby provide different air conditioning functions by changing the process fluid provided to the tubular membranes of the tubular membrane heat exchanger.

Regarding FIG. 1A, a heat exchanger system 10A is provided that includes a heat exchanger 11A which receives heat, such as heat from inside of a building, and transfers the heat to a process fluid such as water or a water/glycol mixture. The fluid may include liquid and gas, the proportions of which may vary as the process fluid travels throughout the heat exchanger system 10A. The heat exchanger system 10A includes a pump 31A configured to pump the fluid from the heat exchanger 11A to a heat rejection apparatus such as a cooling tower 40A. The cooling tower 40A includes one or more heat exchanger cassettes, such as tubular membrane heat exchanger modules 50A. The tubular membrane heat exchanger modules 50A are releasably or permanently connected to an inlet manifold 52A and an outlet manifold 54A. In another approach, the cooling tower 40A may receive heat and transfer the heat to the process fluid, while the heat exchanger 11A removes heat from the process fluid. The heat exchanger system 10A may be similar to the heat exchanger systems discussed in U.S. patent application Ser. No. 16/891,598, filed Jun. 3, 2020, and which is hereby incorporated by reference herein in its entirety.

Each tubular membrane heat exchanger module 50A includes an upper header or inlet header 70A that receives the fluid from the inlet manifold 52A, one or more tubular membranes 74A through which the fluid travels, and a lower header or outlet header 72A that collects the fluid from the tubular membranes 74A. The tubular membranes 74A are similar to the tubular membranes 39 shown in FIG. 1E and discussed below.

Referring to FIG. 1A, the tubular membranes 74A facilitate heat and/or mass transfer between a first fluid within the tubular membranes 74A and a second fluid outside of the tubular membranes 74A. As one example, the tubular membranes 74A may be made of a gas-permeable material that is also liquid-impermeable. The tubular membranes 74A receive fluid including a mixture of liquid and gas that has been heated by the heat exchanger 11A. The tubular membranes 74A permit the gas, such as vapor, that has been heated by the heat exchanger 11A to travel out of the tubular membranes 74A. As an example, the fluid entering the tubular membranes 74A may be a mixture of water and gaseous water vapor. The liquid traveling through the tubular membranes 74A is cooled by indirect cooling from the airflow over the exterior surfaces of the tubular membranes 74 and the release of higher-energy water vapor through the tubular membrane 74A.

In another embodiment, the tubular membrane heat exchanger modules 50A utilize pervaporation to transfer heat between a first fluid within the tubular membranes 74A and a second fluid outside of the tubular membranes 74A. For example, the tubular membrane heat exchanger module 50A receives heated liquid (such as water) from the heat exchanger 11A. Molecules of the heated liquid (e.g., $H_2O$) are sorped by the tubular membranes 74A. The molecules of the liquid sorped by the tubular membranes 74A diffuse from inner surfaces of the tubular membranes 74A to outer surfaces of the tubular membranes 74A. The molecules of the liquid that have diffused to the outer surfaces of the tubular membranes 74A are desorped into the exterior fluid (e.g., air) and remove heat from the tubular membranes 74A. In the context of liquid water entering the tubular membrane heat exchanger module 50A and ambient air being directed across the exterior surfaces of the tubular membranes, the diffused water molecules on the exterior of the tubular membranes 74A evaporate into the ambient air stream. In other embodiments, molecules of a fluid outside of the tubular membranes may diffuse into the interior of the tubular membranes.

In one approach, the fluid may be completely gas upon reaching the tubular membranes 74A, a portion of the gas stream permeates through the tubular membranes 74 into the ambient, and the remaining gas of the gas stream exits the outlet header 72A as cooled gas, a gas/liquid mixture, or as liquid.

The tubular membranes 74A may be made of, for example, one or more polymers such as polypropylene (PP), polydimethylsiloxane (PDMS) or polytetrafluoroethylene (PTFE). As another example, the tubular membranes 74A may be a microporous hydrophobic polysulfone material. In some approaches, the tubular membranes 74A may be made of ceramic materials. Another material that may be utilized for the tubular membranes 74A includes graphene oxide membranes.

The tubular membranes 74A permit controlled diffusion of fluid molecules through the side walls of the tubular membranes 74A while limiting drift, such as bacteria, chemicals, and debris, from traveling through the side walls of the tubular membranes 74A. The tubular membranes 74A thereby operate as a barrier to *legionella* and other microbes from passing between the fluid inside of the tubular membranes and the fluid outside of the tubular membranes.

The tubular membranes 74A may be porous and have openings or pores to facilitate heat and/or mass transfer. The pores may have sizes in a range of 2.5 angstroms to 35 micrometers. For example, the pores may be in the range of 1 nanometer to 20 nanometers. In one embodiment, the tubular membranes 74A have pore sizes that are less than 0.001 micrometers. In another embodiment, the tubular membranes 74A have pore sizes less than 1 micrometer and greater than 0.001 micrometer.

The tubular membranes 74A may be flexible and relatively flimsy which makes gripping the tubular membranes 74A difficult to secure to another component. For example, the tubular membranes 74A may be stiff enough to be placed vertically on a surface and retain their shape, but any external pressure makes the tubular membranes 74A bend and/or twist. The tubular membranes 74A may be made of, or coated with, a material having UV resistance to inhibit algae growth and/or biocidal properties to inhibit bacteria growth.

The material of the tubular membranes 74A may be porous or dense. For example, the tubular membranes 74A may be hydrophobic porous membranes wherein water vapor transport to the exterior of the tubular membranes 74A occurs primarily by diffusion through pores of the tubular membranes 74A. The permeability of the tubular membranes may be affected by the pore size, total porosity, surface porosity, and pore tortuosity of the tubular membranes. As an example, the pore size may be in the micrometer range. For dense membrane materials, water vapor transport happens by solution-diffusion through the polymer layer itself since no pores are present in the dense membrane material.

The tubular membranes 74A may be made of homogenous membranes having a single layer that is impermeable to liquid but highly permeable for vapors. In other embodiments, the tubular membranes 74A may have a composite form including a dense skin layer and a porous support layer. The support layer provides mechanical stability to the membrane while the dense skin layer is responsible for membrane permeability and selectivity.

Regarding FIG. 1A, the cooling tower 40A includes one or more fans 14A. In one embodiment, each fan 14A includes fan blades 16A and a motor 18A. In another embodiment, the one or more fans 14A may include a plurality of fans sharing a common motor. The fan 14A is configured to generate airflow relative to the tubular membranes 74A, such as in an upward direction 75A along the lengths of the tubular membranes 74A, in a downward direction (opposite direction 75A) along the lengths of the tubular membranes 74A, and/or in one or more directions transverse to the lengths of the tubular membranes 74A such as perpendicular to the lengths of the tubular membranes 74A. The airflow may assist in removing the gas from outer surfaces of the tubular membranes 74A. The fluid may be water, as mentioned above, and pure water vapor may permeate through the tubular membranes 74A while contaminants such as debris, solids dissolved or undissolved in the water, scale, and organisms remain inside of the tubular membranes 74A. Further, the tubular membranes 74A inhibit exterior contaminants from entering the interior of the tubular membranes 74A.

Figure 1B:
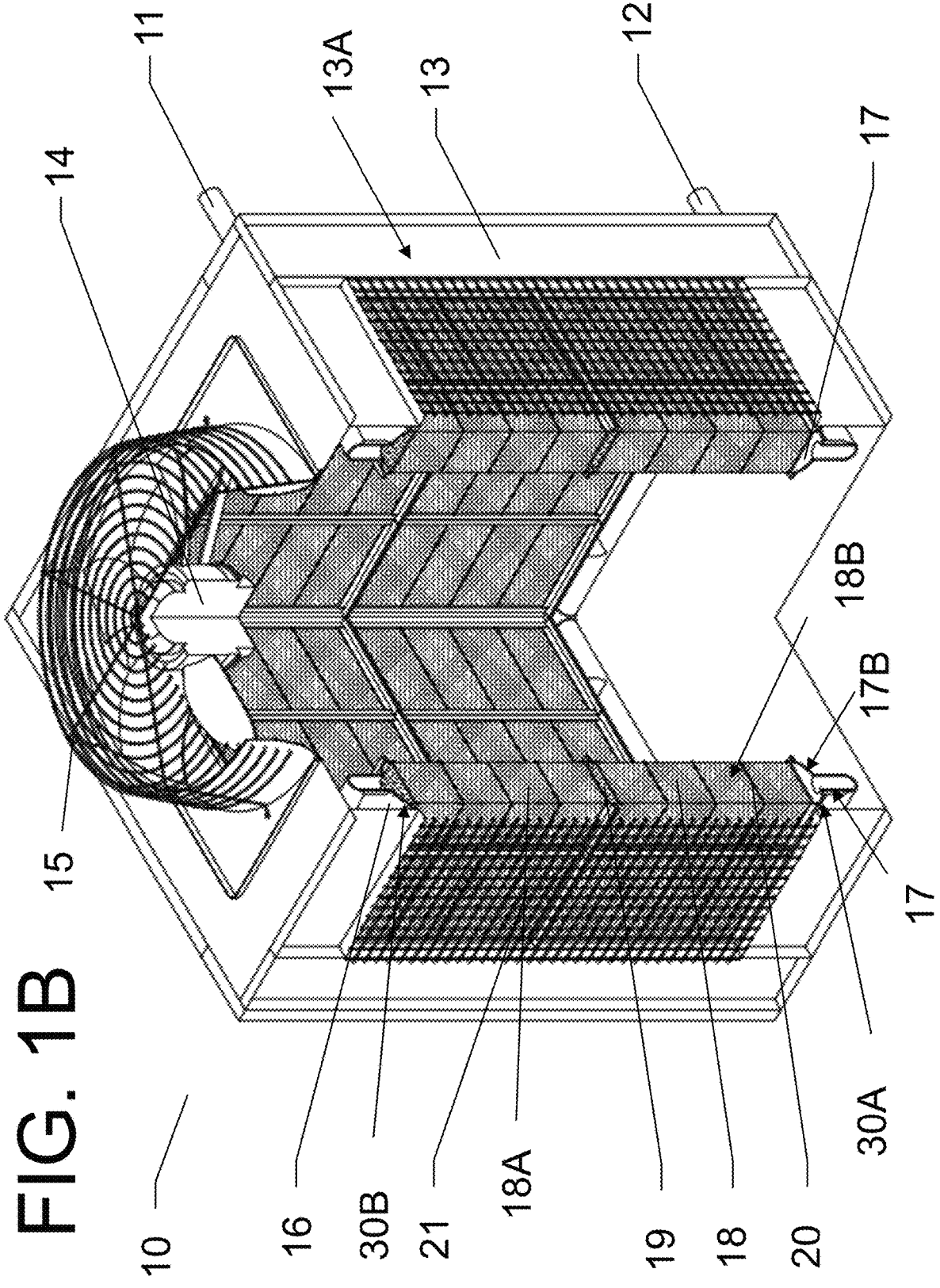
FIG. 1B is a perspective, partial cross-sectional view of a cooling tower having tubular membrane heat exchanger modules including stacked upper and lower tubular membrane heat exchanger modules.

Regarding FIG. 1B, a cooling tower 10 is provided that is similar in many respects to the cooling tower 40A discussed with respect to FIG. 1A above. The cooling tower 10 includes a process fluid inlet 11, a process fluid outlet 12, a tower structure 13, a fan 14, and optionally a fan guard 15. The fan 14 is operable to draw air in through air inlets 13A of the cooling tower 10. The process fluid received at process fluid inlet 11 is directed to an inlet manifold 16 that provides the process fluid to one or more heat exchanger cassettes, such as tubular membrane heat exchanger modules 18. As shown in FIG. 1B, each tubular membrane heat exchanger module 18 includes headers 41, such as upper header 41B and lower header 41A, and tubular membranes 39 that are similar to the tubular membranes 41 discussed above. The tubular membrane heat exchanger modules 18 include pairs of vertically stacked upper and lower tubular membrane heat exchanger modules 18A, 18B configured to cool the process fluid as the process fluid flows through the upper and lower tubular membrane heat exchanger modules 18A, 18B. The cooling tower 10 has an outlet manifold 17 that collects the process fluid from the pairs of vertically stacked upper and lower tubular membrane heat exchanger modules 18A, 18B and directs the process fluid to the process fluid outlet 12.

The cooling tower 10 includes releasable connections 30, 30A between the upper and lower tubular membrane heat exchanger modules 18A, 18B and the inlet and outlet manifolds 16, 17. The cooling tower 10 includes connections 19 between each pair of upper and lower tubular membrane heat exchanger modules 18A, 18B that permits process fluid to flow from the upper tubular membrane heat exchanger module 18A to the lower tubular membrane heat exchanger module 18B.

The upper and lower tubular membrane heat exchanger modules 18A, 18B of each pair are thereby connected in series. Further, each pair of upper and lower tubular membrane heat exchange modules 18A, 18B are connected to the inlet and outlet manifolds 16, 17 in parallel with the other pairs of upper and lower tubular membrane heat exchange modules 18A, 18B. The modular nature of the upper and lower tubular membrane heat exchanger modules 18A, 18B facilitates straightforward and efficient servicing of the cooling tower 10. For example, if one of the upper tubular membrane heat exchanger modules 18A needs to be replaced, the upper tubular membrane heat exchanger module 18A is disconnected from the inlet manifold 16, disconnected from the associated lower tubular membrane heat exchanger module 18B, and removed. A replacement upper tubular membrane heat exchanger module 18A is then connected to the inlet manifold 16 and the lower tubular membrane heat exchanger module 18B. Alternatively, if a pair of upper and lower tubular membrane heat exchanger modules 18A, 18B needs to be replaced, the pair is disconnected from the inlet and outlet manifolds 16, 17, the pair is removed from the cooling tower 10, and a new pair of upper and lower tubular membrane heat exchanger modules 18A, 18B are connected to the inlet and outlet manifolds 16, 17. For larger cooling tower embodiments, valving may be provided before and after each tubular membrane heat exchanger module 18 such that each module 18 may be serviced and/or replaced without draining the entire system. Further, providing valving before and after each tubular membrane heat exchanger 18 may permit other components of the cooling tower to be operation while the service is performed.

The cooling tower 10 has protectors, such as screens 21, to protect the tubular membrane heat exchanger modules 18 from dirt, debris, sunlight, and/or impact. The cooling tower 10 has an induced-draft configuration and includes a fan 14 operable to draw air into the air inlets 13A, across the tubular membranes 39 of the tubular membrane heat exchanger modules 18, and out through an air outlet 15 of the cooling tower 10. It has been found that inducing airflow relative to the tubular membranes 39 creates a slight air vacuum at the exterior of the tubular membranes 39. The slight air vacuum at the exterior of the tubular membranes assists the egress of gas from the tubular membranes 39 and increases efficiency of operation of the tubular membranes 39. However, it is noted that induced draft, forced draft in upflow or downflow, and crossflow airflow patterns are all within the scope of the present disclosure.

The tubular membrane heat exchanger modules 18 facilitate heat transfer from the process fluid at low process fluid pressures. For example, the cooling tower 10 may utilize a process fluid at low pressure, such as less than 25 psi. In another embodiment, the cooling tower 10 may be operable in an "open" configuration wherein the process fluid is exposed to atmospheric air pressure. In another embodiment, cooling tower 10 may operate at higher pressures, such as around 150 psi, or greater than 200 psi. For example, the tube 770 of the embodiment of FIG. 7B may utilize an internal pressure of up to 450 psi when the tube 770 is used to conduct refrigerant therethrough.

Figure 1C:
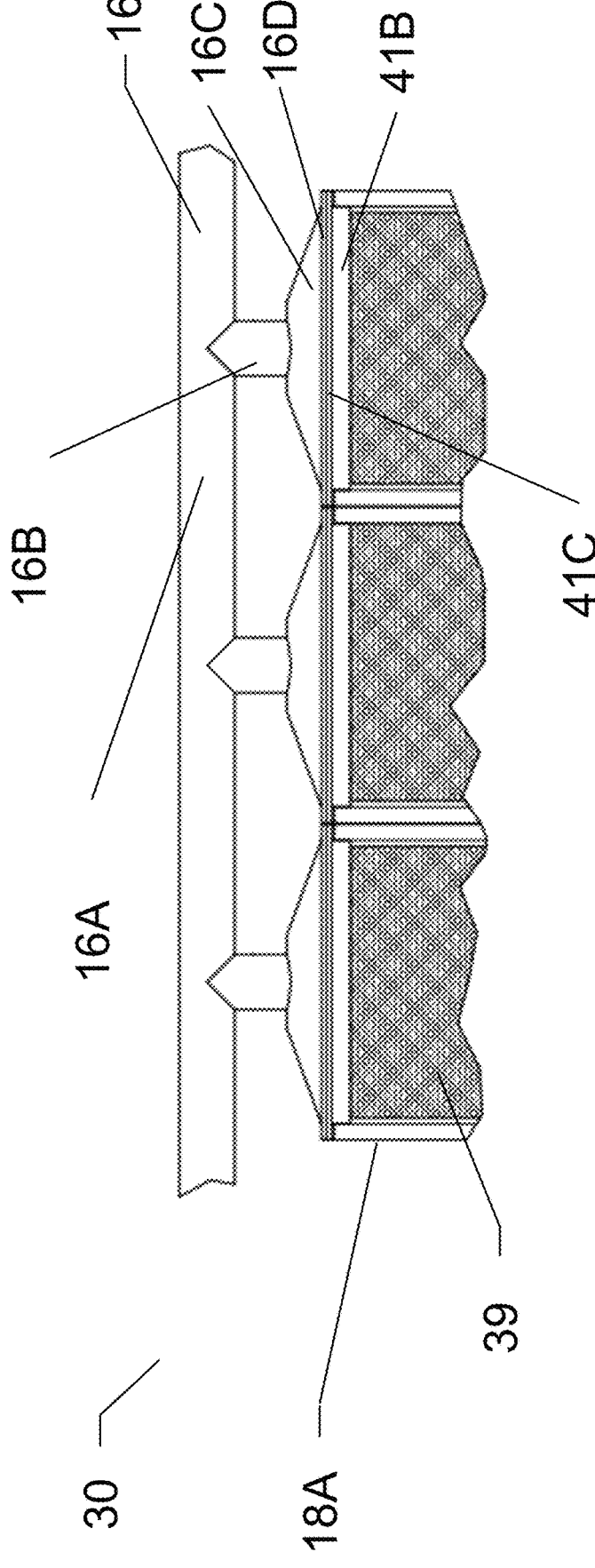
FIG. 1C is an elevational view of a connection between an inlet manifold and an upper tubular membrane heat exchanger module of the cooling tower of FIG. 1B.

FIG. 1C shows a more detailed view of the cooling tower 10 including the releasable connections 30 between the inlet manifold 16 and the upper tubular membrane heat exchanger modules 18A. More specifically, the inlet manifold 16 includes a primary tube 16A with branch tubes 16B diverging therefrom. The inlet manifold 16 further includes a distributor such as a distribution header 16C each having a flange 16D that is secured to a flange 41C of the inlet header 41B of the upper tubular membrane heat exchanger module 18. The distribution header 16C may have a shape resembling a square pyramidal frustum and optionally includes a deflector configured to distribute process fluid entering the distribution header 16C to the tubular membranes 39 of the upper header portion 41B. The flanges 16D, 41C may be releasably secured to one another, such as by one or more fasteners. In one embodiment, a sealing element such as a gasket is provided between the flanges 16D, 41C. To connect the upper tubular membrane heat exchanger module 18A to the inlet manifold 16, a user positions the inlet header 41B below the distribution header 16C and secures the flanges 16D, 41C thereof using fasteners or other approaches. In another embodiment, the connections 30 are permanent.

Figure 1D:
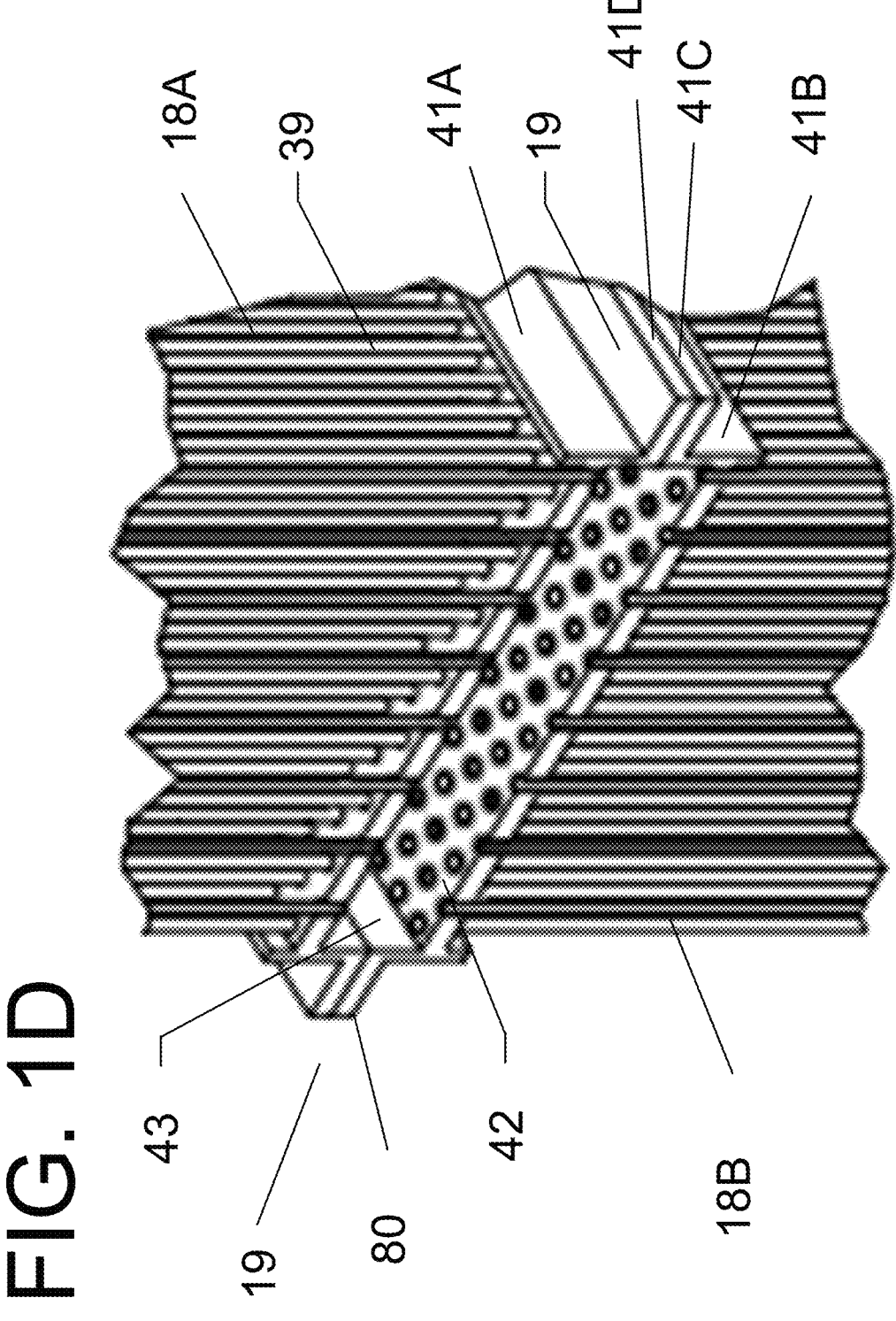
FIG. 1D is a perspective, cross-sectional view of a connection between upper and lower tubular membrane heat exchanger modules of the cooling tower of FIG. 1B.

Regarding FIG. 1D, the connection 19 between the upper and lower tubular membrane heat exchanger modules 18A, 18B includes flanges 41C, 41D of header bodies 80 of the lower and upper headers 41A, 41B. The flanges 41C, 41D are permanently or releasably secured together. When connected, the lower and upper headers 41A, 41B form a wetted compartment 43 that receives process fluid from the tubular membranes of the upper tubular membrane heat exchanger module 18A and directs the process fluid into the tubular membranes 39 of the lower tubular membrane heat exchanger module 18B.

The wetted compartment 43 formed between the tubular membrane heat exchanger modules 18 permits tubular membrane heat exchanger modules 18 to be connected together to form a longer heat exchanger. The connected tubular membrane heat exchanger modules 18 may form a longer heat exchanger without the need for additional headers and associated piping. The wetted compartment 43 may be taller than shown to promote fluid mixing or shorter than shown to provide a more compact connection. In one embodiment, the wetted compartment 43 includes fluid mixers, such as stationary or movable members, within the wetted compartment 43.

In one embodiment, the connection 19 includes one or more fasteners such as assemblies of bolts, nuts, and washers, configured to releasably secure the flanges 41C, 41D together. As other examples, the flanges 41C, 41D may be joined together using a bonding agent, welded together, or connected together with mating portions of the lower and upper headers 41A, 41B. The connection 19 may include a sealing element, such as a gasket, and/or a bonding agent such as epoxy.

Figure 1E:
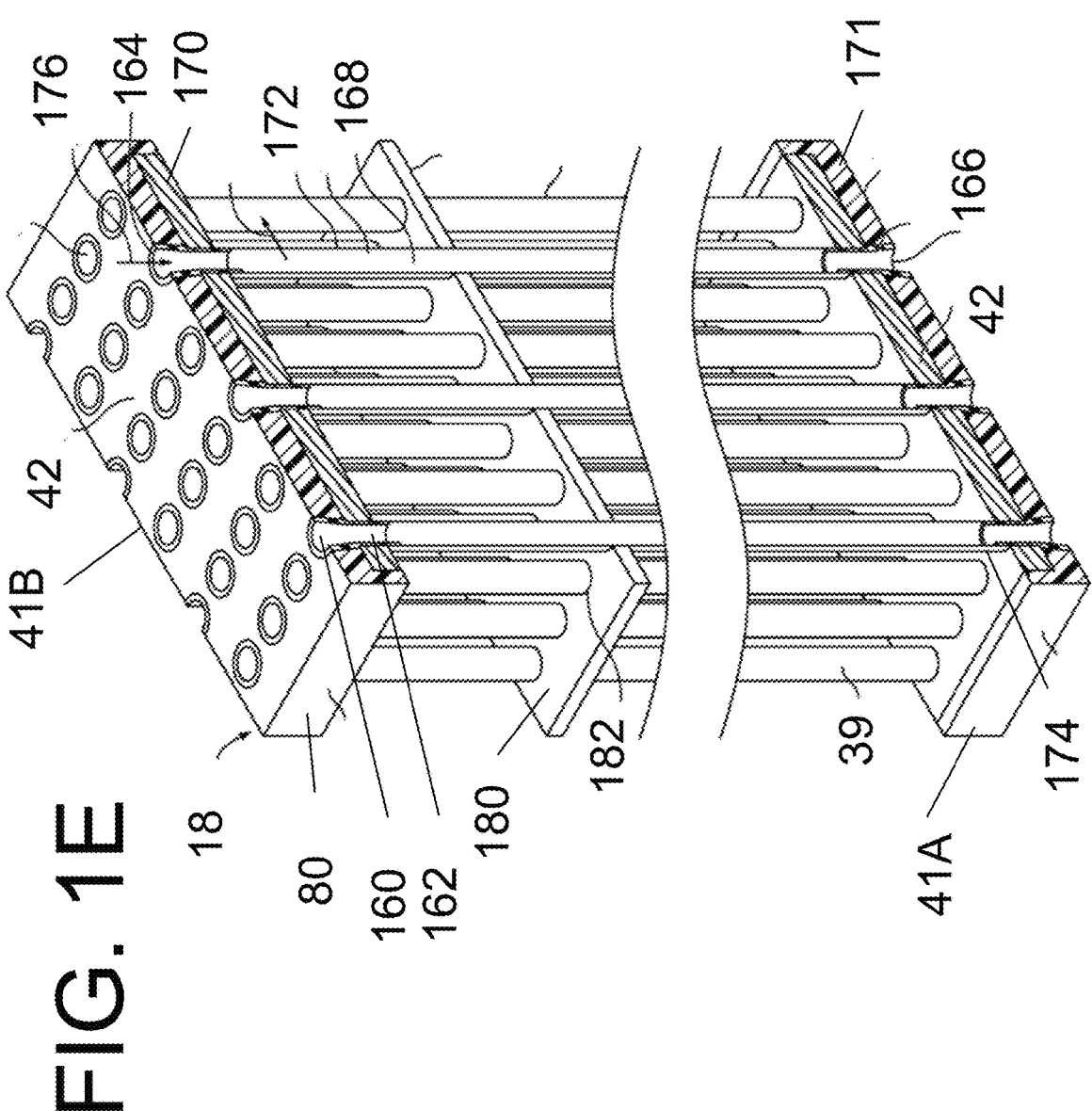
FIG. 1E is a perspective, cross-sectional view of a portion of one of the tubular membrane heat exchanger modules of the cooling tower of FIG. 1B.

Referring to FIG. 1E, the upper and lower tubular membrane heat exchangers 18A, 18B may be identical and are described with respect to tubular membrane heat exchanger 18. The header body 80 of each tubular membrane heat exchanger 18 includes a header plate portion 42 have a plurality of apertures that receive connectors such as fittings 166 that couple the tubular membranes 39 to the upper and lower headers 41B, 41A The upper and lower headers 41B, 41A further include potting 170, 171 to secure the tubular membranes 39 to the fittings 166. The upper and lower headers 41B, 41A are shown in FIG. 1D without potting 170, 171 for clarity purposes.

Regarding FIG. 1B, the connections 30A between the lower tubular membrane heat exchanger modules 18B and the outlet manifold 17 that may be identical to the connections 30 between the inlet manifold 16 and the upper tubular membrane heat exchanger modules 18A. The outlet manifold 17 includes collection headers 17B similar to the distribution header 16C discussed above with respect to FIG. 1C. The collection headers 17B have flanges configured to be releasably or permanently secured to the flange 41D of the lower header 41A of the lower tubular membrane heat exchanger module 18B.

In one approach, the tubular membrane heat exchanger modules 18 are bidirectional, meaning that the tubular membrane heat exchanger modules 18 may be installed with either the inlet header 41B in an upper position or the outlet header 41A in the upper position. Further, the inlet and outlet manifolds 16, 17 may each function as an inlet manifold or an outlet manifold depending on the direction of flow of the process fluid. For example, the process fluid flow may be reversed in some applications such that the process fluid travels from the manifold 17, through the tubular membrane heat exchangers 18, and into the manifold 16. In other embodiments, the tubular membrane heat exchanger modules 18 may be unidirectional.

Referring again to FIG. 1E, the inlet header 41B and outlet header 41A include header plate portions 42 having openings 164 that receive the fittings 166. The fittings 166 have end portions 160 secured to the header plate portions 42. In one embodiment, the end portion 160 of each fittings 166 has a maximum width that is larger than a minimum width across an associated opening 164. The interference between the end portion 160 of the fitting 166 and the header plate portion 42 inhibits pull-through of the fitting 166. The fittings 166 have opposite end portions 162 secured to the tubular membranes 39. The end portions 162 of the fittings 166 extend into lumens 168 of the tubular membrane 39. In one embodiment, the lumens 168 have a circular cross-section with an initial inner diameter and the end portions 162 of the fittings 166 each have an outer diameter larger than the initial inner diameter of the lumen 168 to create an interference that keeps the fitting end portion 162 engaged with the tubular membrane 39. In one approach, the fitting end portions 162 are pressed into the lumens 168 of the tubular membranes 39. The fittings 166 may be made of a harder plastic and the tubular membrane 39 made of a softer plastic such that the tubular membrane 39 deforms radially outward to fit over the fitting end portion 162.

Regarding FIG. 1E, the potting 170, 171 of the inlet and outlet headers 41B, 41A contacts an outer surface 172 of the membranes 39 at end portions 174 of the tubular membranes 39. The potting 170, 171 secures the membranes 39 on the fittings 166. The process fluid may flow in direction 176 through openings 164 of the fittings 166 of the upper header 41B, into the lumens 168 of the tubular membranes 39, and out through the fittings 166 of the lower header 41A. In one embodiment, the tubular membrane heat exchanger module 18 includes a support 180 having openings 182 that receive the tubular membranes 39 and maintain the membranes 39 in a substantially straight, parallel orientation.

Figure 2:
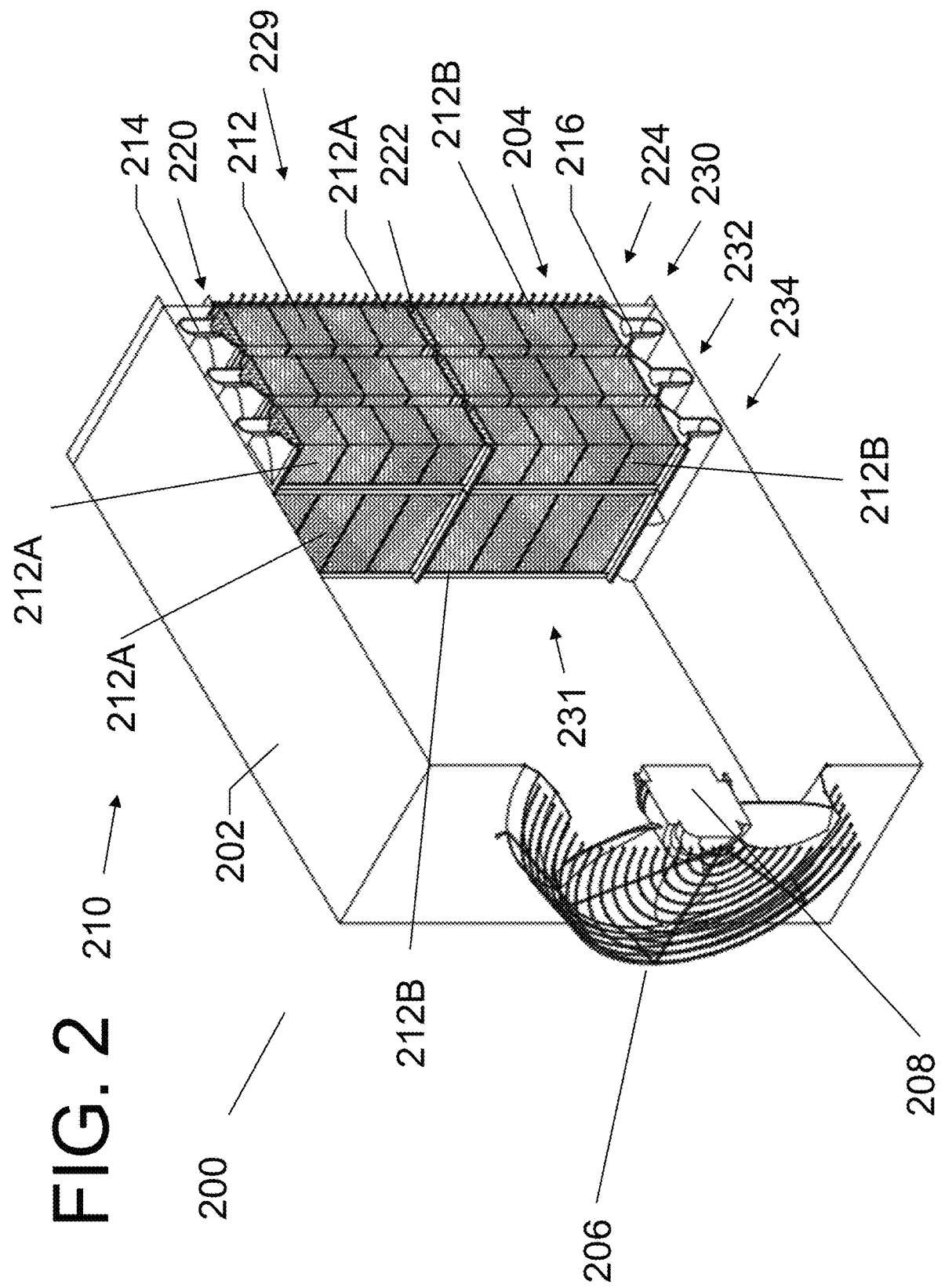
FIG. 2 is a perspective, cross-sectional view of a second cooling tower having tubular membrane heat exchanger modules.

Regarding FIG. 2, a cooling tower 200 is provided that is similar in many respects to the cooling tower 10 discussed above such that differences will be highlighted. The cooling tower 200 includes a tower structure 202, an air inlet 204, an air outlet 206, a fan 208, and an assembly 210 of tubular membrane heat exchanger modules 212. For taller cooling towers, the tubular membrane heat exchanger modules 212 include at least one pair of upper and lower tubular membrane heat exchanger modules 212A, 212B. For shorter cooling towers, there may just be a single tubular membrane module 212. The fan 208 is operable to induce airflow through the air inlet 204, across the tubular membrane heat exchanger modules 212, and out through the air outlet 206. In other embodiments, the cooling tower 200 may be configured so that the fan 208 forces air across the tubular membrane heat exchanger modules 212 rather than inducing airflow across the tubular membrane heat exchanger modules 212. The pairs of upper and lower tubular membrane heat exchanger modules 212A, 212B are arranged side-by-side in the tower structure 202. The pairs of upper and lower tubular membrane heat exchanger modules 212A, 212B form an upper level 229 and a lower level 231 of tubular membrane heat exchangers 212.

Further, the cooling tower 200 is shown with layers 230, 232, 234 of the pairs of tubular membrane heat exchanger modules 212A, 212B so that the airflow entering the inlet 204 travels through the layers 230, 232, 234 of tubular membrane heat exchanger modules 212A, 212B in series. The number of layers of tubular membrane heat exchanger modules 212 may be selected for a particular amount of heat transfer desired for a particular application.

The cooling tower 200 includes an inlet manifold 214 and an outlet manifold 216. The tubular membrane heat exchanger modules 212A each have a connection 220 to the inlet manifold 214 and a connection 222 to the lower tubular membrane heat exchanger module 212B. For shorter cooling towers, the layers 230, 232, 234 may each have a single level of tubular membrane heat exchangers 212. For taller cooling towers, there may be three or more levels of tubular membrane heat exchangers 212 with connections 222 coupling the tubular membrane heat exchangers 212.

The lower tubular membrane heat exchanger module 212B further includes a connection 224 to the lower manifold 216. The inlet manifold 214 and outlet manifold 215 are similar to the inlet and outlet manifolds 16 and 17 discussed above with respect to FIGS. 1B and 1C. Further, the connections 220, 222, and 224 are similar to the connections 30, 19, 30A discussed above with respect to FIGS. 1B and 1D. The connections 220, 222, 224 may be releasable or permanent.

Figure 3:
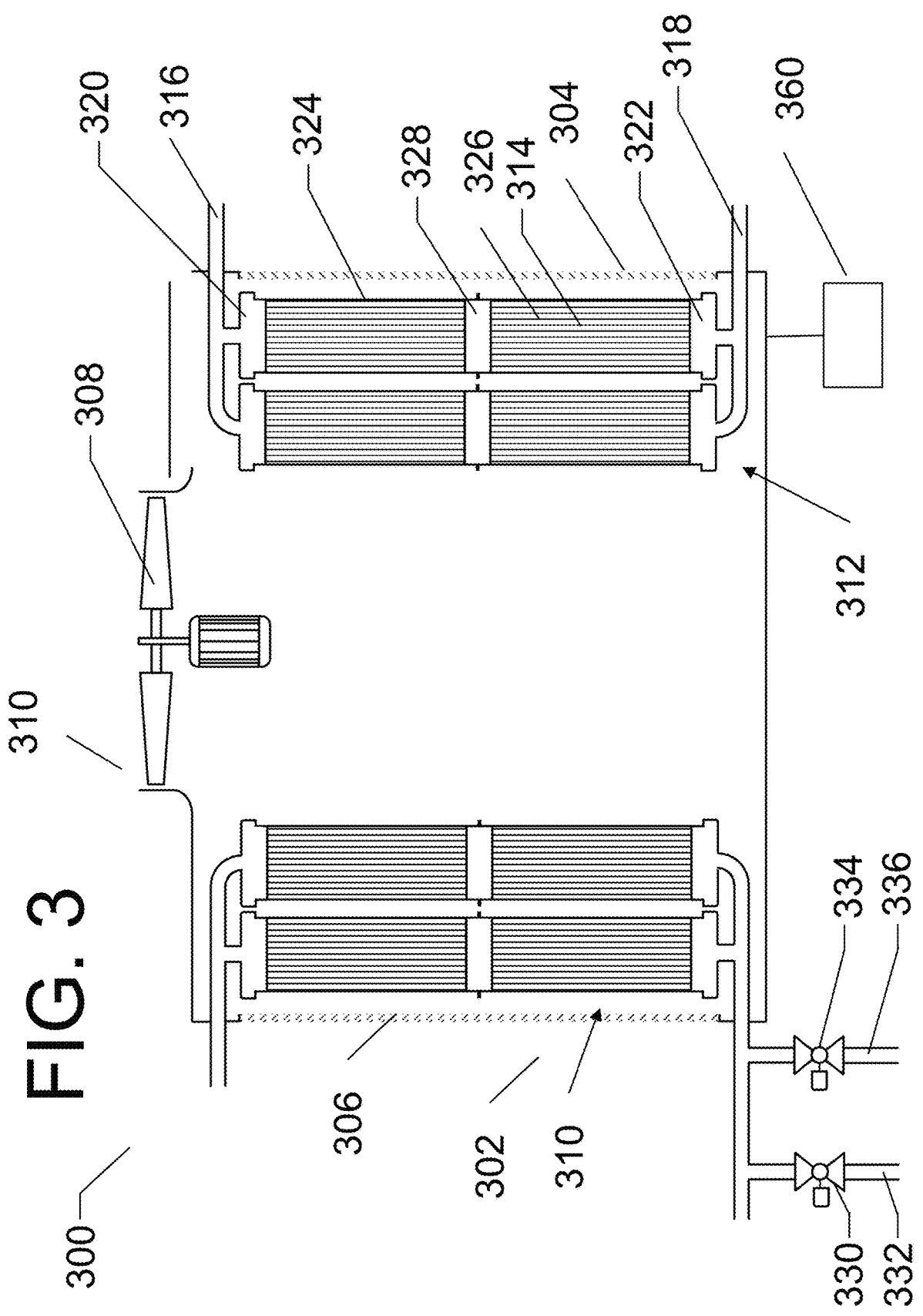
FIG. 3 is a schematic view of a third cooling tower having tubular membrane heat exchanger modules.

Regarding FIG. 3, a cooling tower 300 is provided that, in one form, is configured as a two-sided induced draft cooling tower. The cooling tower 300 is similar in many respects to the cooling towers discussed above such that differences will be highlighted. The cooling tower 300 includes air inlets 302, 304 with protectors such as louvers or screens 306, at least one fan 308, and an air outlet 310. The cooling tower 300 includes tubular membrane heat exchanger module assemblies 310, 312. In one embodiment, the tubular membrane heat exchanger module assemblies 310, 312 are in fluid communication with each other and receive the same process fluid. In another embodiment, the tubular membrane heat exchanger module assemblies 310, 312 are not in communication with one another and receive different process fluids.

Each tubular membrane heat exchanger module assembly 310 includes stacked tubular membrane heat exchanger modules 314 that are connected to upper and lower manifolds 316, 318 by way of releasable connections 320, 322. The tubular membrane heat exchanger modules 314 may include upper tubular membrane heat exchanger modules 324 and lower tubular membrane heat exchanger modules 326 that are connected by a connection 328, which may be releasable or permanent. The number of tubular membrane heat exchanger modules 314 in each tubular membrane heat exchanger module assembly 310 may be provided, for example, according to the size of the cooling tower.

Figure 20:
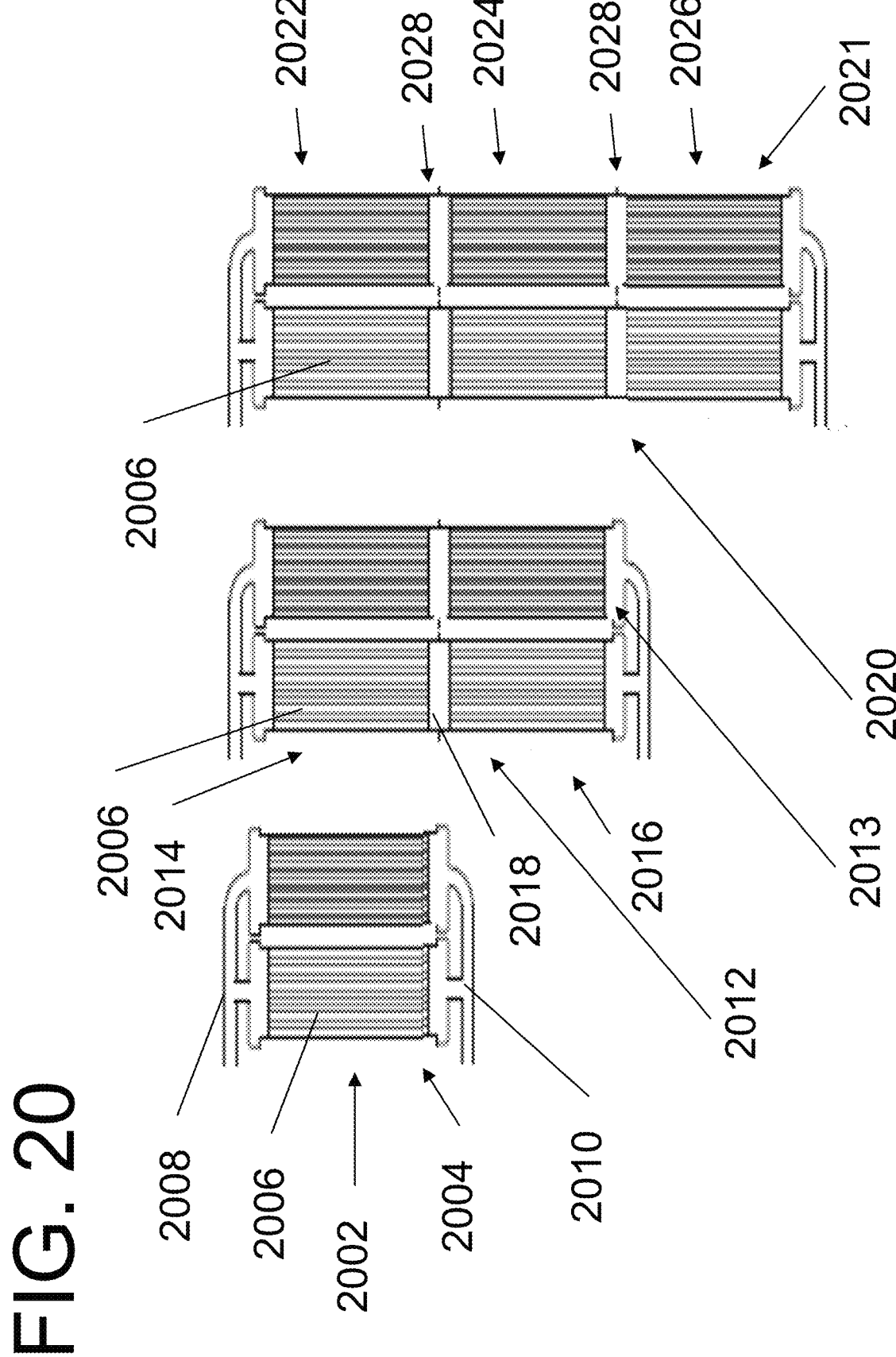
FIG. 20 is schematic view of various configurations of tubular membrane heat exchangers modules for cooling towers of various sizes.

For example and with reference to FIG. 20, a single-level tubular membrane heat exchanger module assembly 2002 is provided having a single level 2004 of tubular membrane heat exchangers 2006 connected to an inlet manifold 2008 and an outlet manifold 2010. For larger cooling towers, two-level tubular membrane heat exchanger module assemblies 2012, 2013 are provided each having a first level 2014 and a second level 2016 of tubular membrane heat exchanger modules 2006 with a connection 2018 therebetween that is similar to the connection 19 discussed above with respect to FIG. 1D. For still larger cooling towers, three-level tubular membrane heat exchanger module assemblies 2020, 2021 are provided having first, second, and third levels 2022, 2024, 2026 of tubular membrane heat exchanger modules 2006. The tubular membrane heat exchanger modules 2006 are connected by connections 2028 similar to the connection 19 discussed above with respect to FIG. 1D. The number of stacked tubular membrane heat exchanger modules in each tubular membrane heat exchanger module assembly may be selected based at least in part on desired cooling capacity and space constraints within the cooling tower.

The cooling tower 300 further includes a makeup process fluid valve 330, a makeup process fluid supply 332, a drain valve 334, and a drain 336. The cooling tower 300 may include a controller 360 that operates the drain valve 334 and makeup process fluid valve 330 to remove process fluid having a high degree of dissolved solids and add clean process fluid having a lower degree of dissolved solids. The controller may thereby operate the drain valve 334 and makeup process fluid valve 330 to compensate for evaporation and accomplish blowdown.

Figure 4:
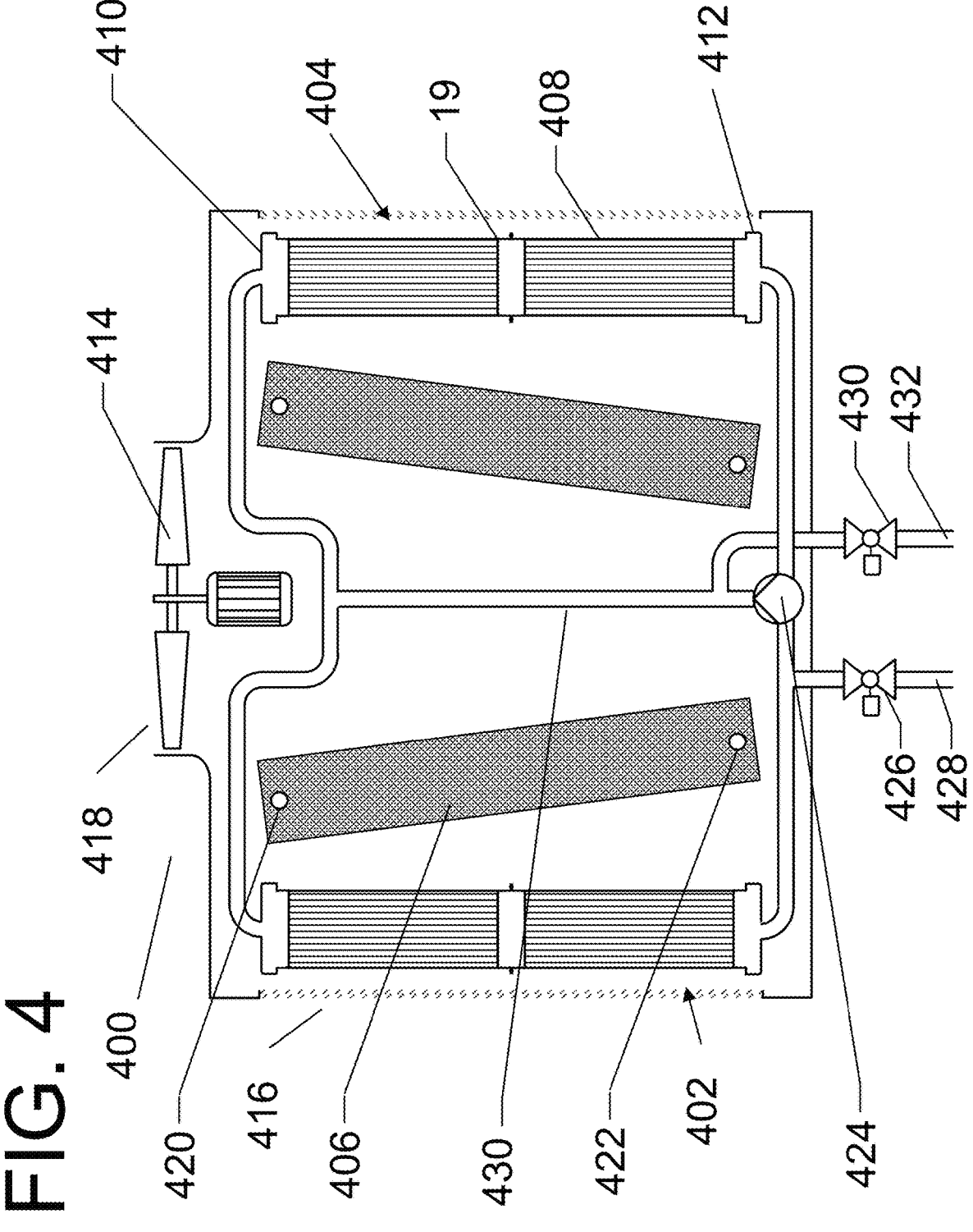
FIG. 4 is a schematic view of a fourth cooling tower including an adiabatic heat rejection system having tubular membrane heat exchanger modules as pre-cooling media.

Regarding FIG. 4, a cooling tower 400 is provided that, in one form, is configured as a two-sided induced draft adiabatic cooling tower. The cooling tower 400 is similar to the cooling towers discussed above such that differences will be highlighted. The cooling tower 400 includes tubular membrane heat exchanger module assemblies 402, 404 that operate as a pre-cooling media or pre-cooling heat exchangers for indirect heat exchangers, such as dry indirect heat exchangers 406, of the cooling tower 400. The indirect heat exchangers 406 may include one or more tube and fin heat exchangers, one or more plate cassette heat exchangers, and/or any other type of indirect heat exchanger. The tubular membrane heat exchanger assemblies 402, 404 provide improvement over some existing adiabatic air-precooling devices using wetted pad media because the tubular membrane heat exchanger assemblies 402, 404 may not drift, foul, or suffer from dry rot.

The tubular membrane heat exchanger module assemblies 404 each include one or more tubular membrane heat exchanger modules 408 that are connected to upper and lower manifolds 410, 412. The cooling tower 400 includes a process fluid circulation loop 430 for the tubular membrane heat exchanger assemblies 402, 404 and a pump 424 operable to direct process fluid between the tubular membrane heat exchanger assemblies 402, 404. The cooling tower 400 has a fan 414 that induces airflow through inlets 416, through the tubular membrane heat exchanger module assemblies 402, 404, and across the dry heat exchangers 406 before the air is discharged from an outlet 418 of the cooling tower 400. In some applications the airflow may be reversed into a forced draft configuration. The dry indirect heat exchangers 406 include process fluid connections 420, 422. The cooling tower 400 further includes a makeup valve 426, a makeup supply 428, a drain valve 430, and a drain 432 which compensate for evaporation and accomplish blowdown.

Figure 5:
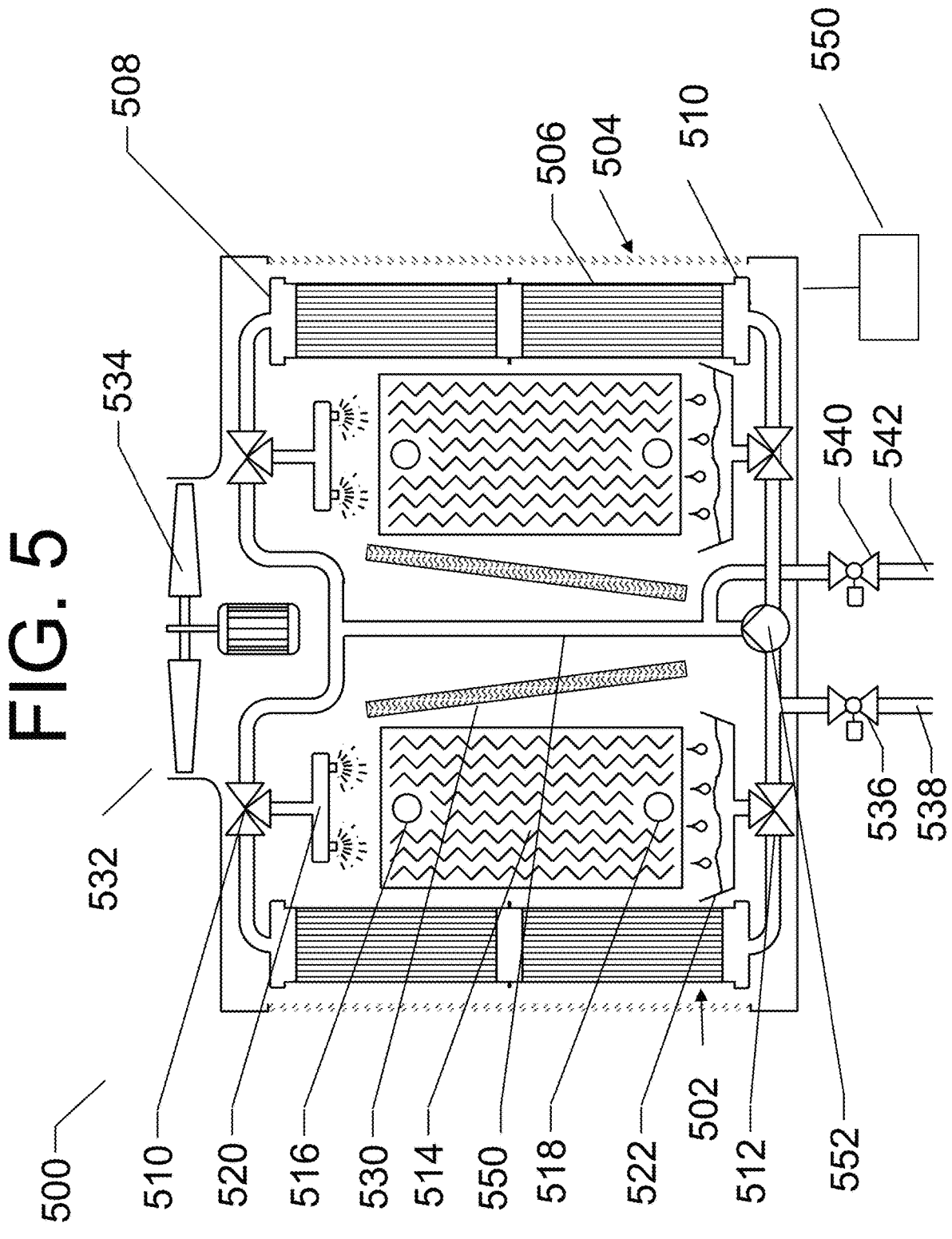
FIG. 5 is a schematic view of a fifth cooling tower that may be operated in wet, dry, or adiabatic modes and includes tubular membrane heat exchanger modules as pre-cooling media.

Regarding FIG. 5, a cooling tower 500 is provided that, in one form, is configured as a two-sided induced draft hybrid cooling tower. The cooling tower 500 may operate in wet, adiabatic, or dry modes. In the wet mode, spray water from spray water distribution system 520 is directly sprayed onto the indirect heat exchanger 514 so that evaporative heat transfer occurs. In the adiabatic mode, water is fed via 3-way valve 510, 512 to the tubular membranes 506 which operate to adiabatically saturate and precool the air which flows over the dry indirect heat exchanger 514. In the dry mode, pump 552 is off and no process fluid flows. The indirect heat exchanger 514 is cooled in the dry mode only by the passage of air across the indirect heat exchanger 514. Cooling tower 500 includes many respects that are similar to the cooling towers discussed above such that differences will be highlighted.

Cooling tower 500 includes tubular membrane heat exchanger module assemblies 502, 504 that each include one or more tubular membrane heat exchanger modules 506. The tubular membrane heat exchanger module assemblies 502, 504 are connected to an upper manifold or upper header 508, a lower manifold or lower header 510, and three-way valves 510, 512. Cooling tower 500 further includes one or more indirect heat exchangers 514, such as plate heat exchangers, that receive working fluid from an inlet 516 and direct the working fluid to an outlet 518. The cooling tower 500 has a pump 552 for circulating process fluid, such as water, with the tubular membrane heat exchanger module assemblies 502, 504 and/or the indirect heat exchangers 514. The cooling tower 500 has a controller 550 that operates the three-way valves 510, 512 to direct the process fluid to the tubular membrane heat exchanger module assemblies 502, 504 or to the indirect heat exchangers 514 as required for a particular mode of operation. The tubular membrane heat exchanger module assemblies 502, 504 utilize pervaporation to remove heat from the process fluid when the three-way valves 510, 512 direct process fluid to the tubular membrane heat exchanger module assemblies 502, 504.

The cooling tower 500 further includes a process fluid distribution system 520 that distributes process fluid onto the indirect heat exchangers 514 and a process fluid collection system 522 for collecting process fluid distributed onto the indirect heat exchanger 514. A portion of the process fluid distributed onto the indirect heat exchangers 514 evaporates to remove heat from the working fluid in the indirect heat exchangers 514. The collected process fluid is directed back into the fluid circulation loop 550 via the three-way valves 512.

The cooling tower 500 further includes one or more drift eliminators 530 configured to remove water droplets from the air prior to air being directed out of an outlet 532 of the cooling tower 500 via a fan 534 of the cooling tower 500. The cooling tower 500 further includes a makeup process fluid valve 536, a makeup process fluid supply 538, a drain valve 540, and a drain 542 which are operable to compensate for evaporation and accomplish blowdown.

Figure 6:
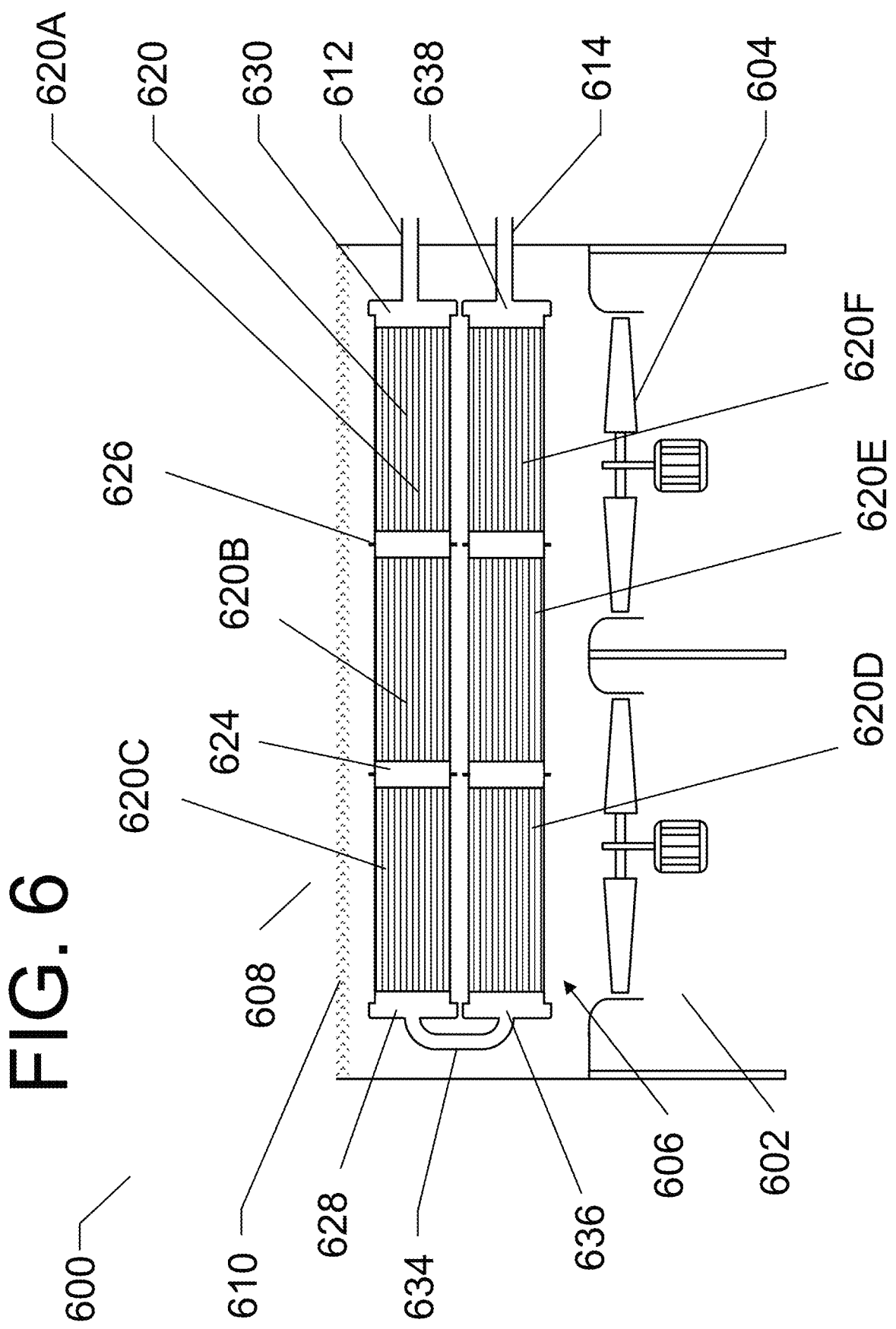
FIG. 6 is a schematic view of an evaporative heat rejection system having tubular membrane heat exchanger modules in a forced draft, cross flow configuration.

Regarding FIG. 6, a cooling tower 600 is provided that, in one form, is configured as a forced draft cooling tower. The cooling tower 600 is similar in many respects to the cooling towers discussed above such that differences will be highlighted. Cooling tower 600 includes one or more air inlets 602, fans 604 that draw air into the cooling tower 600, one or more tubular membrane heat exchanger module assemblies 606, and an outlet 608 protected by a screen 610. The tubular membrane heat exchanger module assemblies 606 receives process fluid from a process fluid inlet 612, cool the process fluid, and direct the process fluid to a process fluid outlet 614. The tubular membrane heat exchanger module assemblies 606 may include for example, tubular membrane heat exchanger modules 620 arranged in series and/or parallel configurations. The arrangement of the cooling tower 600 may be generally described as a counterflow cooling tower.

In one embodiment, the tubular membrane heat exchanger modules 620 includes tubular membrane heat exchanger modules 620A, 620B, 620C stacked in series with permanent or releasable connections 624, 626 therebetween. The tubular membrane heat exchanger modules 620C, 620A further include permanent or releasable connections to an outlet manifold 628 and to an inlet manifold 630. A return bend 634 connects the outlet manifold 628 to a second inlet manifold 636 that directs process fluid through tubular membrane heat exchanger modules 620D, 620E, 620F before the process fluid reaches an outlet manifold 638. The tubular membrane heat exchanger modules 620, 620E, 620F may be permanently or releasably connected to one another and the inlet and outlet manifold 636, 638. In another embodiment, the tubular membrane heat exchanger modules 620 may be utilized as pre-cooling media with an air cooled heat exchanger in an adiabatic cooling tower.

Figure 7A:
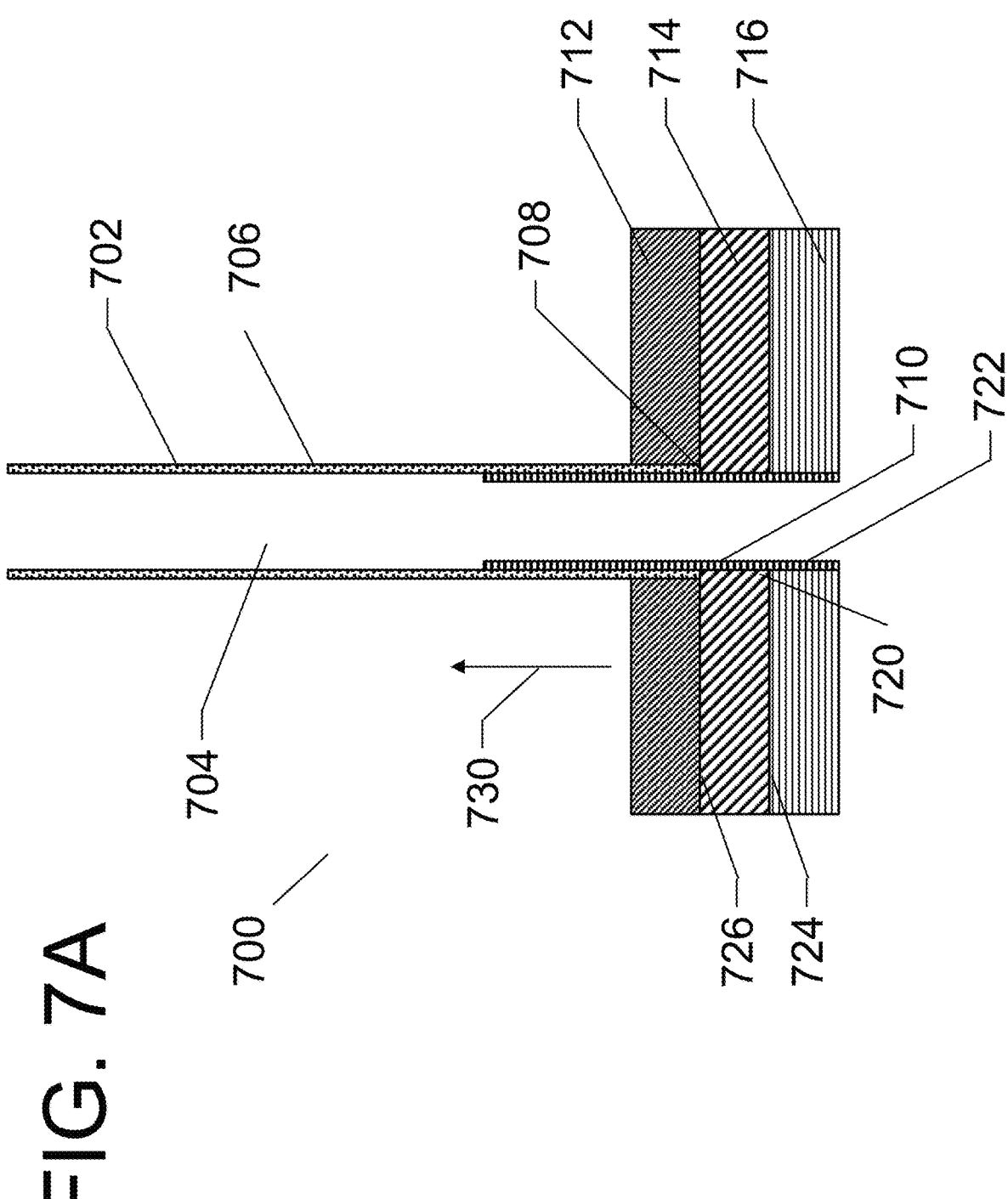
FIG. 7A is a cross-sectional view of a tubular membrane assembly including a tubular membrane, fitting, and header plate portion assembled and having plotting applied to opposite sides of the header plate portion.

Regarding FIG. 7A, a tubular membrane assembly 700 is provided that is an example of a connection that may be utilized between the tubular membranes and the headers of any of the tubular membrane heat exchanger modules discussed therein. The tubular membrane assembly 700 includes a tubular membrane 702 having a lumen, a side wall 706, and an end portion 708. The end portion 708 is engaged with a fitting 710 and is secured to the fitting 710 by potting 712. The tubular membrane assembly 700 further includes a tube sheet, such as a header plate portion 714, and potting 716. The fitting 710 extends through an opening 720 of the header plate portion 714 and has an end portion 722 protruding beyond an inner surface 724 of the plate portion 714. The potting 712, 716 are applied to an outer surface 726 and an inner surface 724 of the header plate portion 714 to secure the tubular membrane 702 to the fitting 710, secure the fitting 710 to the header plate portion 714, and resist pull-through of the tubular membrane 702 and fitting 710 in direction 730.

Figure 7B:
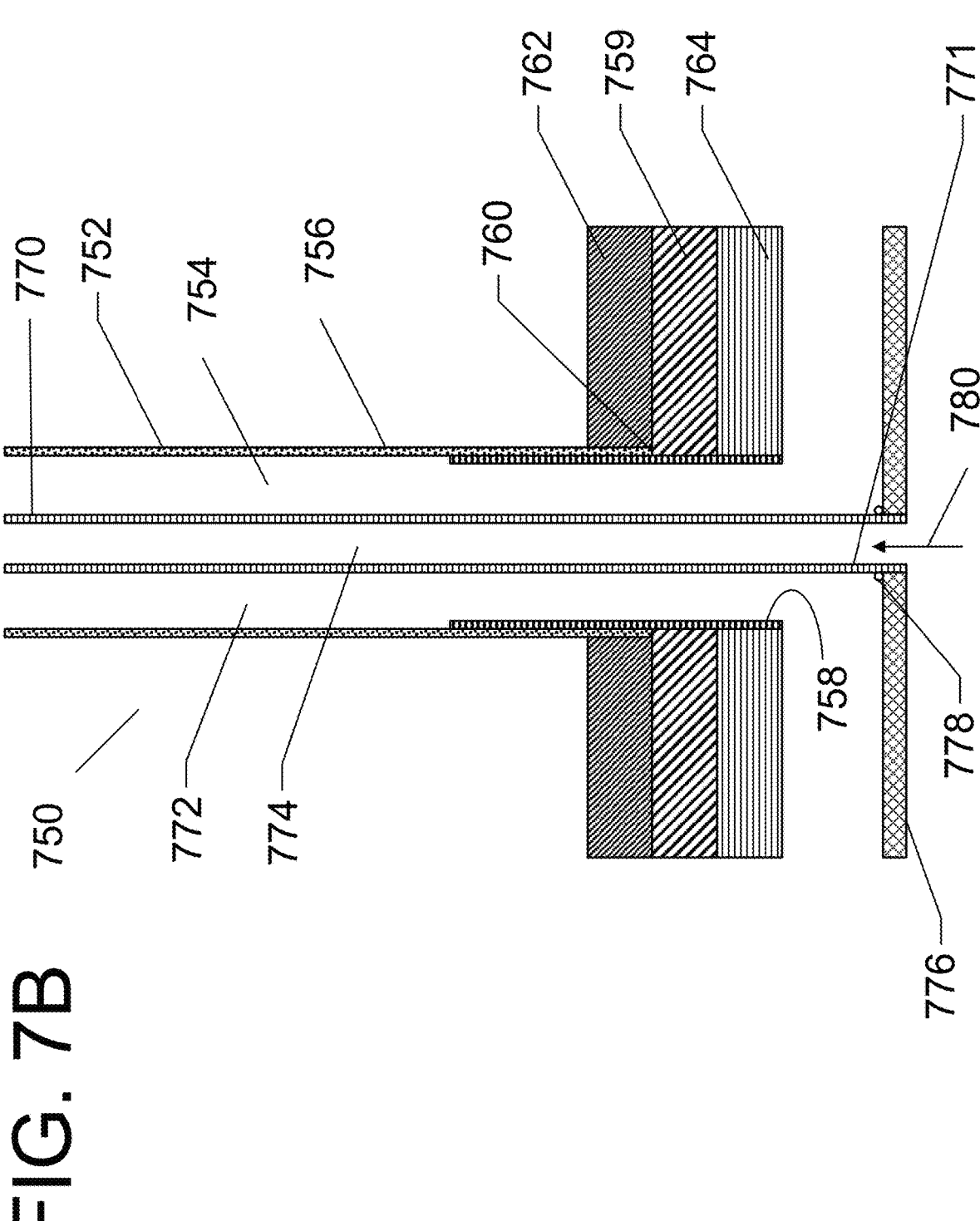
FIG. 7B is a cross-sectional view of a tubular membrane, a fitting, a header plate portion, and a tubular pressure vessel extending in a lumen of the tubular membrane.

Regarding FIG. 7B, a tubular membrane assembly 750 is provided that is similar in many respects to the tubular membrane assembly 700 discussed above with respect to FIG. 7A and may be utilized in any of the tubular membrane heat exchanger modules described herein. The tubular membrane assembly 750 includes a tubular membrane 752 having a lumen 754 and a side wall 756 extending thereabout. The tubular membrane assembly 750 includes a fitting 758, a header plate portion 759, and potting 762, 764 securing the fitting 758 and an end portion 760 of the tubular membrane 752 relative to the header plate portion 759.

The tubular membrane assembly 750 includes a pressure vessel, such as a tube 770, in the lumen 754 of the tubular membrane assembly 752. The presence of the tube 770 in the tubular membrane 752 forms an annulus 772 extending about the tube 770. The tube 770 has a lumen 774 and an end portion 771 connected to a tube sheet, such as a header plate 776. The tube 770 may be connected to the header plate 776, such as by a bond or weld 778. The tube 770 permits fluid flow in from the header plate 776 in direction 780 into the lumen 774 of the tube 770. In one embodiment, the fluid in the annulus 772 flows in a direction opposite the direction 780. The fluid in the lumen may be under high pressure, such as a 100 psi or greater and is cooled by fluid in the annulus 772. As one example, the fluid in the lumen 774 may be ammonia and the fluid in the annulus 772 may be water.

The tube 770 may be made of metal, plastic, or ceramic as some examples. The tube 770 facilitates pressure and mass containment of a refrigerant in the lumen 774, such as liquid, gas, trans-critical fluid, or supercritical fluid, while liquid flowing in the annulus 772 indirectly cools the fluid in the lumen 774. The tubular membrane 750 may be used in condensation and gas cooling applications, as some examples.

Figure 8:
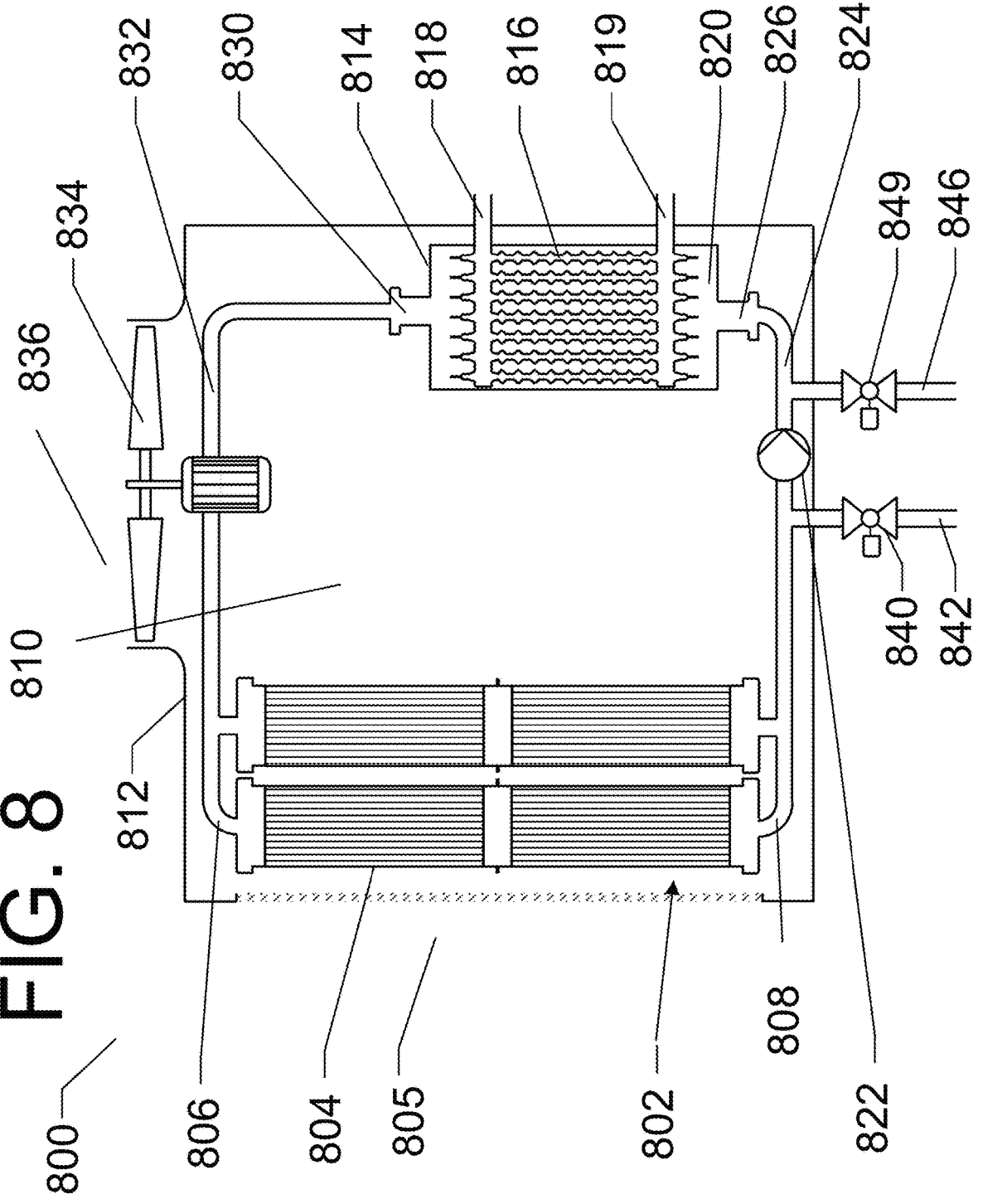
FIG. 8 is a schematic view of an evaporative heat rejection system including tubular membrane heat exchanger modules in a forced draft, cross flow configuration and a closed plate and shell heat exchanger.

Regarding FIG. 8, a cooling tower 800 is provided that, in one form, is configured as an induced draft closed circuit cooling tower. The cooling tower 800 is similar in many respects to the cooling towers discussed above such that differences will be highlighted. The cooling tower 800 includes one or more tubular membrane heat exchanger module assemblies 802 each comprising two or more tubular membrane heat exchanger modules 804 that are connected to one another and to an inlet manifold 806 and an outlet manifold 808. In another embodiment, the cooling tower 800 includes individual tubular membrane heat exchange modules 804 connected to the inlet and outlet manifolds 806, 808.

The cooling tower 800 includes a fan 834 for drawing air in through the inlet 805, across the tubular membrane heat exchanger modules 804, into an interior 810 of the cooling tower 800, and out through the outlet 836 of the cooling tower 800. The tubular membrane heat exchanger module assembly 802 transfers heat from the process fluid traveling through the tubular membrane heat exchanger module assembly 802 to air flowing about the exterior of the tubular membranes of the tubular membrane heat exchanger module assembly 802 which heats the air.

In the interior 810, the cooling tower 800 further includes a closed-circuit indirect heat exchanger, such as a plate and shell heat exchanger 814. The plate and shell heat exchanger 814 includes plates 816 that receive process fluid at inlet 818 and direct the process fluid to an outlet 819. The plates 816 are disposed in a housing or shell 820. The shell 820 receives process fluid, such as water, from the tubular membrane heat exchanger module assemblies 802 via a pump 822, pipe 824, and an inlet 826. The cooler process fluid in the housing 820 received from the outlet of the tubular membrane heat exchanger 804 interacts with the exterior surfaces of the plates 816 to indirectly cool the hotter process fluid as the process fluid flows through the plates 816. The now-heated process fluid exits an outlet 830, travels through a pipe 832, and is returned to the tubular membrane heat exchanger module assembly 802. The cooling tower 800 further includes makeup valve 840, makeup supply 842, a drain valve 844, and drain 846 which are operable to compensate for evaporation and accomplish blowdown.

Figure 9:
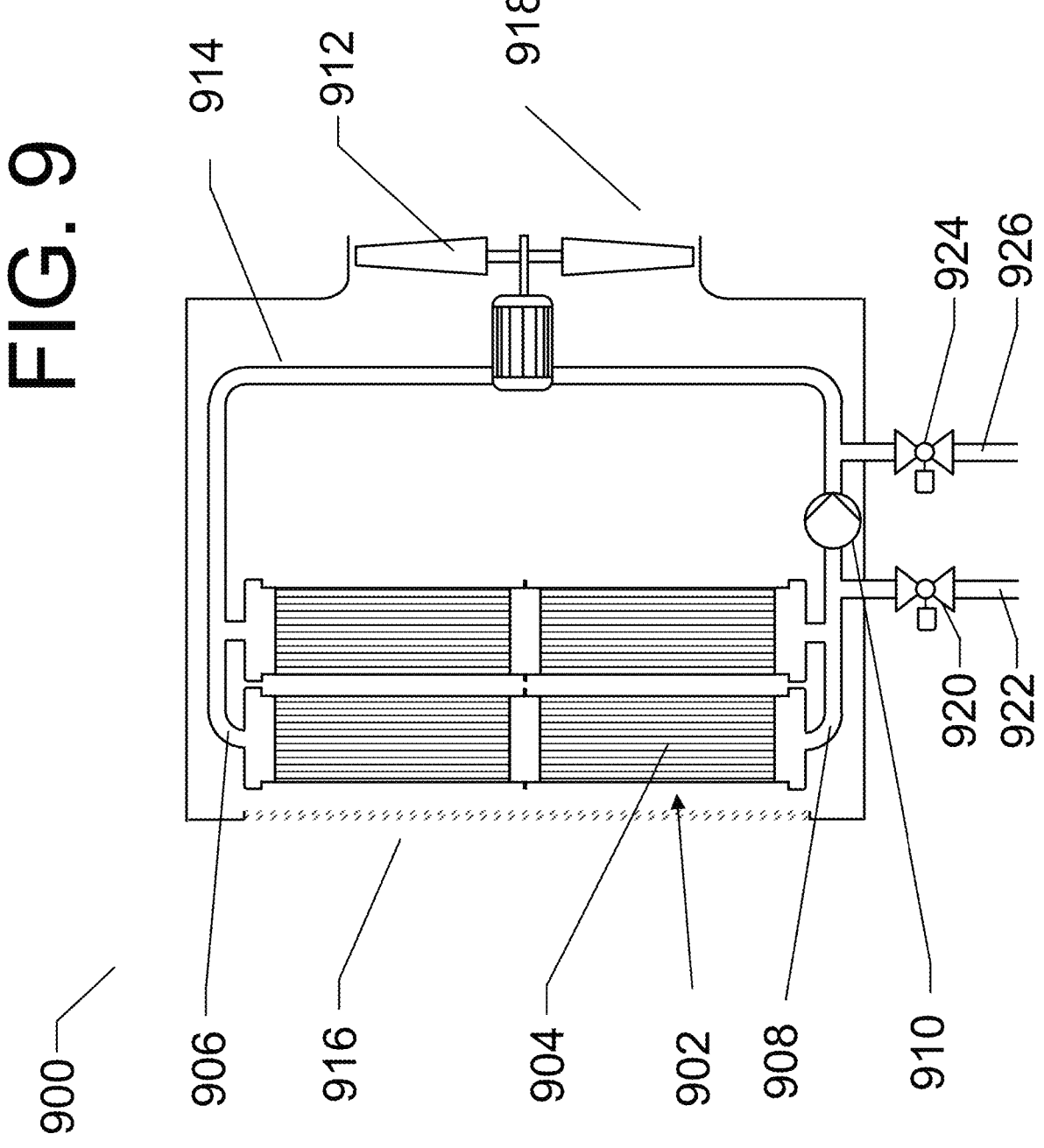
FIG. 9 is a schematic view of an evaporative air cooling system having tubular membrane heat exchanger modules in an induced draft, cross flow configuration.

Regarding FIG. 9, a cooling tower 900 is provided that is similar in many respects to the cooling towers discussed above such that differences will be highlighted. The cooling tower 900 includes a tubular membrane heat exchanger module assembly 902 comprising one or more tubular membrane heat exchanger modules 904 that are releasably connected to one another and to upper and lower manifolds 906, 908. The cooling tower 900 includes a pump 910, a fan 912, and a process fluid recirculation circuit 914. The fan 912 draws air in through an inlet 916, across the tubular membrane heat exchanger module assemblies 902, and out through an outlet 918. The cooling tower 900 has a configuration generally referring to a swamp tower which precools air typically before entering a warehouse or residence without need for using a refrigeration system. Swamp towers are often utilized in low humidity climates with high dry bulb temperatures. The tubular membrane heat exchanger assemblies 902 are an improvement over conventional swamp cooler evaporation media because the tubular membrane heat exchanger assemblies 902 may not drift, foul, or suffer from dry rot. The cooling tower 900 further includes a makeup process fluid valve 920, a makeup process fluid supply 922, a drain valve 924, and a drain 926 which are operable to compensate for evaporation and accomplish blowdown. The cooling tower 900 may further include a dehumidification section utilizing solid or liquid desiccants. Alternatively or additionally, the cooling tower 900 may include a heating coil to facilitate heating of the air within the cooling tower 900.

Figure 10A:
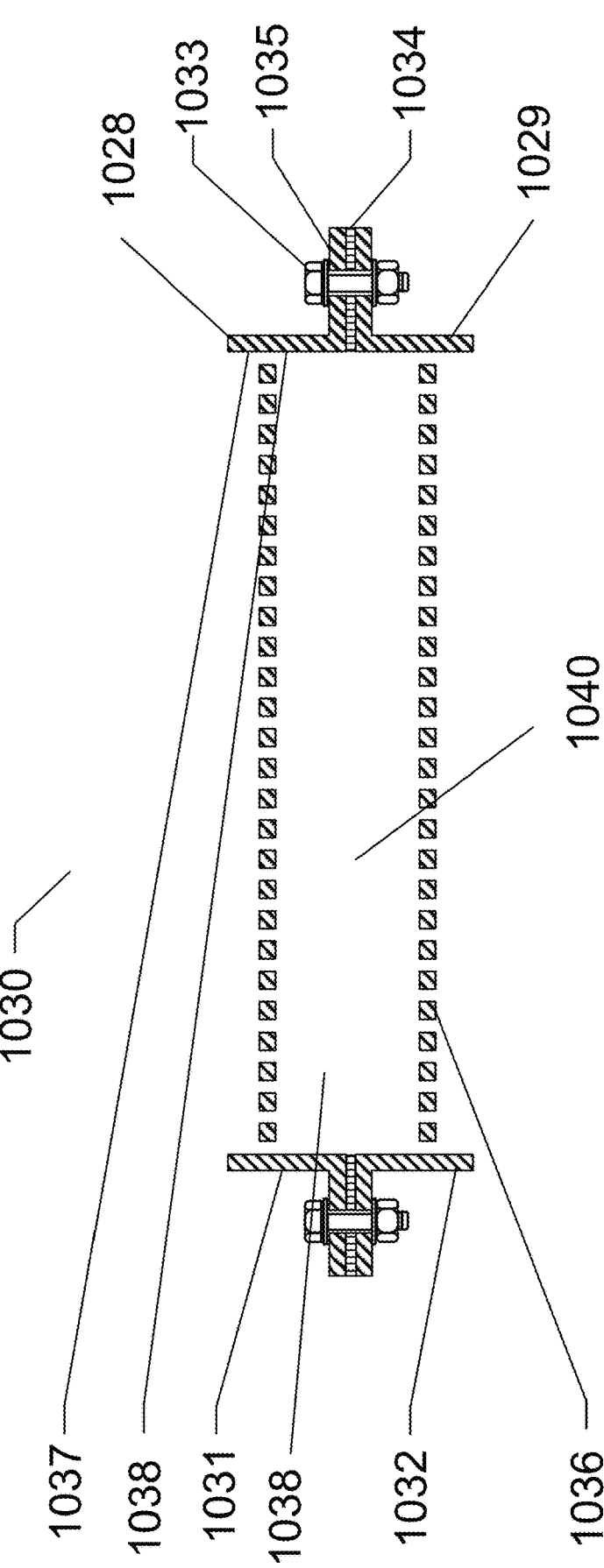
FIG. 10A is a cross-sectional view of a connection between lower and upper headers of upper and lower tubular membrane heat exchanger modules.

Referencing FIG. 10A, a connection 1030 is provided between a lower header 1031 of an upper tubular membrane heat exchanger module 1028 and an upper header 1032 of a lower tubular membrane heat exchanger module 1029. The connection 1030 may be utilized to connect the tubular membrane heat exchanger modules discussed herein. The connection 1030 includes fasteners, such as bolt, washer, and nut assemblies 1033, to secure connecting portions such as flanges 1035 of the upper and lower headers 1032, 1031. The connection 1030 includes a sealing element 1034, such as a gasket, foam tape, and/or butyl tape. The upper and lower headers 1032, 1031 include plate portions 1056 with apertures that receive tubular membranes and potting (not shown for clarity) similar to the header plate portions discussed above. The upper and lower headers 1032, 1031 include walls 1038 extending between the plate portions 1036 and the respective flanges 1035 that form a wetted compartment 1040. During assembly of the upper and lower tubular membrane heat exchanger modules 1028, 1029 to receive potting on an outer surface 1042 of the plate portions 1056.

Figure 10B:
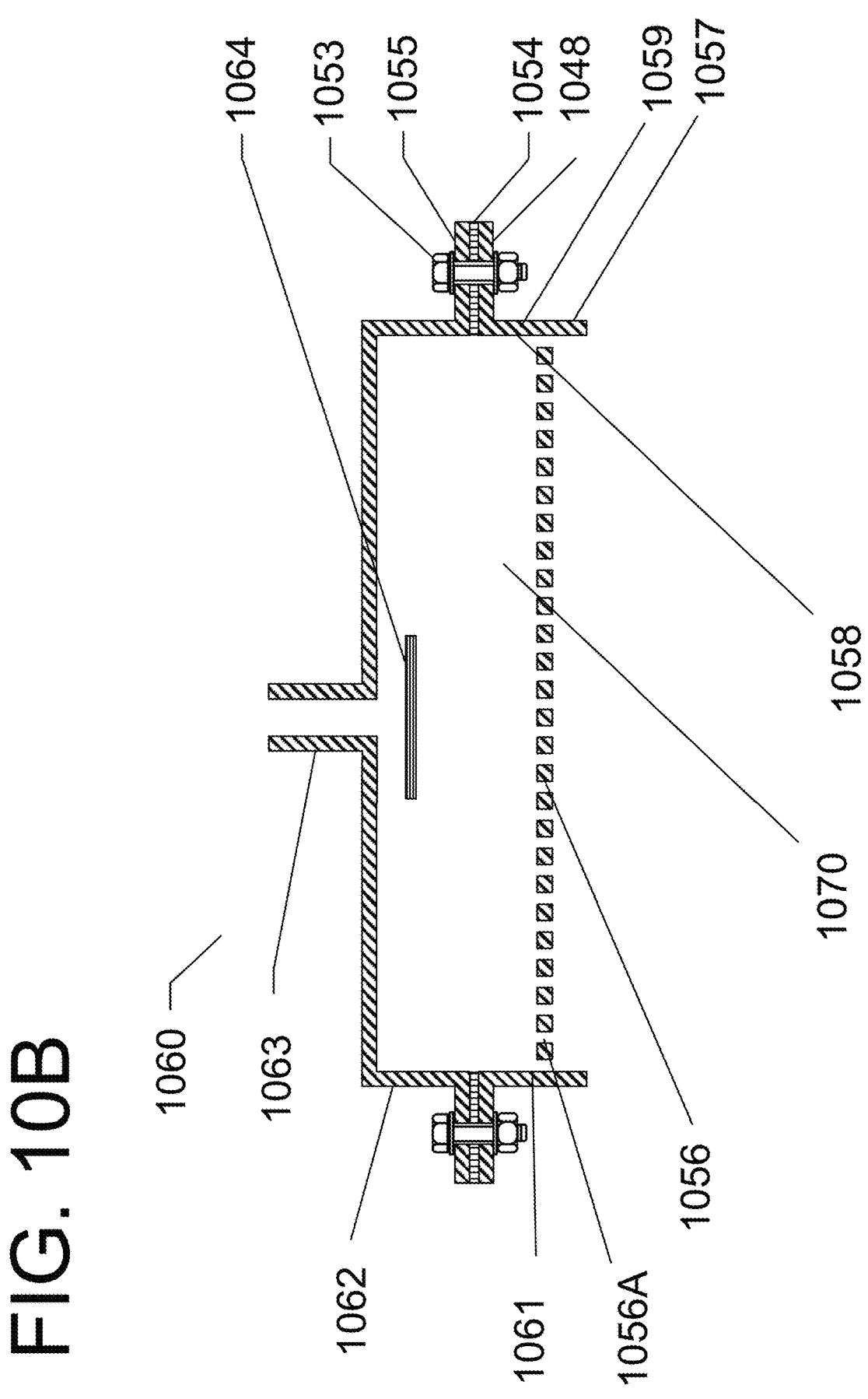
FIG. 10B is a cross-sectional view of a connection between a distribution header of an inlet manifold and an upper header of a tubular membrane heat exchanger module.

Regarding FIG. 10B, a connection 1060 between an upper header 1061 of a tubular membrane heat exchanger module 1059 and a distribution header 1062 of an inlet manifold is provided. The connection 1060 may be utilized to connect the tubular membrane heat exchanger modules, distribution headers, and collection headers discussed herein. The upper header 1061 has a flange 1048 that is secured to a flange 1055 of the distribution header 1062 via, for example, one or more fasteners such as assemblies 1053 of nuts, bolts, and washers. The connection 1060 includes one or more sealing elements 1054, such as a gasket, foam tape, and/or butyl tape, between the flanges 1055, 1048.

The distribution header 1062 has a process fluid inlet 1063 and optionally includes a deflector plate 1064. The deflector plate 1064 diverts process fluid to tubular membranes associated with apertures 1056A at a periphery of a header plate portion 1056 of the header 1061. The deflector plate 1064 helps evenly distribute the process fluid to all of the tubular membranes. The upper header 1061 of the tubular membrane heat exchanger module 1059 includes one or more walls 1058 extending between the header plate portion 1056 and the flange 1048 to form a recess 1070 for receiving potting.

Figure 11A:
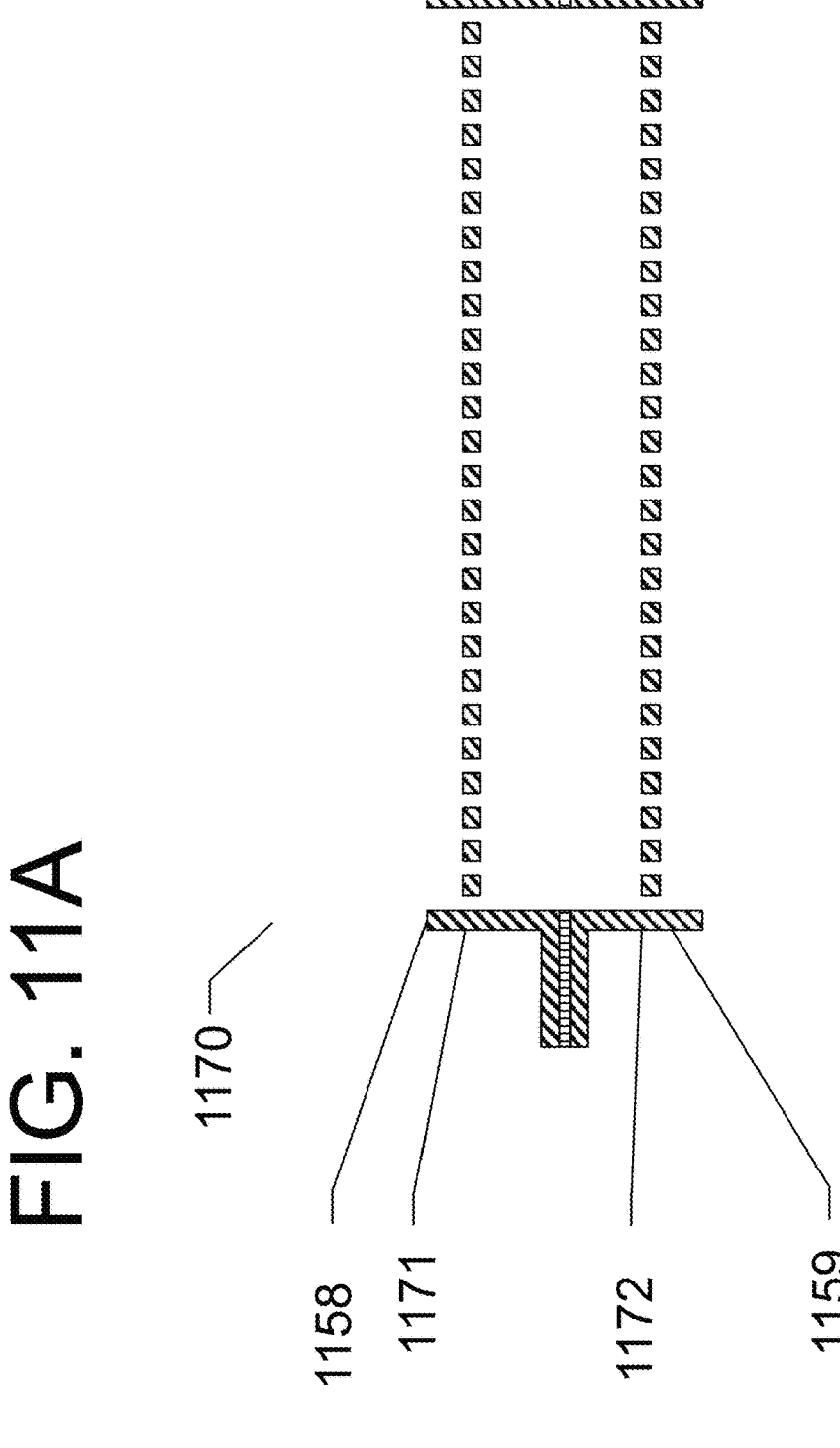
FIG. 11A is a cross-sectional view of a connection between a lower header of an upper tubular membrane heat exchanger module and an upper header of a lower tubular membrane heat exchanger module.

Regarding FIG. 11A, a connection 1170 is provided between a lower header 1171 of an upper tubular membrane heat exchange module 1158 and an upper header 1172 of a lower tubular membrane heat exchange module 1159. The connection 1170 is similar in many respects to the connection 1030 discussed above such that differences will be highlighted. For example, the connection 1170 includes flanges 1173 of the upper and lower headers that are secured together via a bonding agent such as epoxy 1174. The upper and lower headers 1172, 1171 may be made of plastic such that the epoxy 1174 bonds the material of the flanges 1173 together. The connection 1170 may additionally include one or more fasteners for clamping the flanges 1173 together.

Figure 11B:
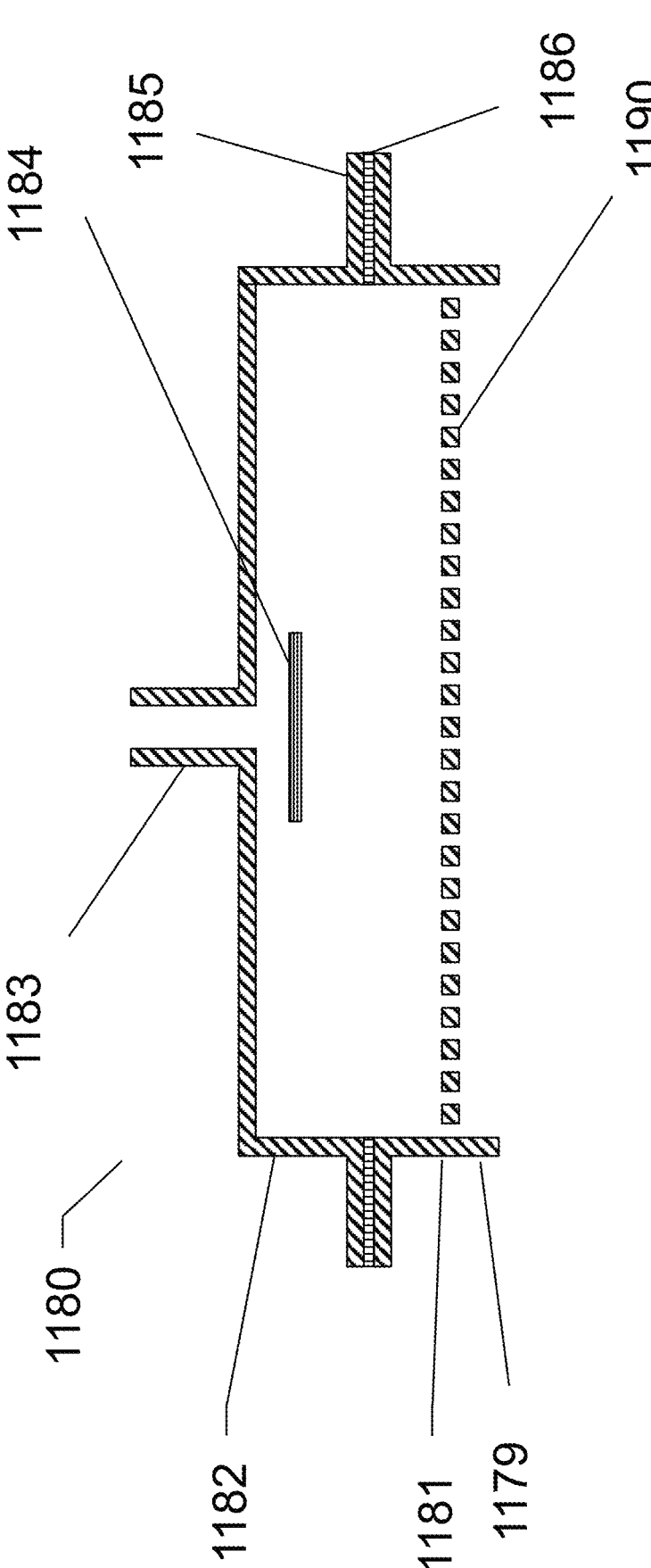
FIG. 11B is a cross-sectional view of a connection between a distribution header of an inlet manifold and an upper header of an upper tubular membrane heat exchanger module.

Referencing FIG. 11B, a connection 1180 between an upper header 1181 of a tubular membrane heat exchanger module 1179 and a distribution header 1182 is provided that is similar to the connection 1060 discussed above such that differences will be highlighted. The distribution header 1182 and upper header 1181 have flanges 1185 secured via a bonding agent such as epoxy 1186. The distribution header 1182 further includes a process fluid inlet 1183 and a distribution plate 1184. The distribution plate 1184 facilitates even distribution of process fluid to the tubular membranes connected to a header plate portion 1190 of the upper header 1181.

Figure 12A:
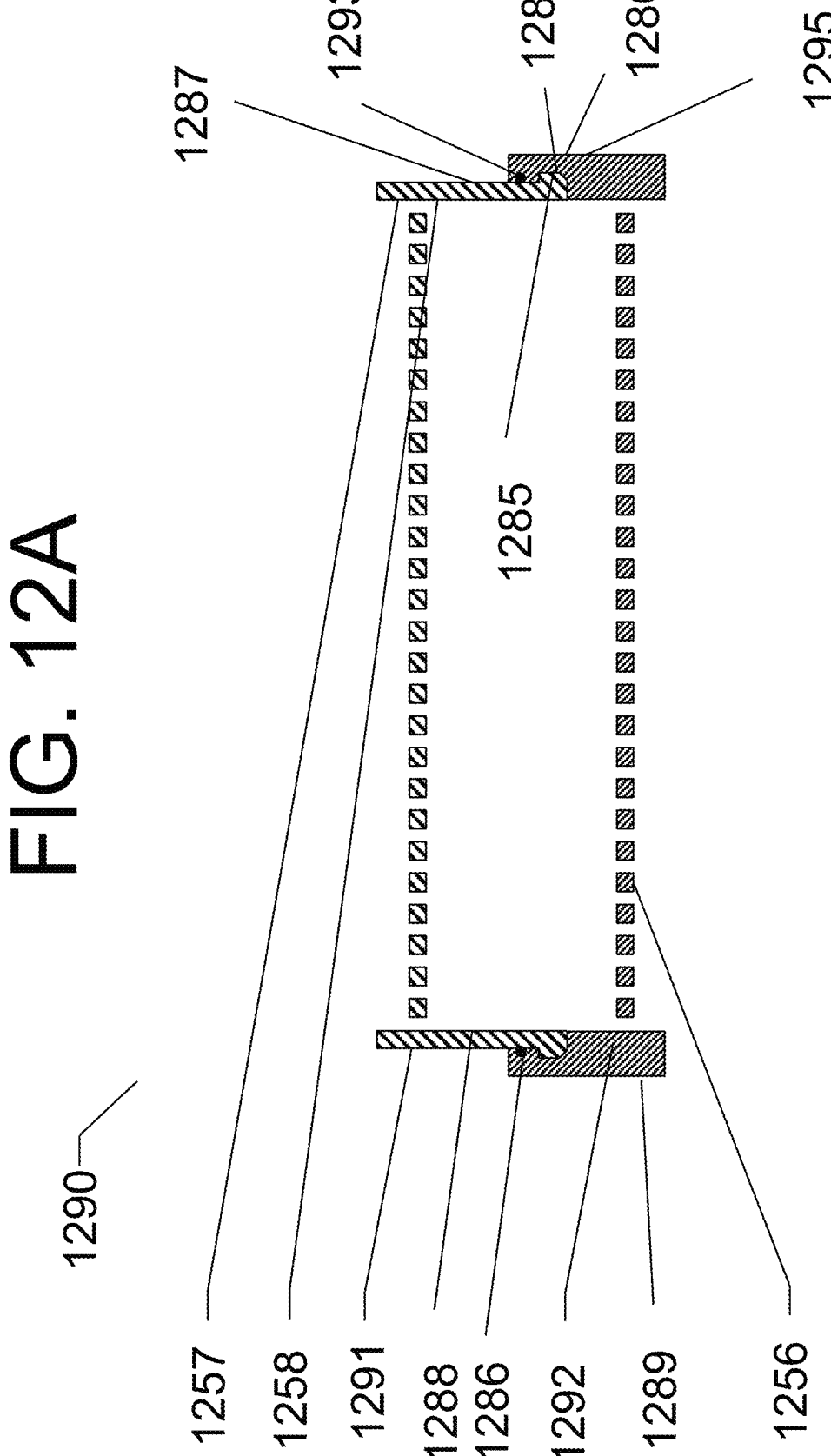
FIG. 12A is a cross-sectional view of a snap-fit connection between a lower header of an upper tubular membrane heat exchanger module and an upper header of a lower tubular membrane heat exchanger module.

Regarding FIG. 12A, a snap-fit connection 1290 is provided between a lower header 1291 of an upper tubular membrane heat exchanger assembly 1288 and an upper header 1292 of a lower tubular membrane heat exchanger 1289. The snap-fit connection 1290 may be utilized to connect the tubular membrane heat exchanger modules described herein. The lower header 1291 has a male configuration including a connecting portion 1287, such as one or more walls, configured to extend into an opening 1286 of a connecting portion 1286A of the upper header 1292. The portion 1287 of the lower header 1291 includes a snap-fit member, such as one or more protrusions 1285, configured to engage a snap-fit member of the upper header 1292, such as one or more wall portions 1295 having one or more recesses 1284. The snap-fit connection 1290 may be releasable or may be permanent.

The connection 1290 may further include a sealing element, such as a gasket or o-ring 1293, to facilitate sealing of the connected upper and lower headers 1292, 1291. The upper and lower headers 1292, 1291 may include plate portions 1256 with apertures for tubular membranes and/or fittings connecting the tubular membranes to the plate portions 1256. The upper and lower headers 1292, 1291 may further include wall portions 1257, 1258 that form recesses on opposite sides of the plate portions 1256 for receiving potting.

Figure 12B:
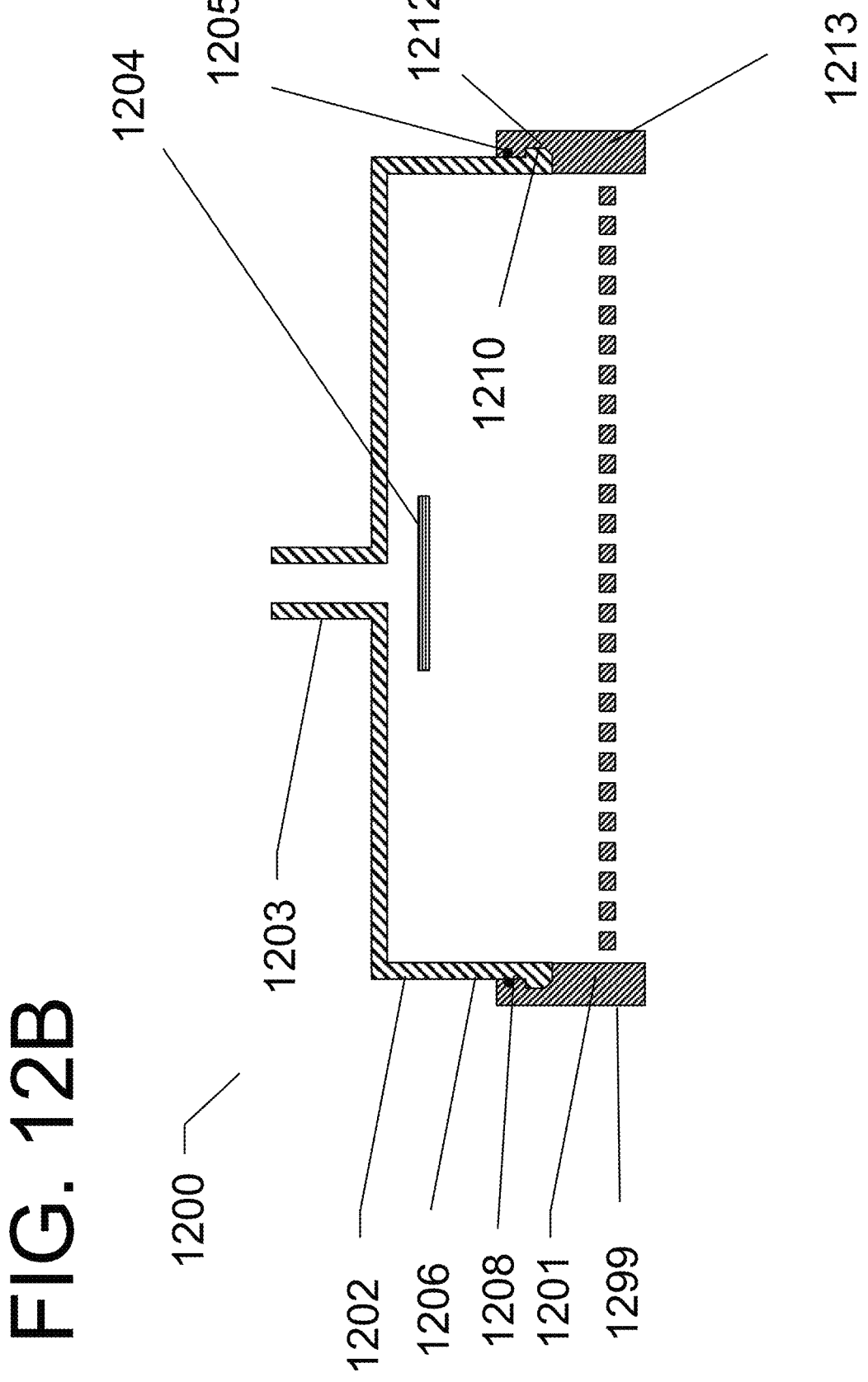
FIG. 12B is a cross-sectional view of a snap-fit connection between a distribution header of an inlet manifold and an upper header of an upper tubular membrane heat exchanger module.

A snap-fit connection 1200 is provided in FIG. 12B between a distribution header 1202 and an upper header 1201 of a tubular membrane heat exchanger module 1299. The connection 1200 is similar in many respects to the connection 1290 discussed above such that differences will be highlighted. The connection 1200 may be utilized to connect the tubular membrane heat exchanger modules, distribution headers, and collection headers discussed herein.

The distribution header 1202 has a male configuration with a portion 1206, such as one or more walls, configured to extend in an opening 1208 of the upper header 1201. The portion 1206 of the distribution header 1202 includes one or more snap-fit members, such as protrusions 1210, that engage one or more snap-fit members of the upper header 1201 such as one or more recesses 1212 of walls 1213. The connection 1200 may further include one or more sealing elements such as a gasket or o-ring 1205. In another embodiment, the sealing element includes a bonding agent such as epoxy. The distribution header 1202 includes a process fluid inlet connection 1203 and, optionally, a deflector plate 1204 for affecting the distribution of process fluid to the tubular membranes of the upper header 1201.

Figure 13A:
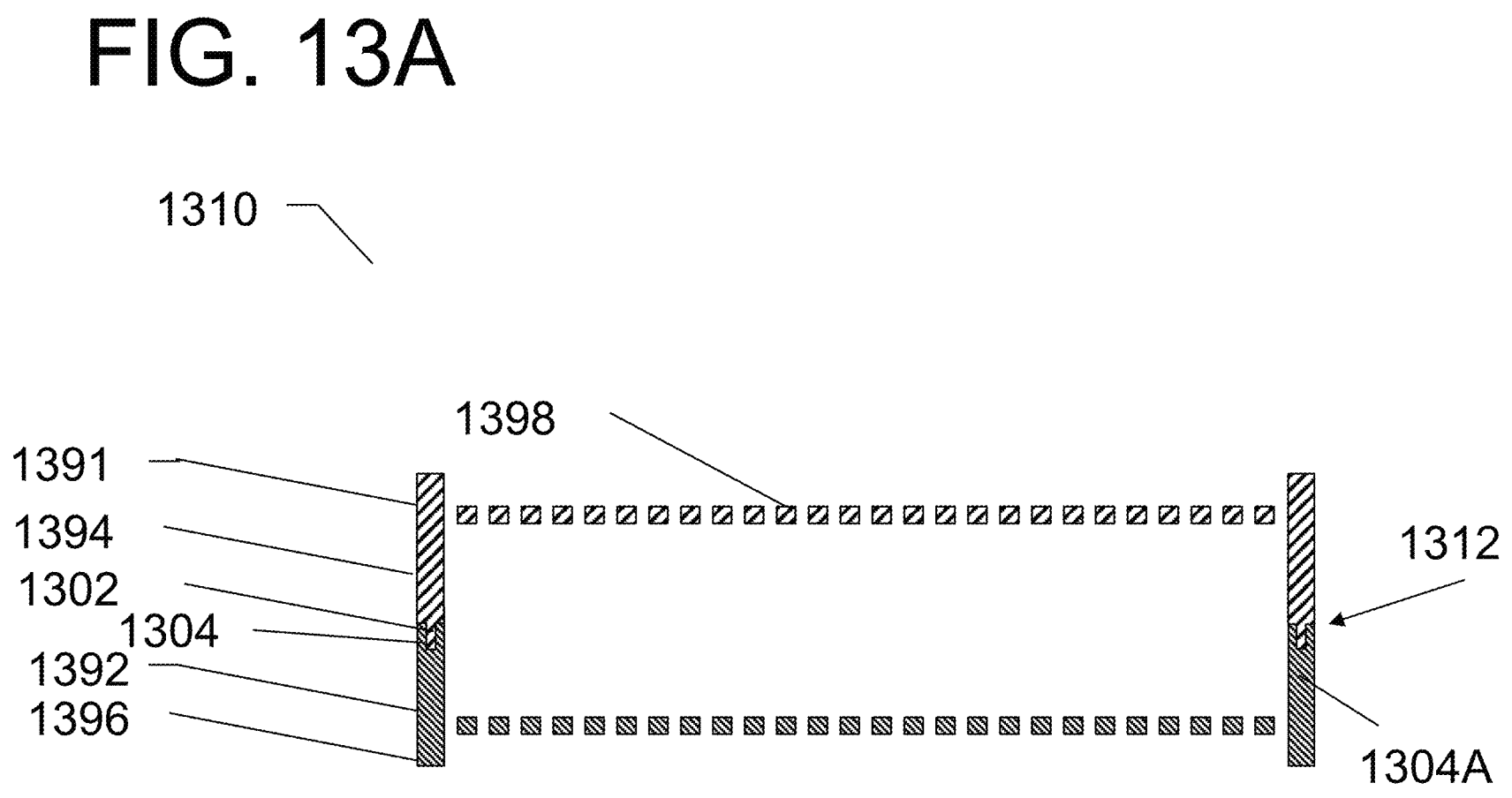

Regarding FIG. 13A, a slide connection 1310 is provided between a lower header 1391 of an upper tubular membrane heat exchanger module 1394 and an upper header 1392 of a lower tubular membrane heat exchanger module 1396. The slide connection 1310 may be utilized to connect the tubular membrane heat exchangers discussed above. The upper and lower headers 1392, 1391 include plate portions 1398 with apertures similar to the headers discussed above. The slide connection 1310 includes engaging portions 1312 configured to permit the upper and lower headers 1392, 1391 to be slidably connected. In one embodiment, the engaging portions 1312 include one or more projections such as walls 1302 of the lower header 1391 and a recess such as a groove 1304 of a connecting portion 1304A of the upper header 1392. The slide connection 1310 may be releasable or permanent. For example, the upper and lower headers 1392, 1391 may have a sealing element therebetween such as a gasket and fasteners for releasably securing the upper and lower headers 1392, 1391 together. As another example, the upper and lower headers 1392, 1391 may be glued to secure the upper and lower headers 1392, 1391 and form a seal therebetween.

Figure 13B:
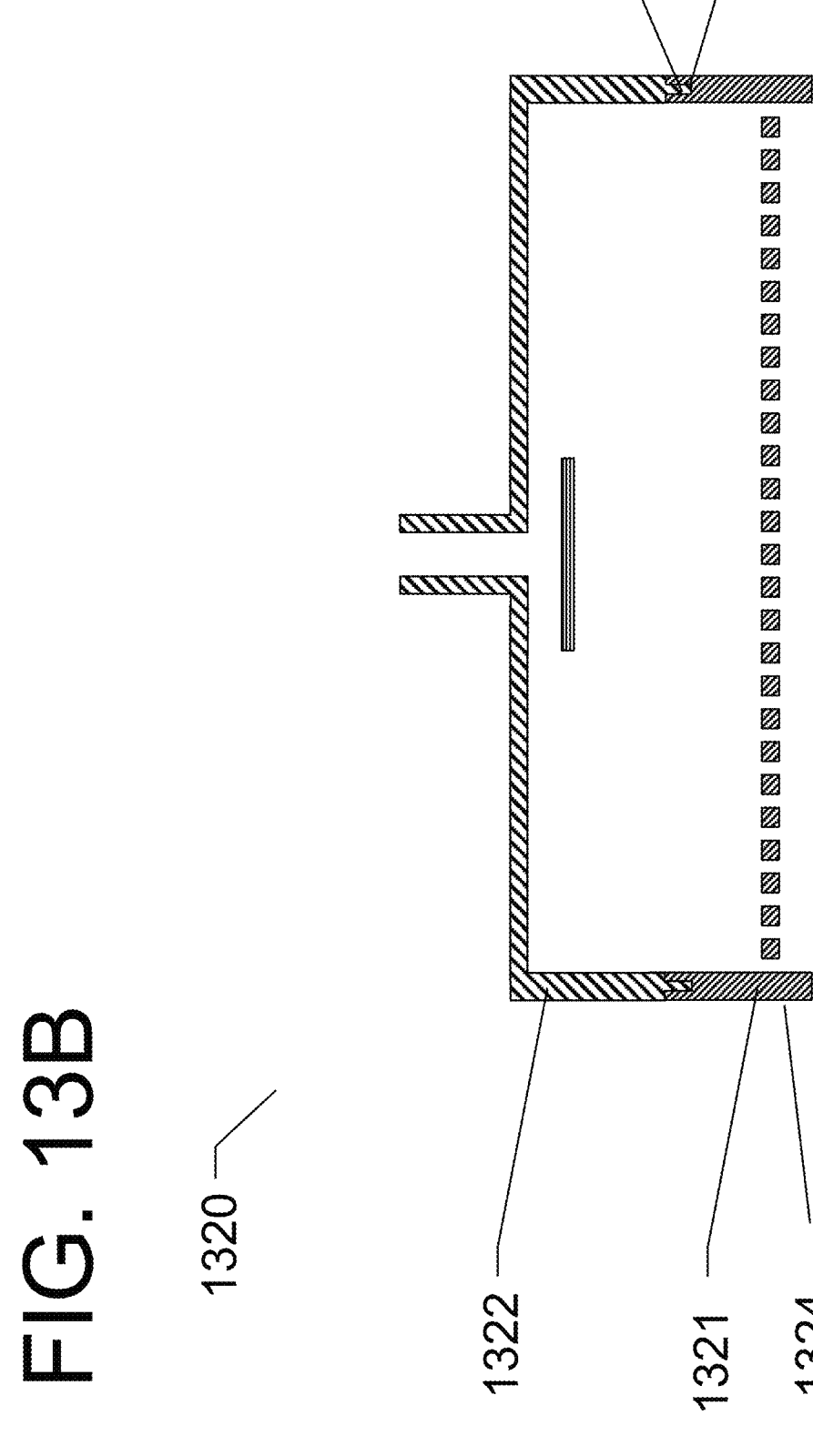
FIG. 13B is a cross-sectional view of a slide connection between a distribution header of an inlet manifold and an upper header of a tubular membrane heat exchanger module.

Referencing FIG. 13B, a slide connection 1320 is provided between a distribution header 1322 and an upper header 1321 of a tubular membrane heat exchanger module 1324 that is similar in many respects to the slide connection 1310 discussed above. The slide connection 1320 may be utilized to connect the tubular membrane heat exchange modules, distribution headers, and collection headers discussed above.

The slide connection 1320 includes engaging portions of the distribution header 1322 and upper header 1321 such as a walls 1326 of the distribution header 1322 configured to slide into recesses 1328 of the upper header 1321. The tubular membrane heat exchanger module 1324 by thereby be slid into connection with the distribution header 1322. The connection 1320 may be releasable or permanent and may include a sealing element. For example, the distribution header 1322 and upper header 1321 may be glued together to secure the distribution header 1322 and upper header 1321 and/or provide sealing therebetween.

Figure 14:
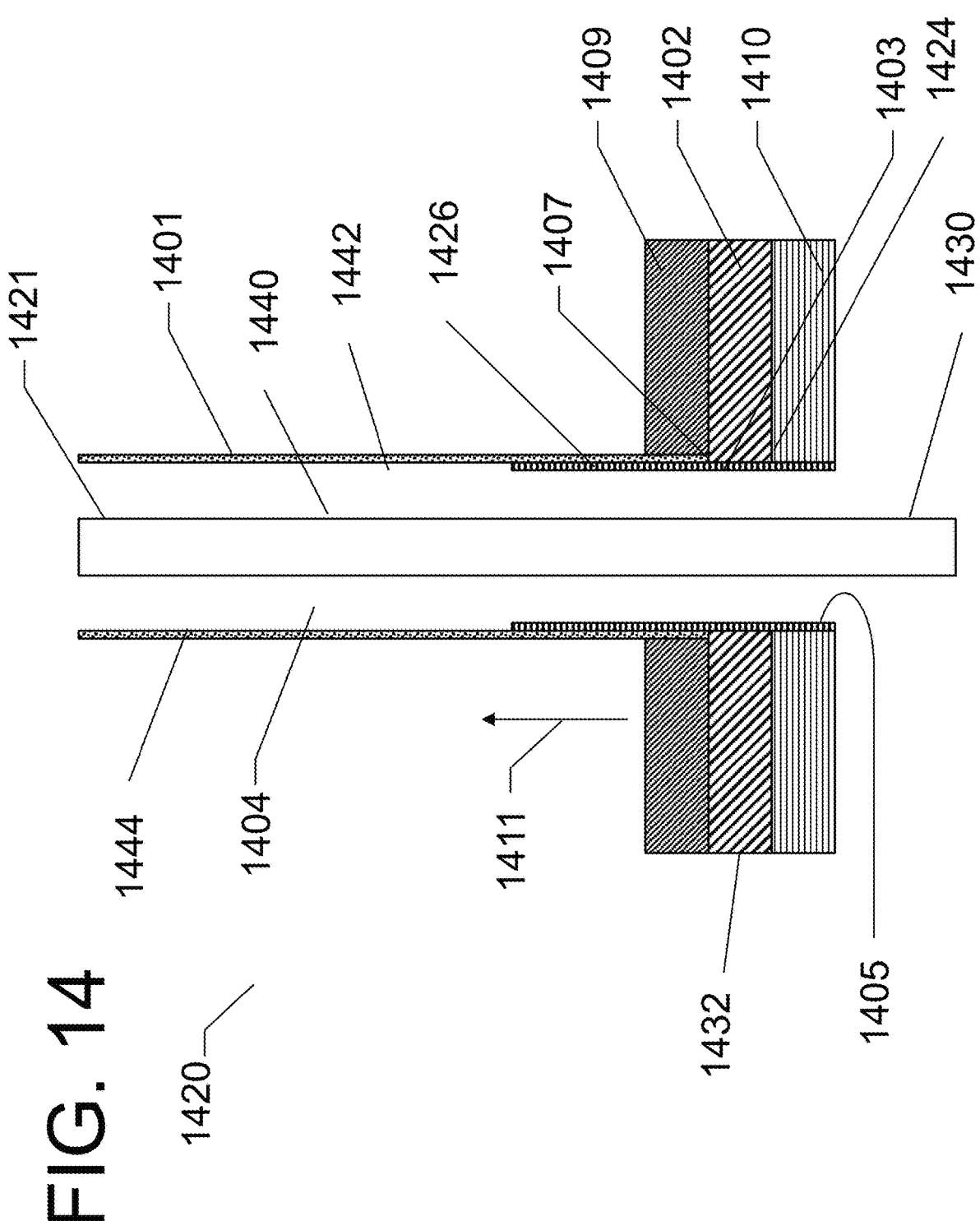
FIG. 14 is a cross-sectional view of a tubular membrane assembly including a rod extending in a lumen of a tubular membrane to resist movement of the tubular membrane.

A tubular membrane assembly 1420 is provided in FIG. 14 that includes a tubular membrane 1401 having a lumen 1404 and a support configured to resist movement, deformation, and/or kinking of the tubular membrane 1401. In one embodiment, the support includes a rod 1421 extending in the lumen 1404. The rod 1421 has an outer surface 1440 positioned to contact an inner surface 1442 of a side wall 1444 of the tubular membrane 1401 upon movement of the tubular membrane 1401 relative to the rod 1421. The rod 1421 is spaced from the tubular membrane inner surface 1442 and accommodates slight movements, as well as minor radial expansion and contraction, of the tubular membrane 1401 while keeping the tubular membrane 1401 generally straight and spaced from adjacent tubular membranes 1401.

The rod 1421 may extend a portion of, or the entirety of, the length of the lumen 1404. The rod 1421 may have a circular or a non-circular cross section. The rod 1421 may have a unitary, one-piece construction. In another embodiment, the support includes a plurality of rods 1421 in the lumen 1404.

The rod 1421 also reduces the depth of process fluid in the lumen 1404 in a direction perpendicular to the length of the rod 1421. In one embodiment, the rod 1421 and tubular membrane 1401 have circular cross-sections and the rod 1421 reduces a radial depth of the process fluid, such as water, in the lumen 1404. For water cooling applications, the reduced depth of water in the lumen 1404 may increase heat rejection performance of the tubular membrane assembly 1420. The rod 1421 may be made of a metallic, plastic, or ceramic material as some examples. The rod 1421 may be solid or tubular, as some examples.

The tubular membrane assembly 1420 includes header plate portion 1402 of a header 1432 having an opening 1424 that receives a fitting 1403. The tubular membrane 1401 has an end portion 1407 fit over an end portion 1426 of the fitting 1403. The header 1432 includes potting 1409 securing the tubular membrane end portion 1407 on the fitting 1403. The fitting 1403 includes an end portion 1405 protruding from the header plate portion 1402. The header 1432 includes potting 1410 securing the fitting 1403 to the header plate portion 1402 and inhibiting pull-through of the fitting 1403 in direction 1411. In one embodiment, the rod 1421 has an end portion 1430 secured to a wall of the header 1432 opposite the header plate portion 1402.

Figure 15:
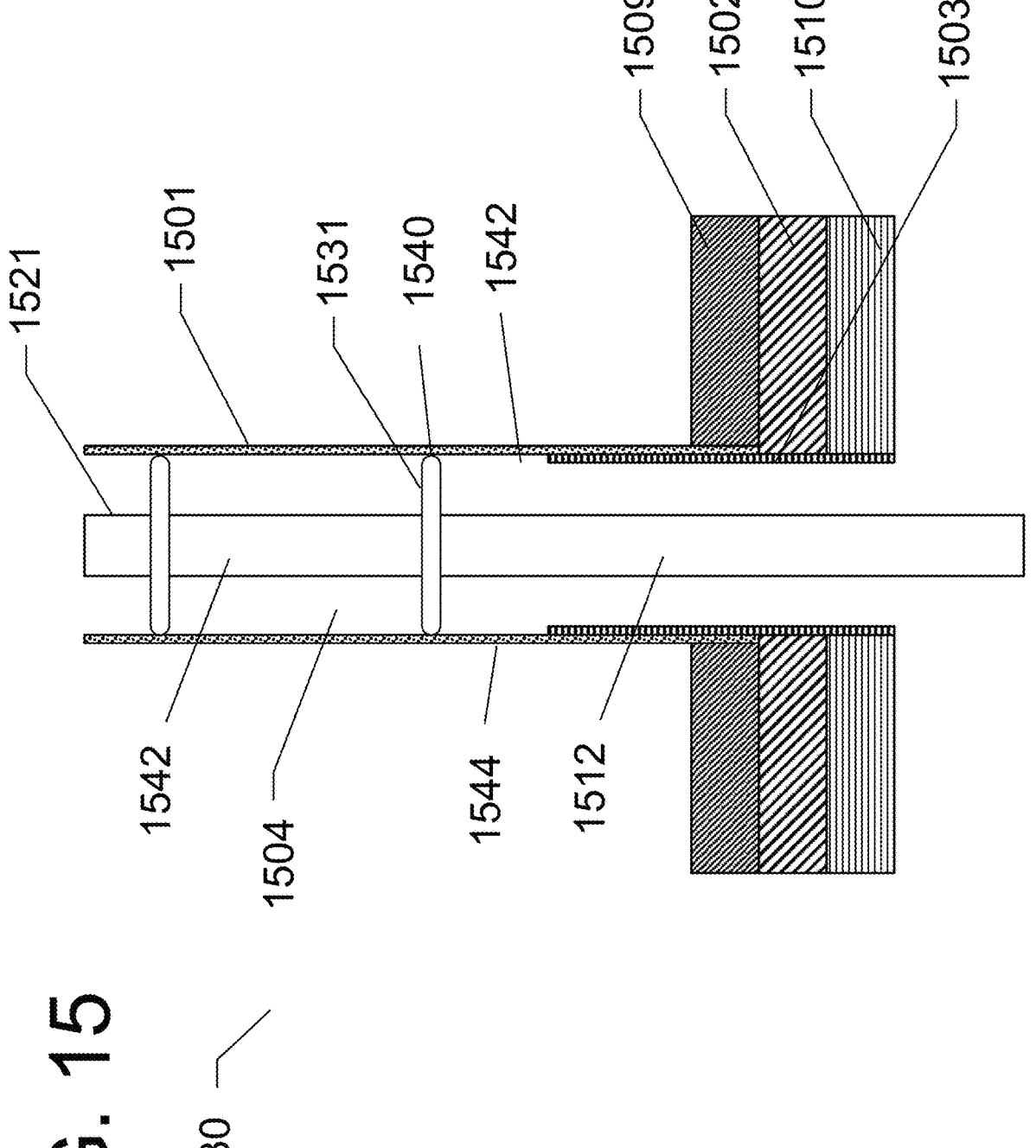
FIG. 15 is a cross-sectional view of a tubular membrane assembly including a rod and rings in a lumen of a tubular membrane to resist movement of the tubular membrane.

Regarding FIG. 15, a tubular membrane assembly 1530 is provided that is similar to the tubular membrane assembly 1420 such that differences will be highlighted. The tubular membrane assembly 1530 includes a tubular membrane 1501, a fitting 1503, a header plate portion 1502, and potting 1509, 1510. The tubular membrane assembly 1530 includes a support 1512 to resist movement and/or deformation of the tubular membrane 1501. In one embodiment, the support 1512 includes a rod 1521 and rings 1531 in a lumen 1504 of the tubular membrane 1501. The rings 1531 are radially outward from the rod 1521 and have radially outer edges 1540 contacting or spaced slightly from an inner surface 1542 of a side wall 1544 of the tubular membrane 1501 to resist movement and/or deformation of the tubular membrane 1501. In one embodiment, the support 1512 includes discs, which the rings 1531 are radially outward portions thereof, and the discs include openings or windows therebetween to permit process fluid to flow past the rings 1531. In another embodiment, rings 1531 are spaced radially from the rod 1521 and the support 1512 includes spokes connecting the rings 1531 to the rod 1521. The rod 1521 and rings 1531 may have a unitary, one-piece configuration in some embodiments and may be an assembly of discrete parts in other embodiments.

Figure 16:
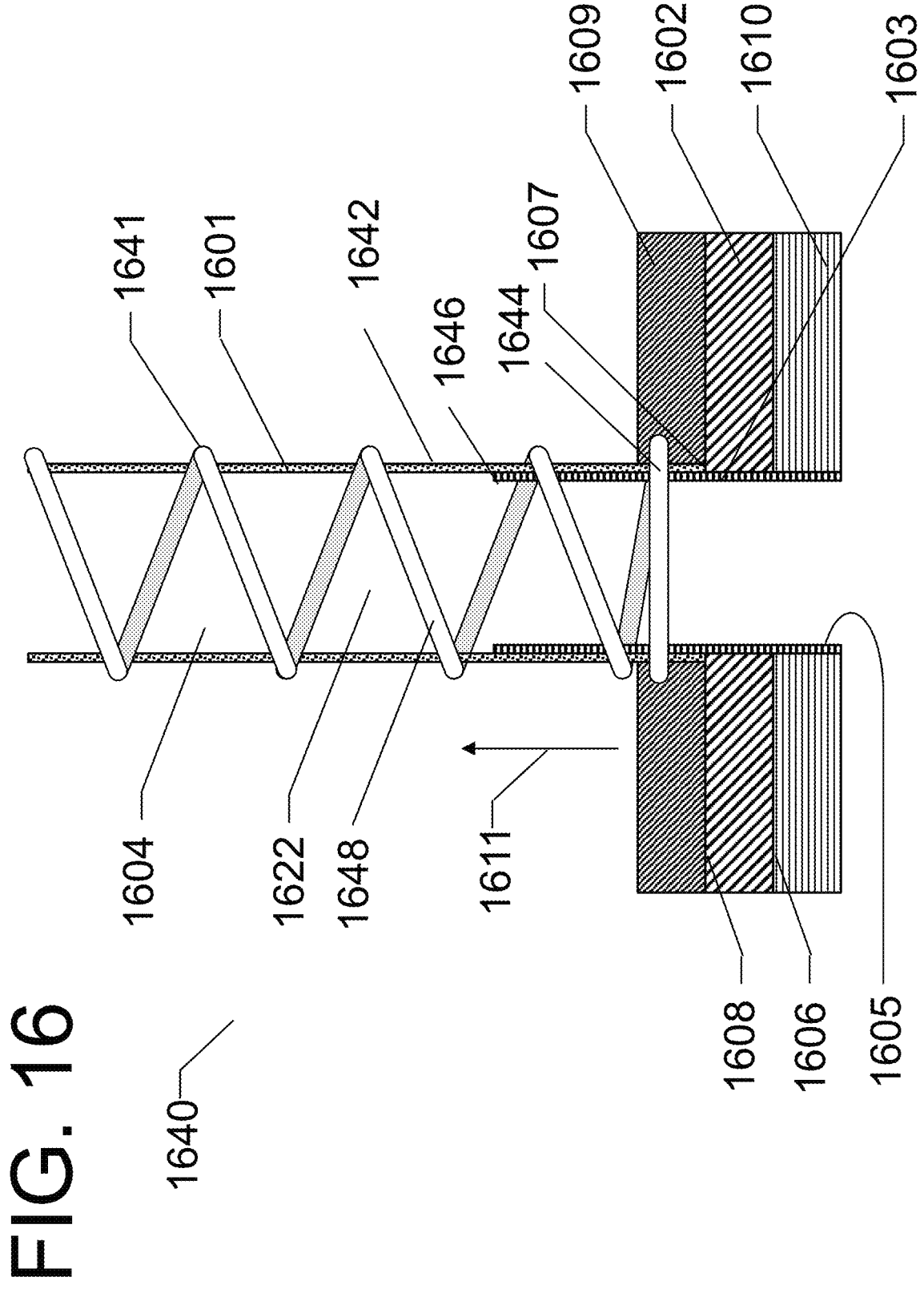
FIG. 16 is a cross-sectional view of a tubular membrane assembly including a helical support member extending about an exterior of a tubular membrane of the tubular membrane assembly to resist movement of the tubular membrane.

Turning to FIG. 16, a tubular membrane assembly 1640 is provided that is similar to the tubular membrane assemblies discussed above such that differences will be highlighted. The tubular membrane assembly 1640 includes a tubular membrane 1601, a fitting 1603, and a header plate portion 1602. The tubular membrane assembly 1640 further includes an external support, such as a helical support member 1641, extending about an exterior surface 1642 of the tubular membrane 1601. Process fluid may flow through a lumen 1622 of the tubular membrane 1601 while the helical support member 1641 supports the exterior of the tubular membrane 1601.

The helical support member 1641 has an end portion 1644 secured to the header plate portion 1602 such as by the end portion 1644 being embedded in potting 1609 on an outer surface 1608 of the header plate portion 1602. In one embodiment, the helical support member 1641 includes a coil spring. The coil spring may be made of a metallic or a plastic material as some examples.

The helical support member 1641 has turns 1648 that are placed in tension and/or are bent upon movement of the tubular membrane 1601. The helical support member 1641 is sufficiently strong to resist the movement of the tubular membrane 1601 and keep the tubular membrane 1601 in a straight configuration. In one embodiment, the helical support member 1641 may be resilient and applies a restorative force to the tubular membrane 1601 that increases the farther the tubular membrane 1601 displaces the helical support member 1641 in a manner similar to a spring. The helical support member 1641 may also resist deformation of the tubular membrane 1601, such as radial expansion and longitudinal elongation. The helical support member 1641 may resist longitudinal elongation by inhibiting the tubular membrane 1601 from bowing outward and keeping the tubular membrane 1601 in a generally straight configuration.

The tubular membrane assembly 1640 further includes potting 1610 on an inner surface 1606 of the header plate portion 1602 to secure an end portion 1605 of the fitting 1603 to the header plate portion 1602 against pull-through in direction 1611. The tubular membrane 1601 has an end portion 1607 fit over an end portion 1646 of the fitting 1603. The end portion 1644 of the helical support member 1641, in combination with the potting 1609, resists radial expansion of the tubular membrane end portion 1607 and keeps the tubular membrane end portion 1607 engaged with the fitting end portion 1646.

Figure 17:
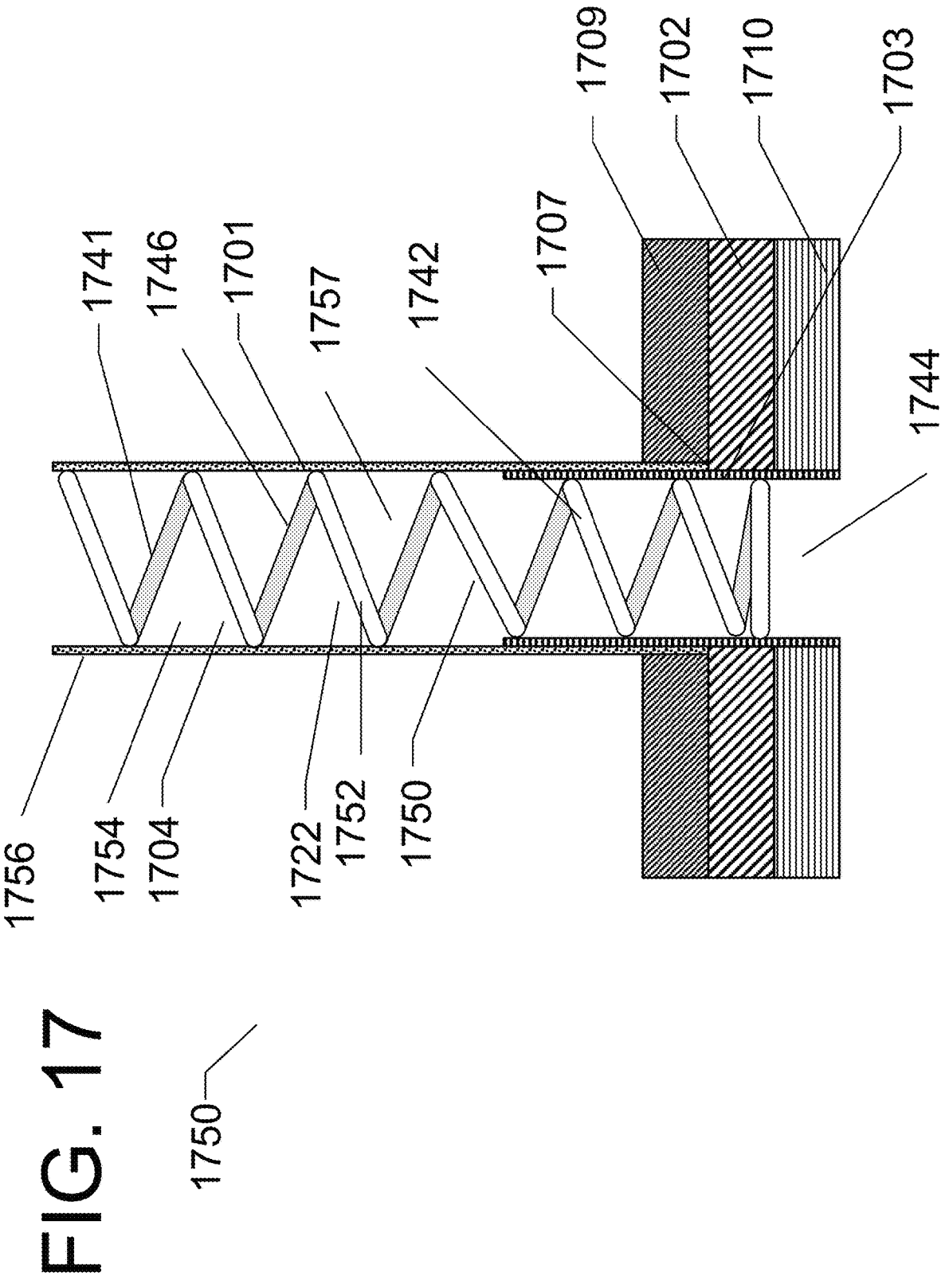
FIG. 17 is a cross-sectional view of a tubular membrane assembly including a helical support member in a lumen of a tubular membrane of the tubular membrane assembly to resist movement of the tubular membrane.

Regarding FIG. 17, a tubular membrane assembly 1750 is provided that is similar to the tubular membranes discussed above such that differences will be highlighted. The tubular membrane assembly 1750 includes a tubular membrane 1701, a fitting 1703, and a header plate portion 1702. The tubular membrane assembly 1750 includes an internal support, such as a helical support member 1741 in a lumen 1722 of the tubular membrane 1701.

The helical support member 1741 includes an end portion 1742 received in a through opening 1744 of the fitting 1703. The helical support member 1741 is secured to the fitting 1703. In one embodiment, the through opening 1744 and the end portion 1742 have circular cross sections with an outer diameter of the end portion 1742 forming a press-fit engagement with an inner diameter of the fitting through opening 1744. The press-fit engagement operates as an anchor point for the helical support member 241 so that the end portion 1742 of the helical support member 1741 remains fixed to the fitting 1703 while an intermediate portion 1746 of the helical support member 1741 may shift and flex as the intermediate portion 1746 resists deformation of the tubular membrane 1701. In another embodiment, the helical support member end portion 1742 may be secured to the fitting 1703 by, for example, adhesive, epoxy, a weld, a fastener, and/or engaging structures of the helical support member 1741 and the fitting 1703.

The helical support member 1741 has turns 1750 with outer surfaces 1752 configured to contact an inner surface 1754 of a side wall 1756 of the tubular membrane 1701. The turns 1750 extend about a central through opening 1757 that permits process fluid to flow through the helical support member 1741 in the lumen 1722 of the tubular membrane 1701. In one embodiment, the helical support member 1741 includes a coil spring. The helical support member 1741 may be made of a metallic or a plastic material. The tubular membrane assembly 1750 includes potting 1709 securing an end portion 1707 of the tubular membrane 1701 to the fitting 1703 and potting 1710 securing the fitting 1703 to the header plate portion 1702.

Figure 18:
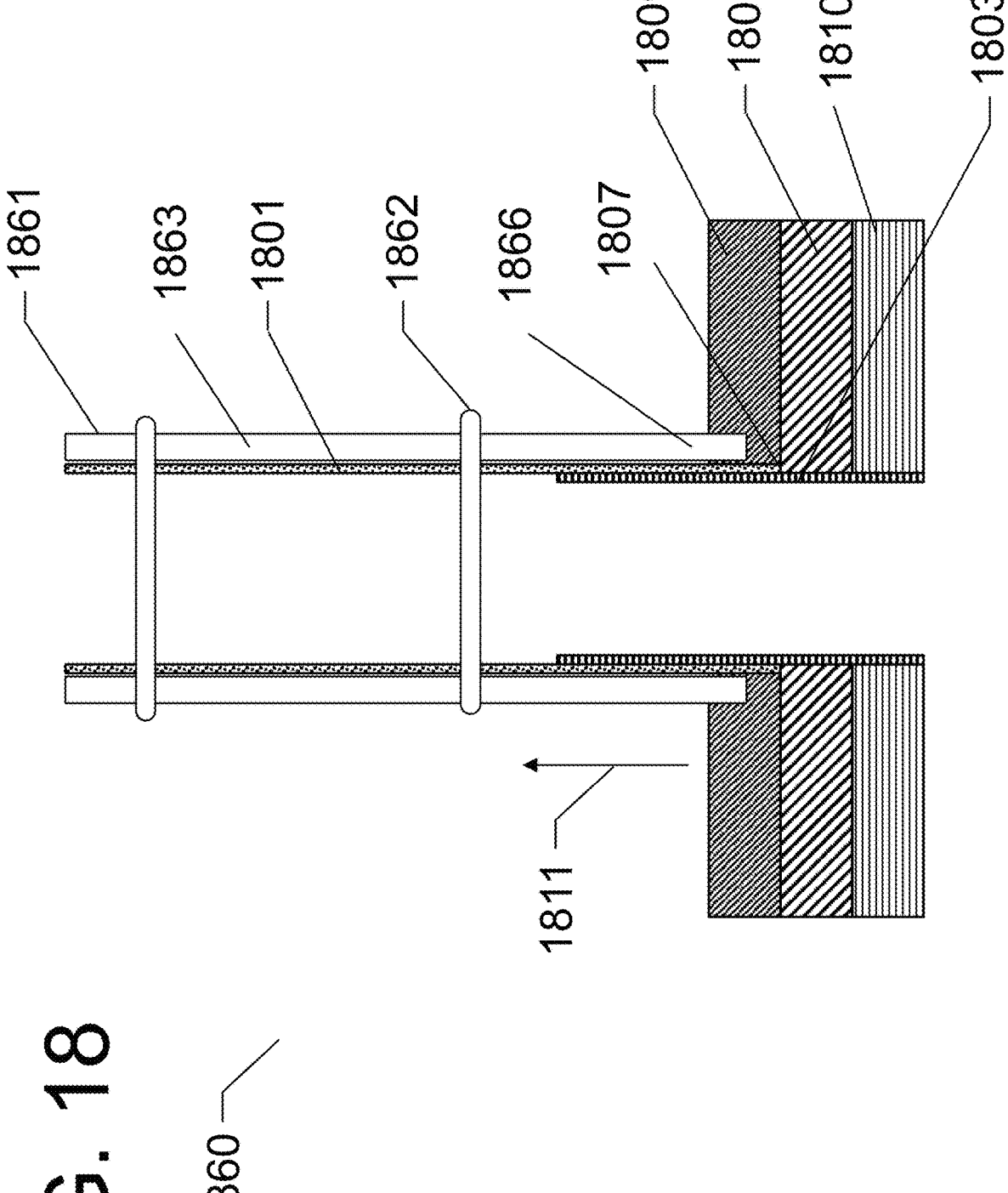
FIG. 18 is a cross-sectional view of a tubular membrane assembly including an external brace for resisting movement of a tubular membrane of the tubular membrane assembly.

Referencing FIG. 18, a tubular membrane assembly 1860 is provided that is similar in many respects to the tubular membrane assemblies discussed above such that differences will be highlighted. The tubular membrane assembly 1860 includes a tubular membrane 1801, a fitting 1803, a header plate portion 1802, and potting 1809, 1810. The tubular membrane assembly 1860 includes an external support, such as a brace 1861, for resisting deformation of the tubular membrane 1801. The brace 1861 includes one or more wires 1863 and one or more rings 1862 at spaced locations along the wires 1863. The rings 1862 may be located at regular or irregular intervals along the wires 1863. The wires 1863 have end portions 1866 embedded in the potting 1809 to anchor the wires 1863 to the header plate portion 1802. The brace 1861 may have a unitary, one-piece construction or may be an assembly. The tubular membrane assembly 1860 may further include potting 1810 to resist pull-through of the fitting 1803 in direction 1811.

Figure 19:
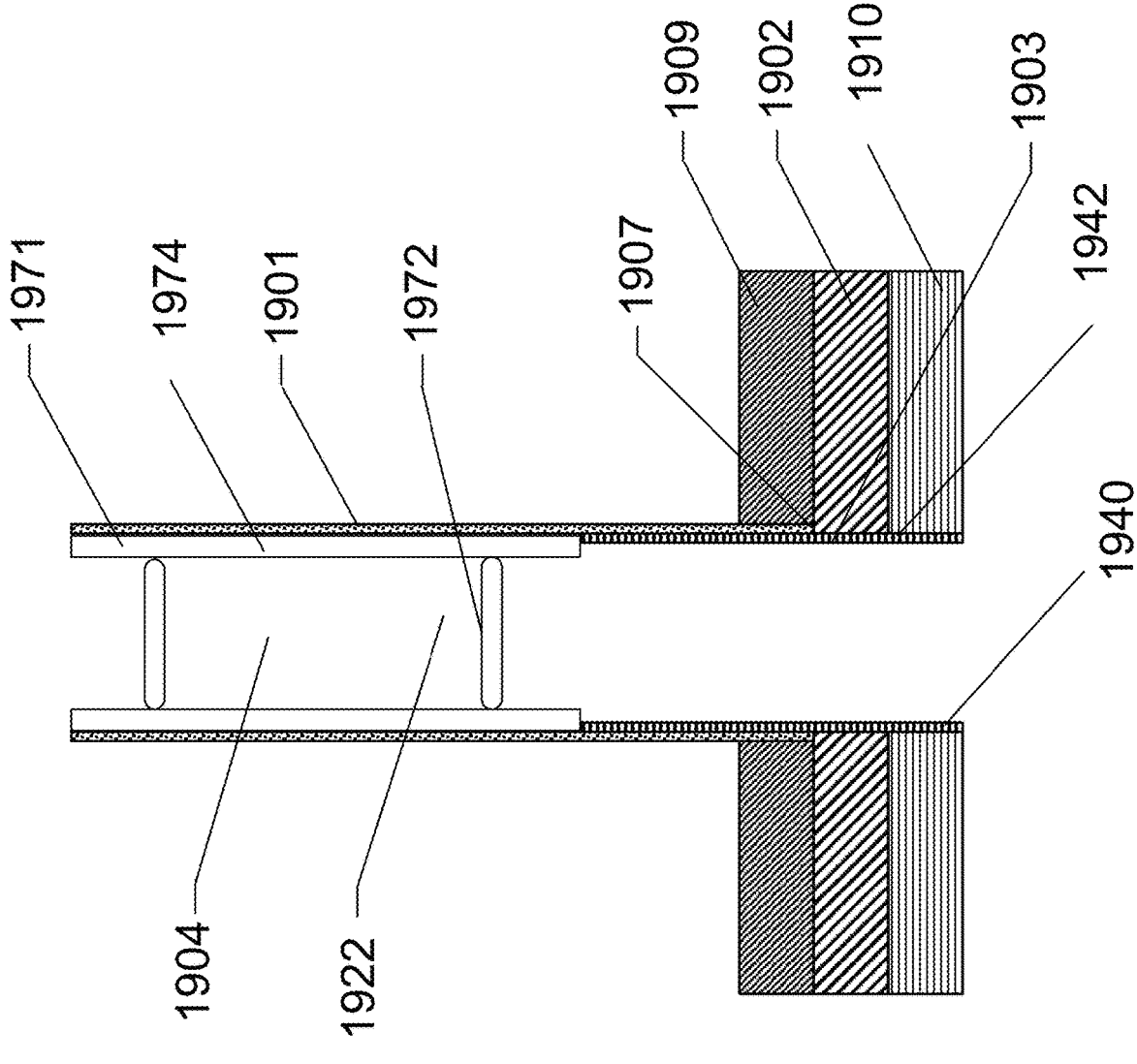
FIG. 19 is a cross-sectional view of a tubular membrane assembly including an internal brace for resisting movement of a tubular membrane of the tubular membrane assembly.

Turning to FIG. 19, a tubular membrane assembly 1970 is provided that is similar in many respects to the tubular membrane assemblies discussed above such that differences will be highlighted. The tubular membrane assembly 1970 includes a tubular membrane 1901, a header plate portion 1902, a fitting 1903, and potting 1909, 1910. The tubular membrane assembly 1970 includes an internal support, such as a brace 1971, in a lumen 1904 of the tubular membrane 1901. The brace 1971 includes one or more vertical supports, such as rods or wires 1974, and one or more horizontal supports, such as rings 1972, at regular or irregular intervals along the wires 1974. The wires 1974 are configured to have a limited amount of longitudinal thermal expansion throughout the operating temperature range of the tubular membrane assembly 1970. The limited longitudinal thermal expansion of the wires 1974 keeps the wires 1974 extending straight despite the tubular membrane 1901 elongating due to absorption of fluid by the material of the tubular membrane 1901. The wires 1974 thereby keep the tubular membrane 1901 in a straight configuration throughout the operating temperature and fluid flow range of the tubular membrane assembly 1970. Further, the rings 1972 are configured to resist movement of the wires 1974 toward and away from each other. The brace 1971 generally forms an internal backbone providing rigidity for the flexible tubular membrane 1901 and keeps the tubular membrane 1901 in a straight configuration.

The brace 1971 may be secured to the fitting 1903, such as a portion of the brace 1971 engaging an inner diameter of the fitting 1903. As one example, the wires 1974 may be welded or adhered to the fitting 1903. As another example, ends of the wires 1974 may exit openings in a side wall 1940 of an end portion 1942 of the fitting 1903 and be embedded in the potting 1910. The brace 1971 may be made of a metallic or plastic material. The brace 1971 may have a unitary, one-piece construction or may be an assembly.

Figure 21:
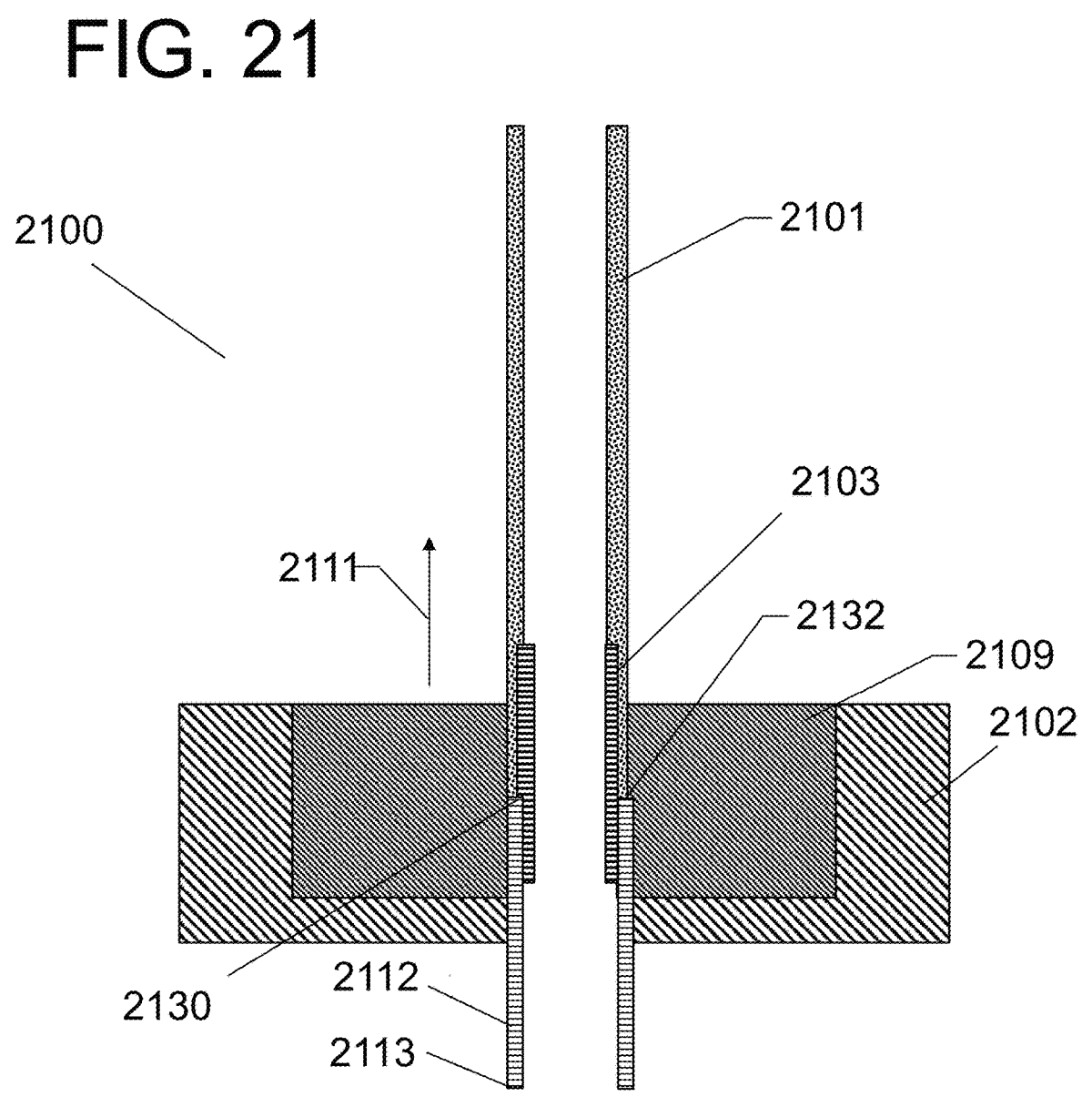

Regarding FIG. 21, a tubular membrane assembly 2100 is provided having a tubular membrane 2101, a tube 2112, and a fitting 2103 connecting the tubular membrane 2101 and the tube 2112. The tube 2112 has an end 2113 for connecting to another component, such as a fitting, a tube, or a valve. The tube 2112 may be made of, for example, vinyl tubing, braided nylon tubing, rubber, steel braided tube, PVC, or another material.

The tubular membrane assembly 2100 has a cup shaped mold 2102 and potting 2109 holding together the tubular membrane 2101, tube 2105, and fitting 2103 and resisting pull-through in direction 2111. The cup shaped mold 2102 may be included in the finished product or may be removed once the potting 2109 has set. In the embodiment of FIG. 21, the fitting 2103 is sized to fit in lumens of the tubular membrane 2101 and the tube 2112 such that the tubular membrane 2101 and the tube 2112 have abutting ends 2130, 2132 that encircle the fitting 2103.

Figure 22:
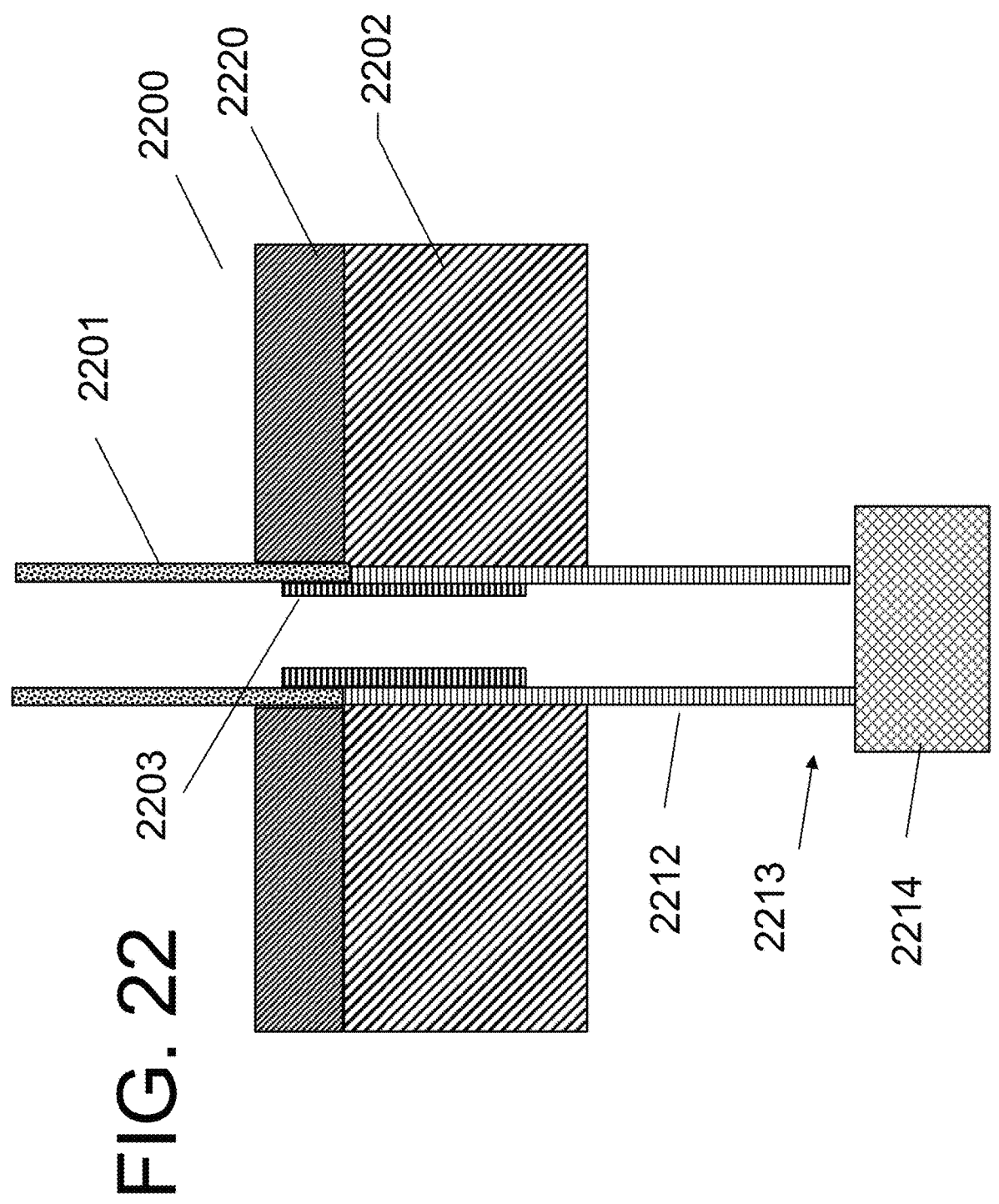
FIG. 22 is a cross-sectional view of a tubular membrane assembly having a tube with an end connection.

With respect to FIG. 22, a tubular membrane assembly 2200 is provided that is similar to the tubular membrane assembly 2100. The tubular membrane assembly 2200 has a tubular membrane 2201, a header plate 2202, a fitting 2203, a tube 2212, and potting 2220. The tube 2212 has an end portion 2213 with a connection 2214. The connection 2214 may be, for example, a thread, a welded connection, a solvent-welded connection, a soldered connection, a barb, a compression fitting, or a push-to-connect fitting as some examples.

Figure 23:
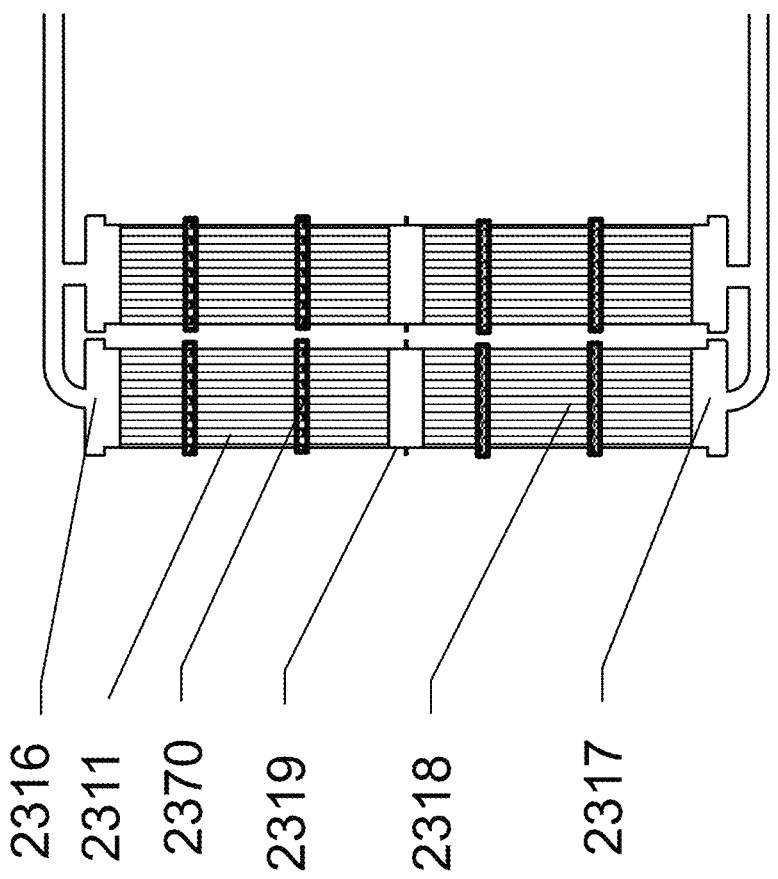
FIG. 23 is a schematic view of tubular membrane heat exchanger modules having supports intermediate headers of the tubular membrane heat exchanger modules.

The tubular membrane heat exchangers disclosed herein may utilize various supports to maintain separation and orientation of the tubular membranes. In one embodiment, the supports maintain an even spacing between the tubular membranes of the tubular membrane heat exchanger. For example and with reference to FIG. 23, one or more support plates 2370 may be provided along tubular membranes 2311 between an upper header 2316 and a center header 2319 and/or between the center header 2319 and a lower header 2317. The support plates 2370 may have spacings therebetween that are uniform or varied along the tubular membranes 2311. The support plates 2370 may be attached to the tubular membranes 2311 such as via adhesive or a chemical weld. Alternatively or in addition, the support plates 2370 may be attached to the tubular membranes 2311 via a mechanical connection such as an interference fit between the tubular membranes 2311 and the support plates 2370.

Figure 24:
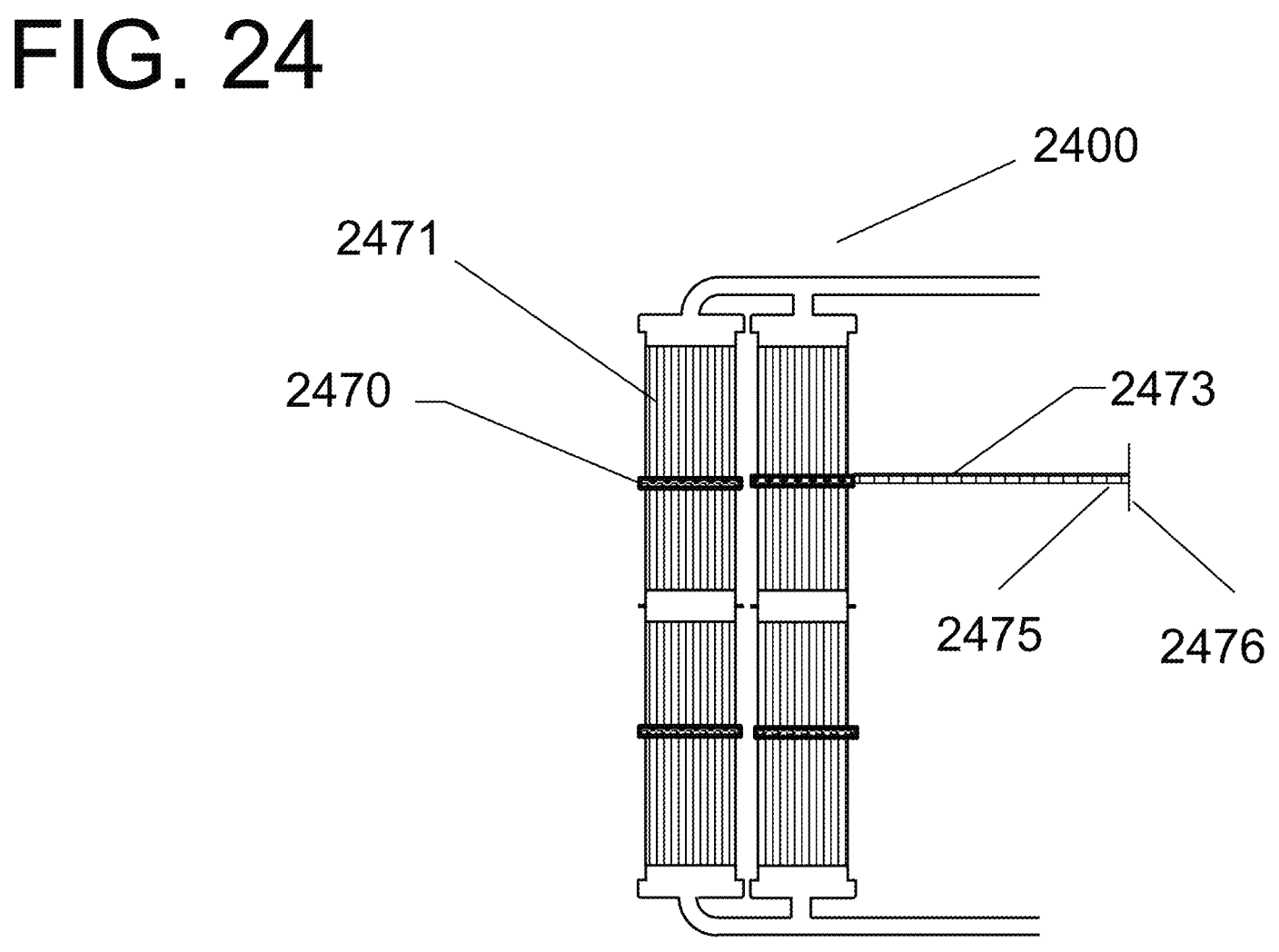

Regarding FIG. 24, a tubular membrane heat exchanger 2400 is provided having a support plate 2470 attached to tubular membranes 2471. The tubular membrane heat exchanger 2400 has a support member 2473 connected to, or integral with, the support plate 2470. The support member 2473 has an end portion 2475 configured to be secured to a surface 2476, such as an inner surface of a side wall of an outer structure of a heat rejection apparatus containing the tubular membrane heat exchanger 2400. The support member 2473 provides a rigid support for the support plate 2470 to keep the support plate 2470 in position along the tubular membranes 2471.

Figure 25:
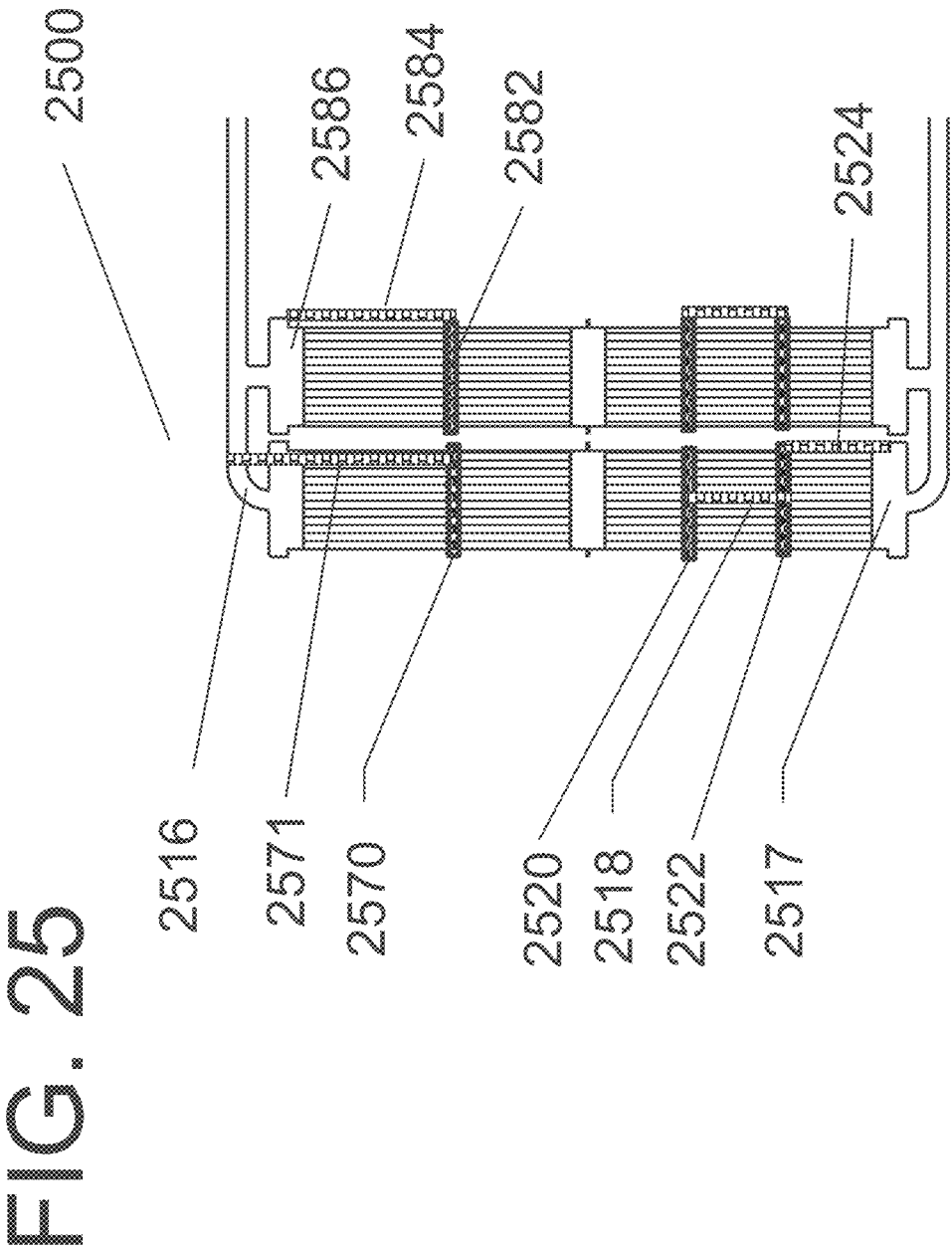
FIG. 25 is a schematic view of tubular membrane heat exchanger modules having support members connecting support plates to headers and tubing.

Regarding FIG. 25, a tubular membrane heat exchanger 2500 is provided having support members connecting support plates of the tubular membrane heat exchanger 2500 to other components of the tubular membrane heat exchanger 2500. A support member 2571 connects support plate 2570 to a header inlet tube 2516. A support member 2584 connects support plate 2582 to inlet header 2586. A support member 2518 connects support plates 2520, 2522 and a support member 2524 connects support plate 2522 to an outlet header 2517. Different configurations of support members may be utilized to maintain the position of the support plates on the tubular membranes.

Figure 26:
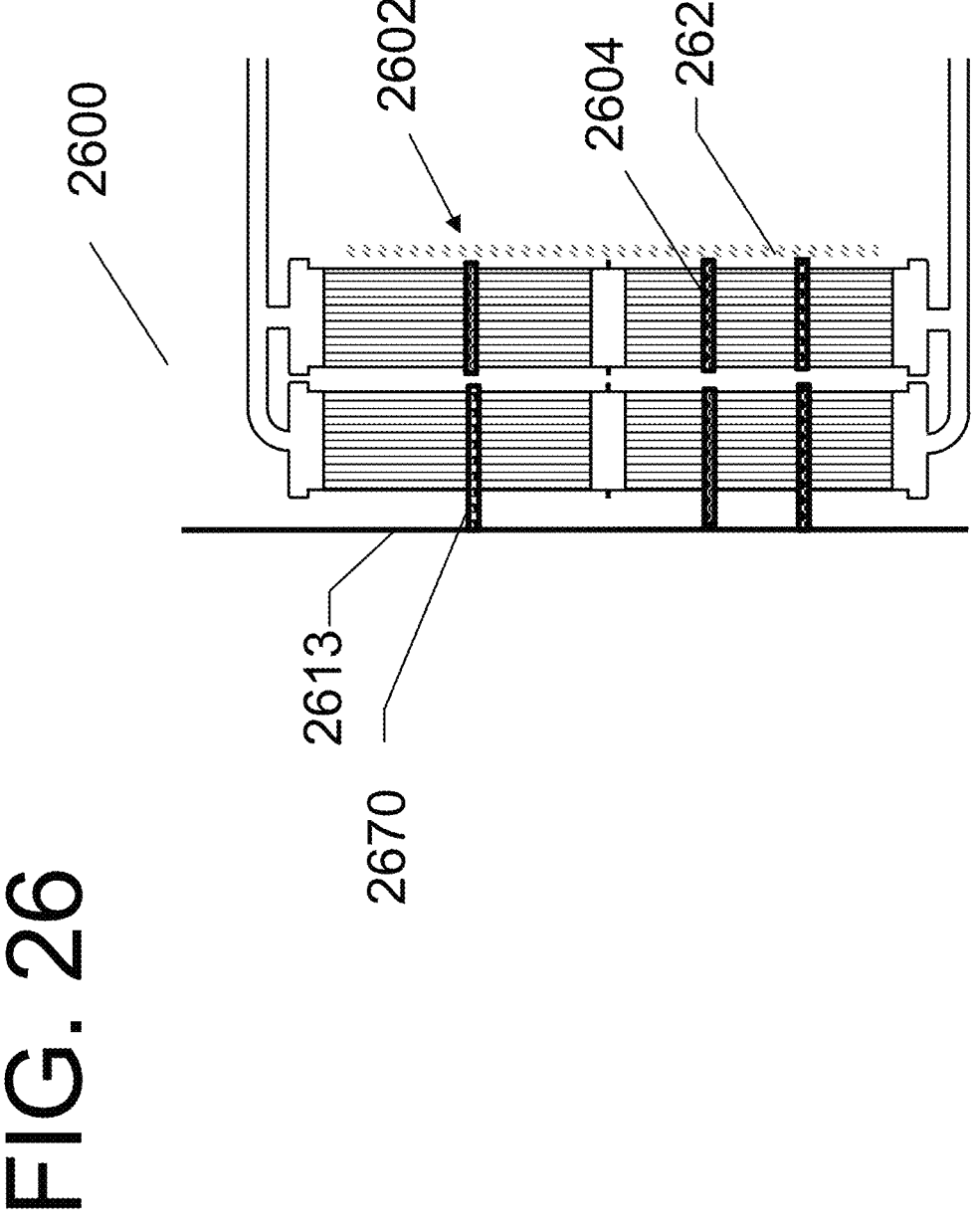
FIG. 26 is a schematic view of tubular membrane heat exchanger modules of a cooling tower having support plates secured to a wall of the cooling tower.

In FIG. 26, a tubular membrane heat exchanger 2600 is provided that has support members 2602 connected to components of an associated cooling tower. The support members 2602 include a support member 2670 secured to a wall 2613 of the cooling tower. The support members 2602 further include a support member 2604 secured to a screen 2621 of the cooling tower.

Figure 27:
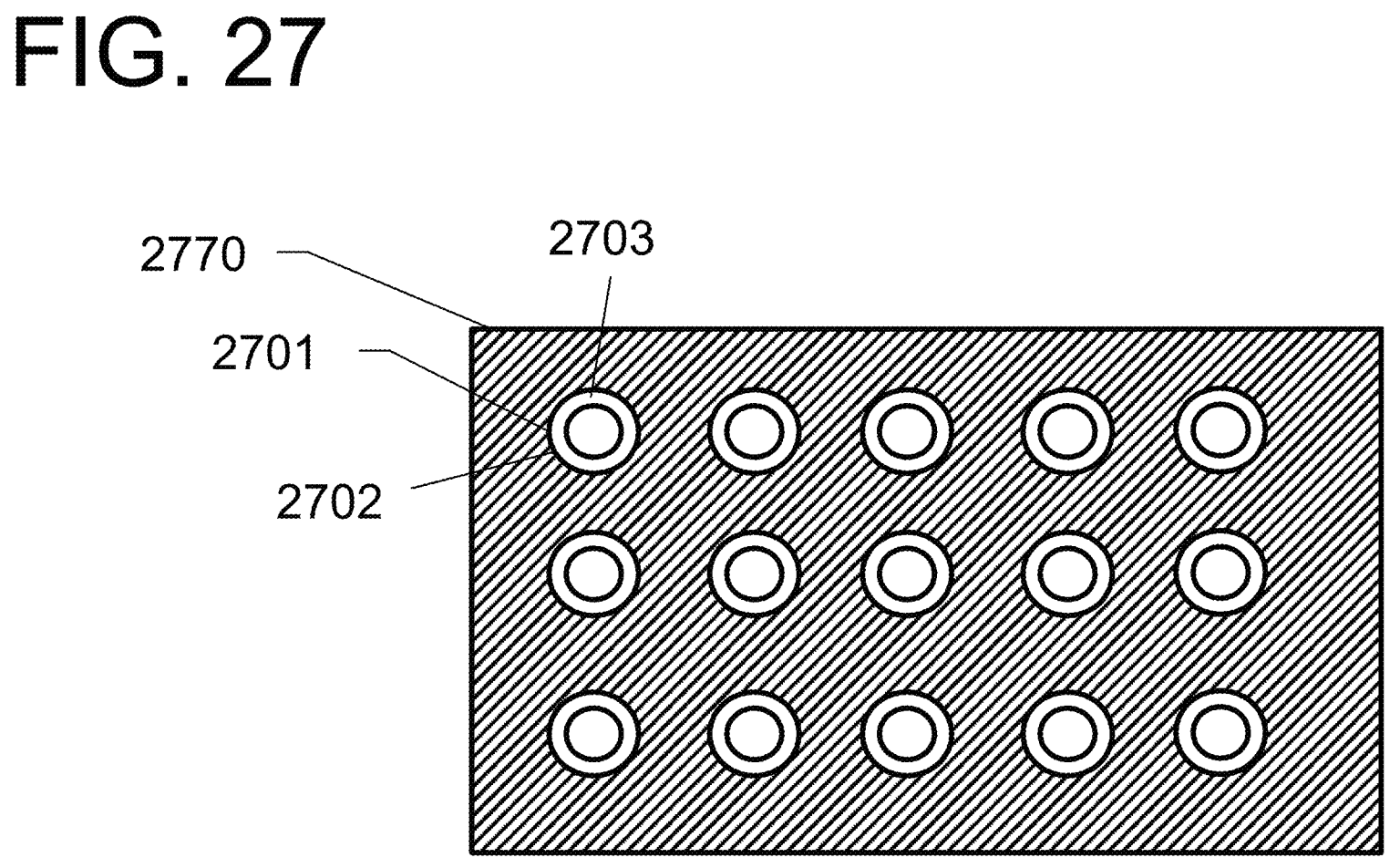
Figure 28:
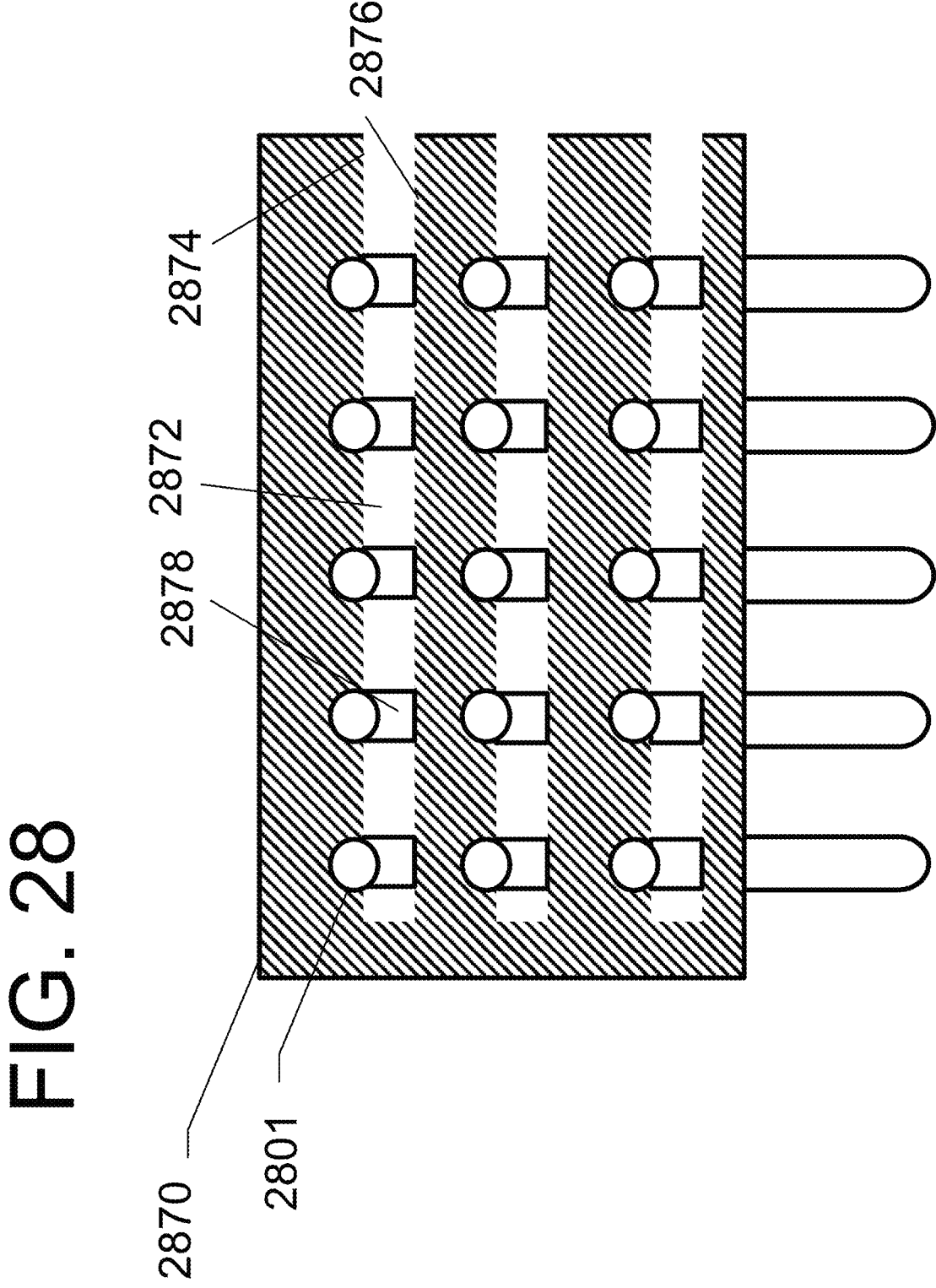
FIG. 28 is a cross-sectional, perspective view of a support plate of a tubular membrane heat exchanger module showing tubular membranes extending in slots of the support plate and side surfaces of the slots contacting the tubular membranes.

Various support plate configurations may be utilized to maintain the spacing and/or orientation of the tubular membranes. As some examples in this regard, the support plate 2770 of FIG. 27 has openings 2701 with annular surfaces 2702 that encircle tubular membranes 2703. Regarding FIG. 28, the support plate 2870 has slots 2872 with side surfaces 2874, 2876 that contact outer surfaces 2878 of the tubular membranes 2701 to resist movement of the tubular membranes 2701.

Figure 29:
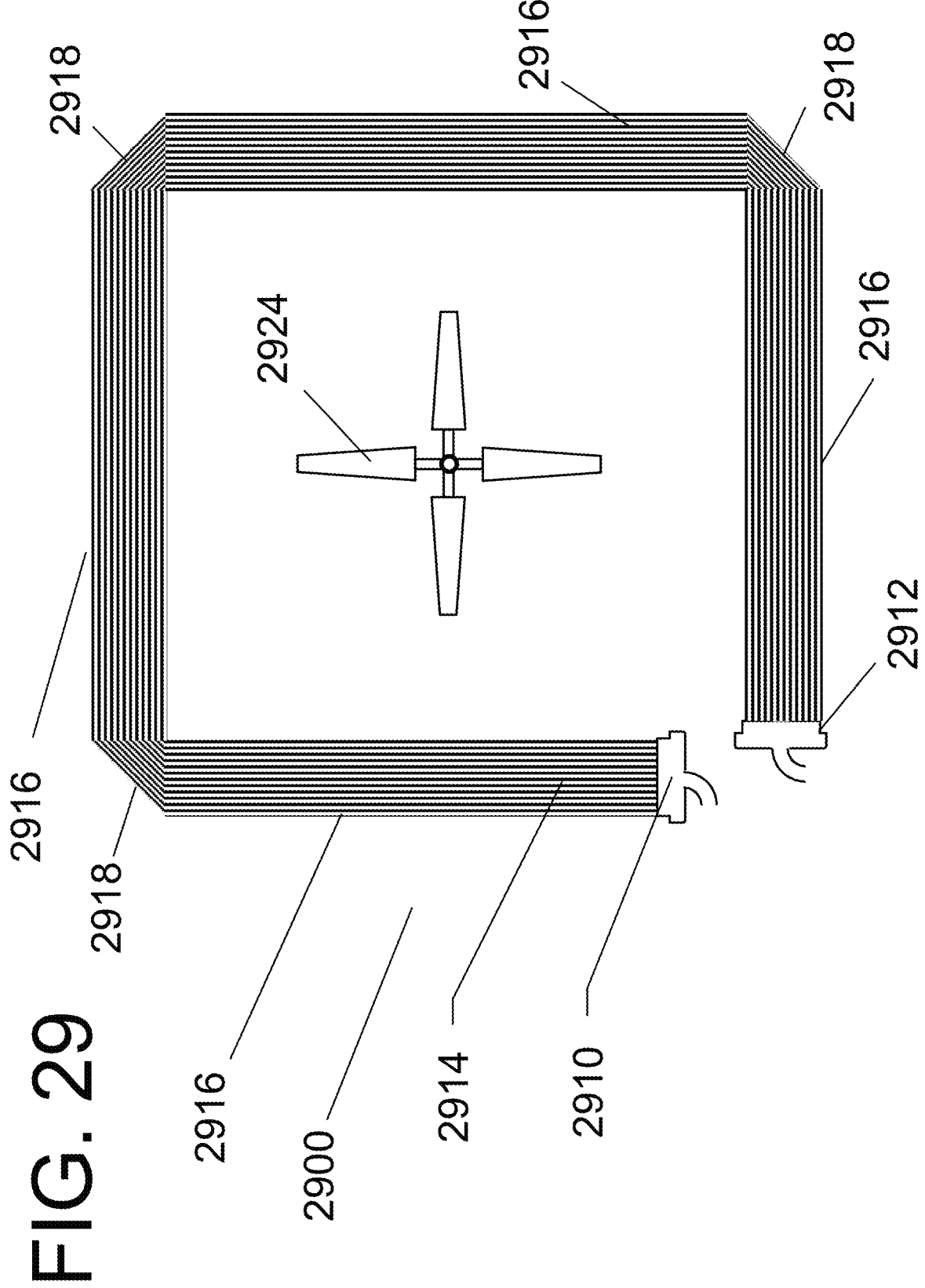
FIG. 29 is a schematic view of a tubular membrane heat exchanger module having tubular membranes extending in a tortious path about a fan, the tubular membranes having straight portions and bend portions.

Tubular membrane heat exchangers in accordance with the present disclosure may include tubular membranes having a non-linear path, such as a tortuous path, between inlet and outlet headers. Regarding FIG. 29, a tubular membrane heat exchanger 2900 is provided having an inlet header 2910, an outlet header 2912, and tubular membranes 2914 connected to the inlet and outlet headers 2910, 2912. The tubular membranes 2914 extend about an airflow generating device such as a fan 2924. The heat rejection apparatus including the tubular membrane heat exchanger 2900 may have an induced draft, cross flow configuration.

The tubular membranes 2914 have straight portions 2916 and bend portions 2918 connecting the straight portions 2916. The bend portions 2918 each redirect the process fluid flow at an angle from the direction of the process fluid entering the bend portion 2918, the angle being less than 120°, less than 110°, less than 100°, less than 95° such as 90°, or less than 90° as some examples.

In one embodiment, the bend portions 2918 each include a straight section and two junctures connecting the straight section to the adjacent straight portions 2916. In another embodiment, the bend portions 2918 are curved. The series of straight portions 2916 and bend portions 2918 form a tortuous path for the process fluid as the process fluid travels from the inlet header 2910 to the outlet header 2912.

Figure 30:
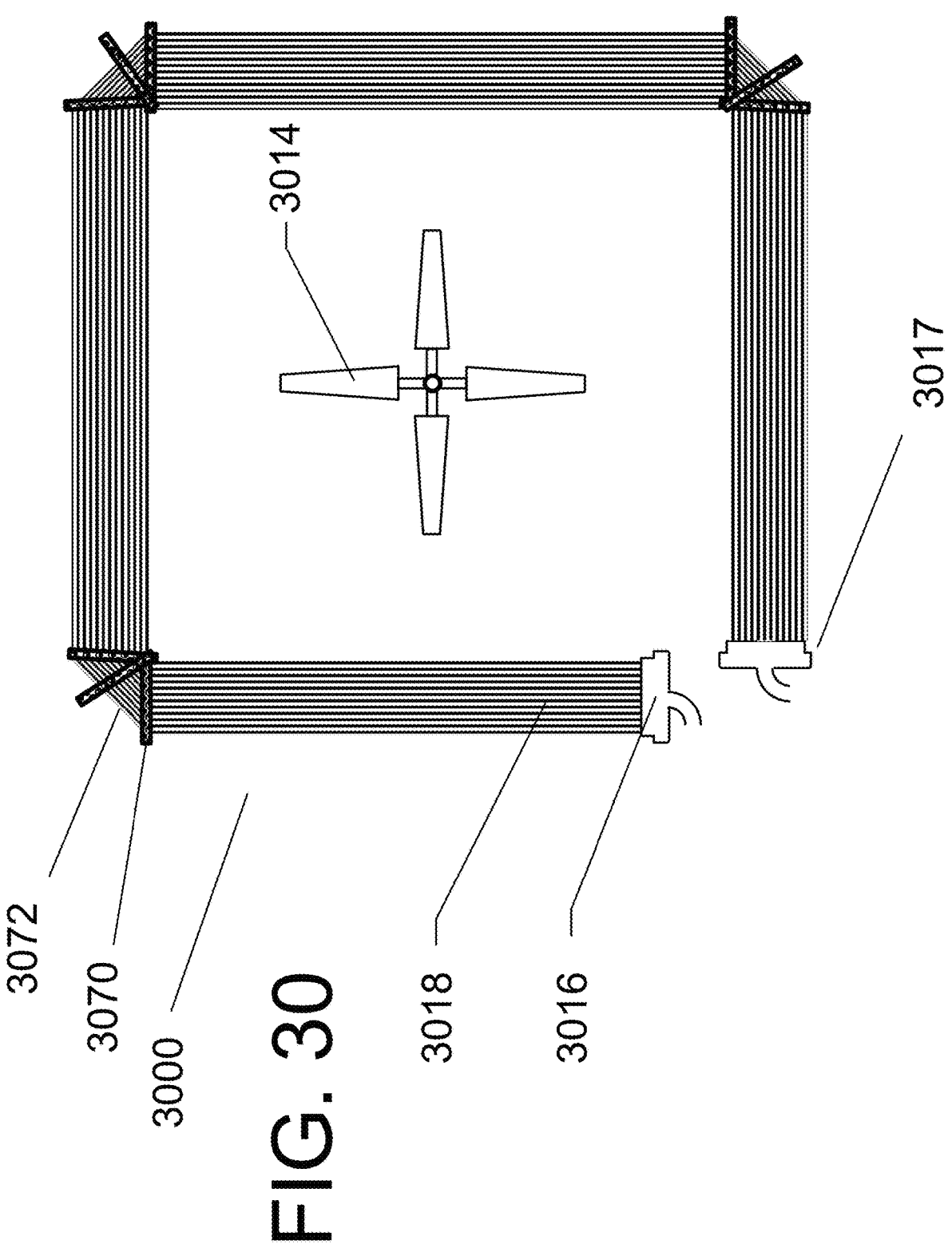
FIG. 30 is a schematic view of a tubular membrane heat exchanger module having supports that redirect tubular membranes of the module and form bends of the tubular membranes.

The tubular membranes may have a generally straight initial shape that is reconfigured via supports to provide a tortuous path for the process fluid. Regarding FIG. 30, tubular membrane heat exchanger 3000 has an inlet header 3016, an outlet header 3017, and tubular membranes 3018 extending about a fan 3014. The tubular membrane heat exchanger 3000 has supports, such as support plates 3070, that redirect the tubular membranes 3018 to form bends 3072. The support plates 3070 have through openings that receive the tubular membranes 3018 such that the tubular membranes 3018 extend normal to the support plates 3070. The support plates 3070 include surfaces extending around the through openings that contact and redirect the tubular membranes 3018 into the desired shape.

Figure 31:
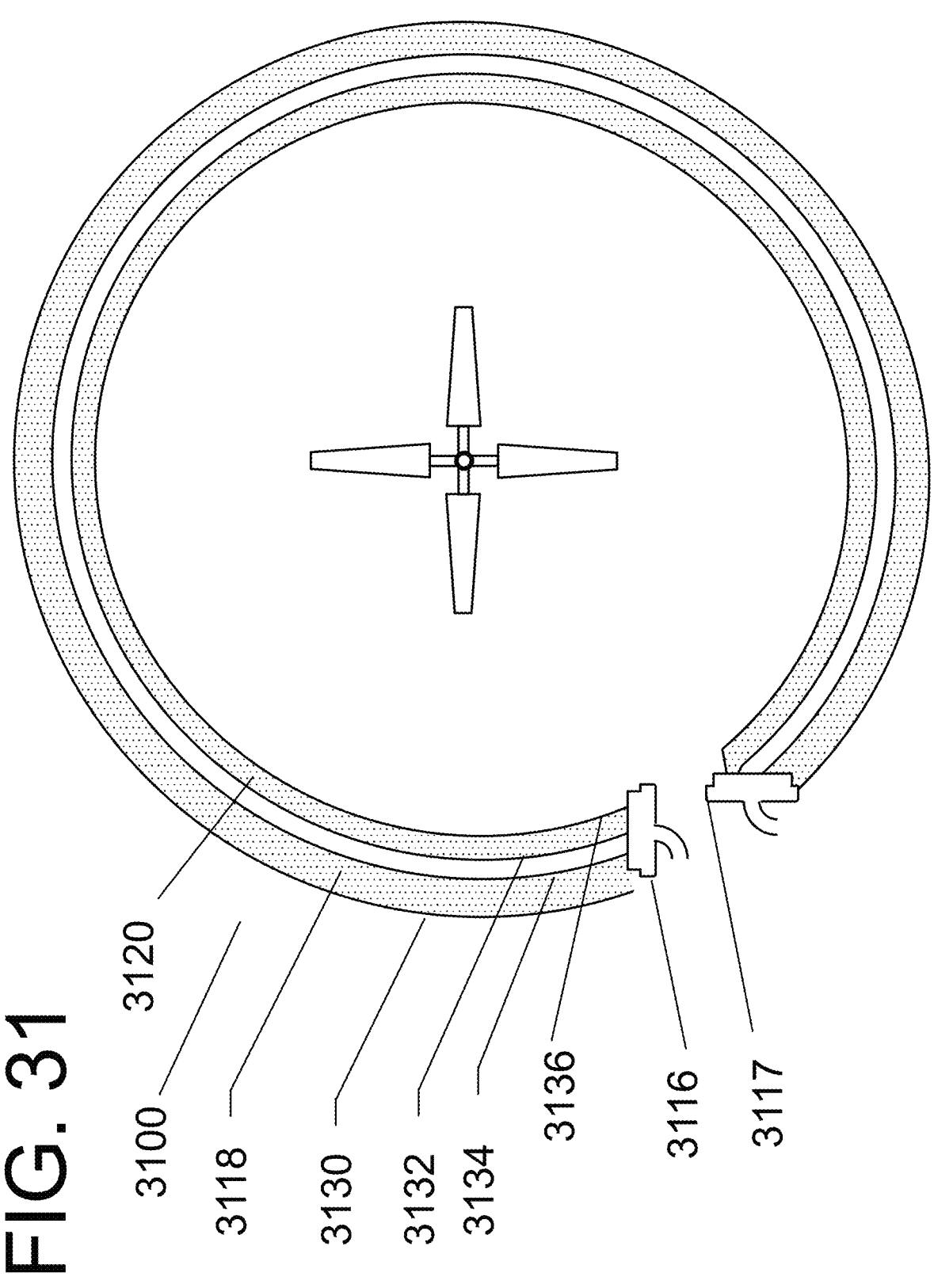
FIG. 31 is a schematic view of a tubular membrane heat exchanger module having tubular membranes with radially inner wall portions that are shorter than radially outer wall portions of the tubular membranes to provide an annular shape of the tubular membranes.

In some embodiments, the tubular membranes may have an inherent structural configuration that provides a non-linear flow path for the process fluid. Regarding FIG. 31, tubular membrane heat exchanger 3100 has an inlet header 3116, an outlet header 3117, and tubular membranes 3118, 3120. The tubular membranes 3118, 3120 have radially outer side portions 3130, 3132 that are longer than radially inner side portions 3134, 3136. The tubular membranes 3118, 3120 thereby have an annular shape without the annular shape being imparted to the tubular membranes 3118, 3120 by a support.

In some embodiments, a tubular membrane has geometry that causes the curvature of the tubular membrane to vary along its length. For example, a tubular membrane may have straight end portions and a curved intermediate portion connecting the straight end portions.

Various types of supports may be utilized to impart a desired shape to the tubular membranes. Regarding FIG. 32, tubular membrane heat exchanger 3200 has an inlet header 3216, an outlet header 3217, tubular membranes 3218, 3219, and an arcuate support such as a rod 3221. The rod 3221 keeps the tubular membranes 3128, 3219 from shifting out of the arcuate configuration of FIG. 32.

Figure 32:
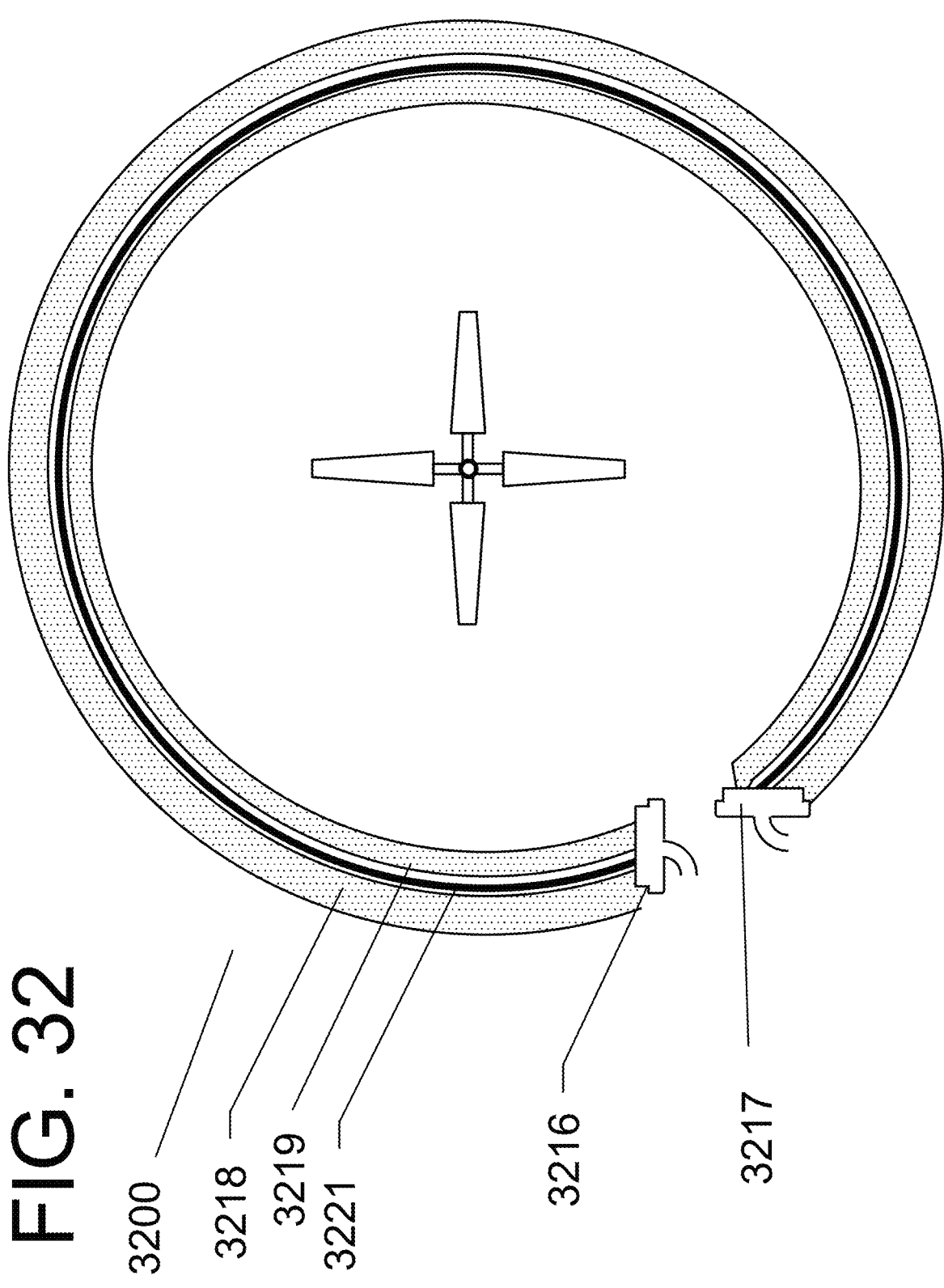
FIG. 32 is a schematic view of a tubular membrane heat exchanger module having an annular rod supporting tubular membranes in an annular configuration.

The support for one or more tubular membranes may be internal or external to the tubular membranes. The rod 3221 is shown in FIG. 32 as being external to the tubular membranes 3218, 3219, but may alternatively be provided inside of one or both of the tubular membranes 3218, 3219. Each support may take various shapes such as helixes, rings, plates, etc., as well as assemblies of shapes such as a rod that supports rings inside of a tubular membrane. As another example, a support may be a helical shape outside of the associated membrane tube (see, e.g., FIG. 16).

Figure 33:
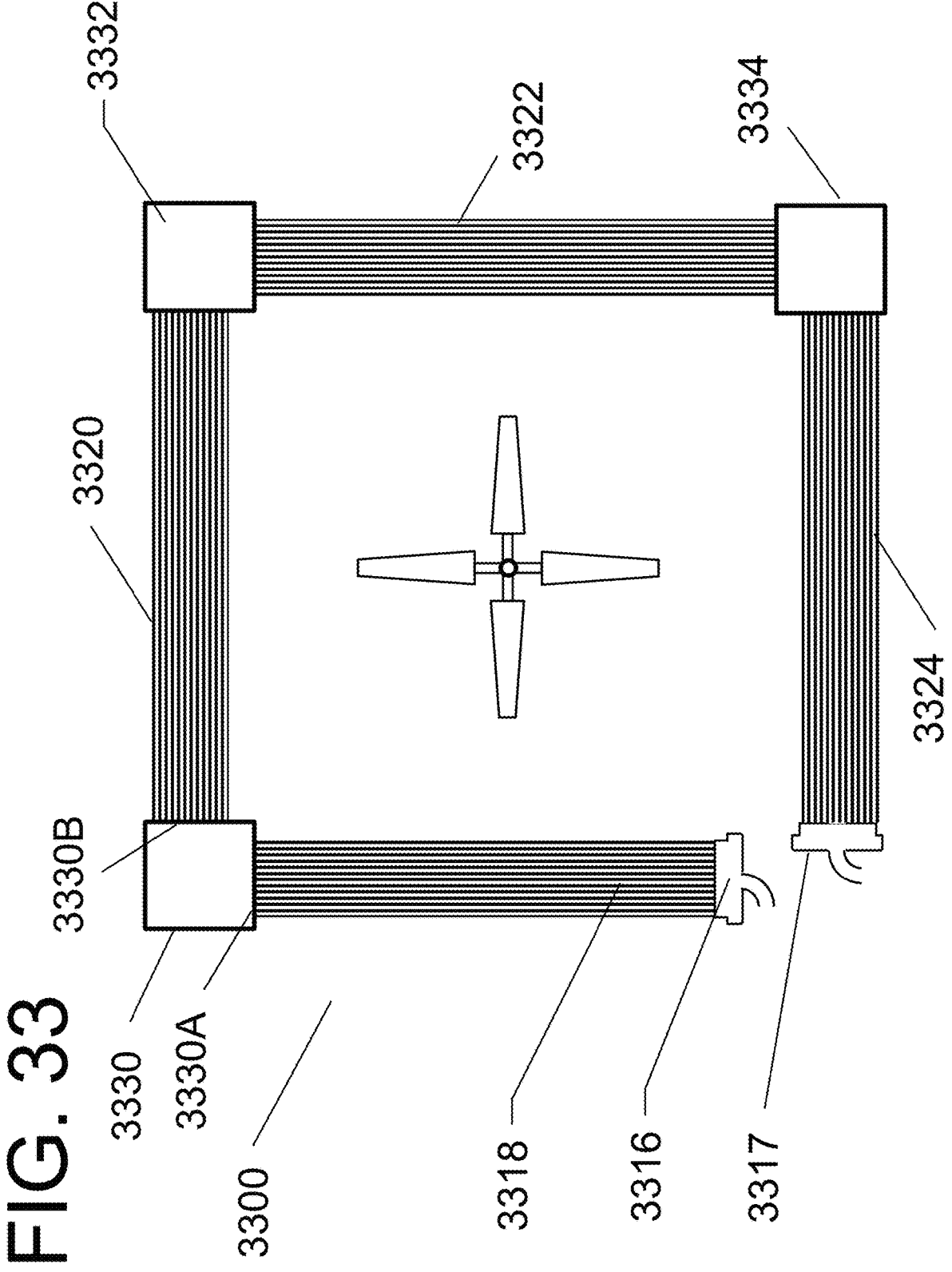
FIG. 33 is a schematic view of a tubular membrane heat exchanger having tubular membranes, an inlet header, an outlet header, and intermediate headers configured to redirect process fluid flow.

The headers used to connect tubular membranes may redirect working fluid flow to provide a tortuous path for the process fluid. Regarding FIG. 33, tubular membrane heat exchanger 3300 has a terminal inlet header such as inlet header 3316 and a terminal outlet header such as outlet header 3317. The tubular membrane heat exchanger 3300 includes groups of tubular membranes 3318, 3320, 3322, 3324 that direct process fluid between the inlet and outlet headers 3316, 3317. The tubular membrane heat exchanger 3300 further includes intermediate headers 3330, 3332, 3334 connecting the groups of tubular membranes 3318, 3320, 3322, 3324. The intermediate headers 3330, 3332, 3334 have inlet ports 3330A that receive working fluid from upstream tubular membranes in a first direction and outlet ports 3330B that redirect the working fluid to downstream tubular membranes in a second direction transverse to the first direction. In one embodiment, the intermediate headers 3330, 3332, 3334 are formed by connecting inlet and outlet headers associated with the adjacent groups of tubular membranes 3318, 3320, 3322, 3324 in a manner similar to embodiments discussed above, see, e.g., FIGS. 1D 10A, 11A, 12A, 13A.

The terminal headers and intermediate headers may be organized to provide a generally polygonal shape of tubular membranes having any number of sides with the terminal headers and intermediate headers being vertices of the desired polygonal shape. The polygonal shape may be regular or irregular. In some embodiments, the tubular membranes may have a linear or a non-linear shape extending between adjacent headers.

The heat exchangers discussed above may be utilized in various applications, such as cooling towers for building HVAC systems, cooling towers for industrial processes, ice thermal storage systems, and gas heat and/or mass transfer systems such as humidification and dehumidification applications. Another heat and/or mass transfer application is carbon dioxide capture.

Figure 34:
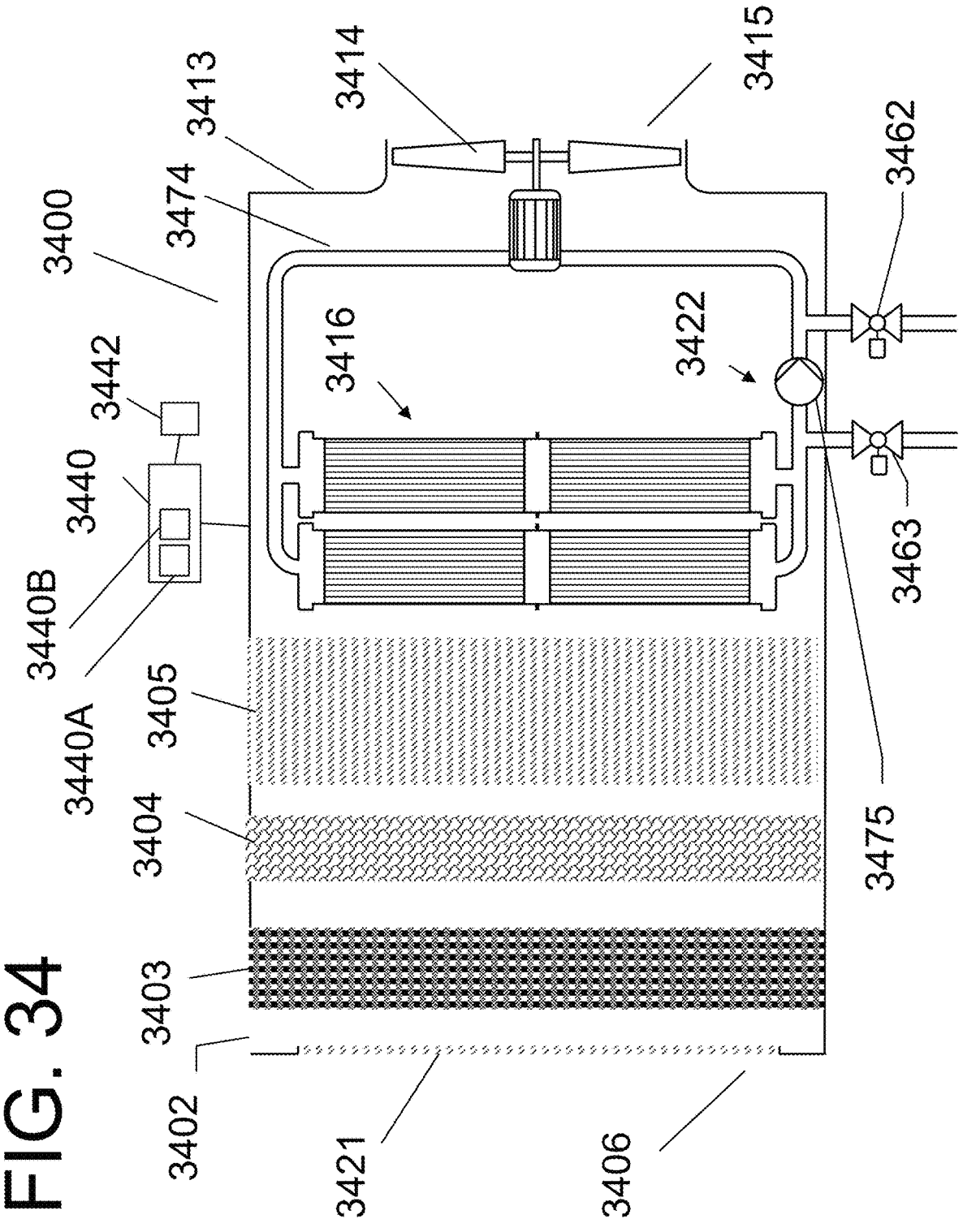
FIG. 34 is a schematic view of an air handling unit having tubular membrane heat exchanger modules.

For example, an air handling unit 3400 is provided in FIG. 34 that includes an outer structure 3413, tubular membrane heat exchanger modules 3416, tubing 3474, and an airflow generator such as a fan 3414. The air handling unit 3400 has a process fluid supply 3422 operable to provide different types of process fluid to the tubular membrane heat exchanger modules 3416. such as water process fluid and a liquid desiccant process fluid, depending on the mode of operation of the air handling unit 3400.

In one embodiment, the process fluid supply 3422 includes an inlet valve 3463, an outlet valve 3462, and a pump 3475 that are similar to the corresponding structures discussed above. The air handling unit 3400 further includes a supply air inlet 3406, a screen 3421, a return air inlet 3402, a mixing section 3403, an air filter 3404, an auxiliary heat exchanger 3405, and an outlet 3415.

The air handling unit 3400 has a controller 3440 operably coupled to components of the air handling unit 3400 to operate the air handling unit 3400. The controller 3440 includes a processor 3440A and communication circuitry 3440B to communicate with a remote computing device, such as a master controller of an HVAC system, a server computer, and/or a portable electronic device such as a smartphone via one or more networks such as the internet.

In some embodiments, the outlet 3415 may be connected via a duct to the return air inlet 3402. The air handling unit 3400 may selectively direct all or a portion of the air traveling through the outlet 3415 back toward the return air inlet 3402. The mixing section 3403 facilitates mixing of the air from the supply air inlet 3406 and the return air inlet 3402. The air filter 3404 may include one or more filters that filter contaminants from the air. The auxiliary heat exchanger 3405 may be, for example, an air-to-air heat exchanger, a water-to-air heat exchanger, an evaporator or condenser coil, a dry coil, or a resistive heating element, which removes heat from or transfers heat to the air traveling through the air handling unit 3400.

The tubular membrane heat exchanger modules 3416 are configured to interact with the air according to a particular mode of the controller 3440. For example, the tubular membrane heat exchanger modules 3416 may perform at least one of increasing the temperature of the air in the air handling unit 3400, decreasing the temperature of the air in the air handling unit 3400, removing humidity from the air in the air handling unit 3400, and adding humidity to the air in the air handling unit 3400.

The controller 3440 may operate the air handling unit 3400 in various modes according to one or more parameters detected by a sensor 3442. The one or more parameters may include, for example, operating parameters of the air handling unit 3400 (such as process fluid temperature, water flow rate), environmental parameters (e.g., temperature, humidity, time of day, and/or geographic location of the air handling unit 3400 as some examples), and/or a process fluid set point requested by a HVAC system controller. Alternatively or additionally, the controller 3440 may operate the air handling unit 3400 in a mode pursuant to a command received at the communication circuitry 3440B from a remote computing device.

For example, the controller 3440 may reconfigure the air handling unit 3400 to operate in a humidification mode, a swamp cooler mode, or a desiccation mode. In the swamp cooler mode, the tubular membrane heat exchanger modules 3416 utilizes water as a process fluid and operates to reduce the temperature and increase the humidity of the air in the air handling unit 3400.

In the desiccation mode, the tubular membrane heat exchanger modules 3416 utilize a liquid desiccant as the process fluid and operate to remove humidity from the air within the air handling unit 3400. The sorption of humidity in the liquid desiccant may be an exothermic process that increases the temperature of the air.

In the humidification mode, the tubular membrane heat exchanger modules 3416 utilize heated water as a process fluid and increase the humidity of the air in the air handling unit 3400. The tubular membrane heat exchanger modules 3416 compensate for process fluid temperature decrease by using heated water.

Various types of process fluid may be utilized with the air handling unit 3400. For the humidification mode, the process fluid may be water (e.g., tap water, grey water, deionized water, and/or reverse osmosis water) or a mixture of water and another fluid (e.g., a fluid that changes the freezing point of the process fluid, such as glycol or alcohol).

For the dehumidification mode, the process fluid may be a liquid desiccant such as an aqueous solution of a highly hygroscopic salt such as lithium chloride, calcium chloride, or lithium bromide or one of these salts dissolved in a non-water solvent. In other embodiments, the dehumidifying process fluid may be an alcohol or another hydroscopic liquid such as glycerin, concentrated sulfuric acid, hydrazine hydrate, ethanolamine, and/or glycerol. The use of some of the foregoing process fluids are unique to a tubular membrane heat exchanger. For example, alcohol could not traditionally be used because alcohol evaporates as it is hydrated. With a tubular membrane that is selectively permeable to water, the liquid desiccant containing alcohol could not evaporate but the liquid desiccant may hydrate.

The controller 3440 operates the inlet valve 3463 and outlet valve 3462 to change the mode of the air handling unit 3400 by draining the current process fluid, such as water or liquid desiccant, from tubing 3474 and filling the tubing 3474 with another process fluid, such as the other of the water and liquid desiccant. In some embodiments, the controller 3440 operates the pump 3475 to fill the tubing 3474 with the desired process fluid.

In one embodiment, the inlet valve 3463 is configured to switch between different process fluid supplies. For example, the inlet valve 3463 may be a three-position valve. In the first position, the inlet valve 3464 is closed. The controller 3440 switches the inlet valve 3463 to the second position when the controller 3440 is in the swamp cooler mode or the humidification mode. In the second position, the inlet valve 3463 permits makeup water to flow into the air handling unit 3400. In the humidification mode, the controller 3440 energizes a heater to heat the makeup water.

The controller 3440 switches the inlet valve 3463 to the third position when the controller 3440 is in the desiccant mode. When the inlet valve 3463 is in the third position, the inlet valve 3463 is in communication with a liquid desiccant regeneration system that removes water from the liquid desiccant. In sum, the inlet valve 3463 may switch between two fluid loops depending on the mode of the controller 3440.

Figure 35:
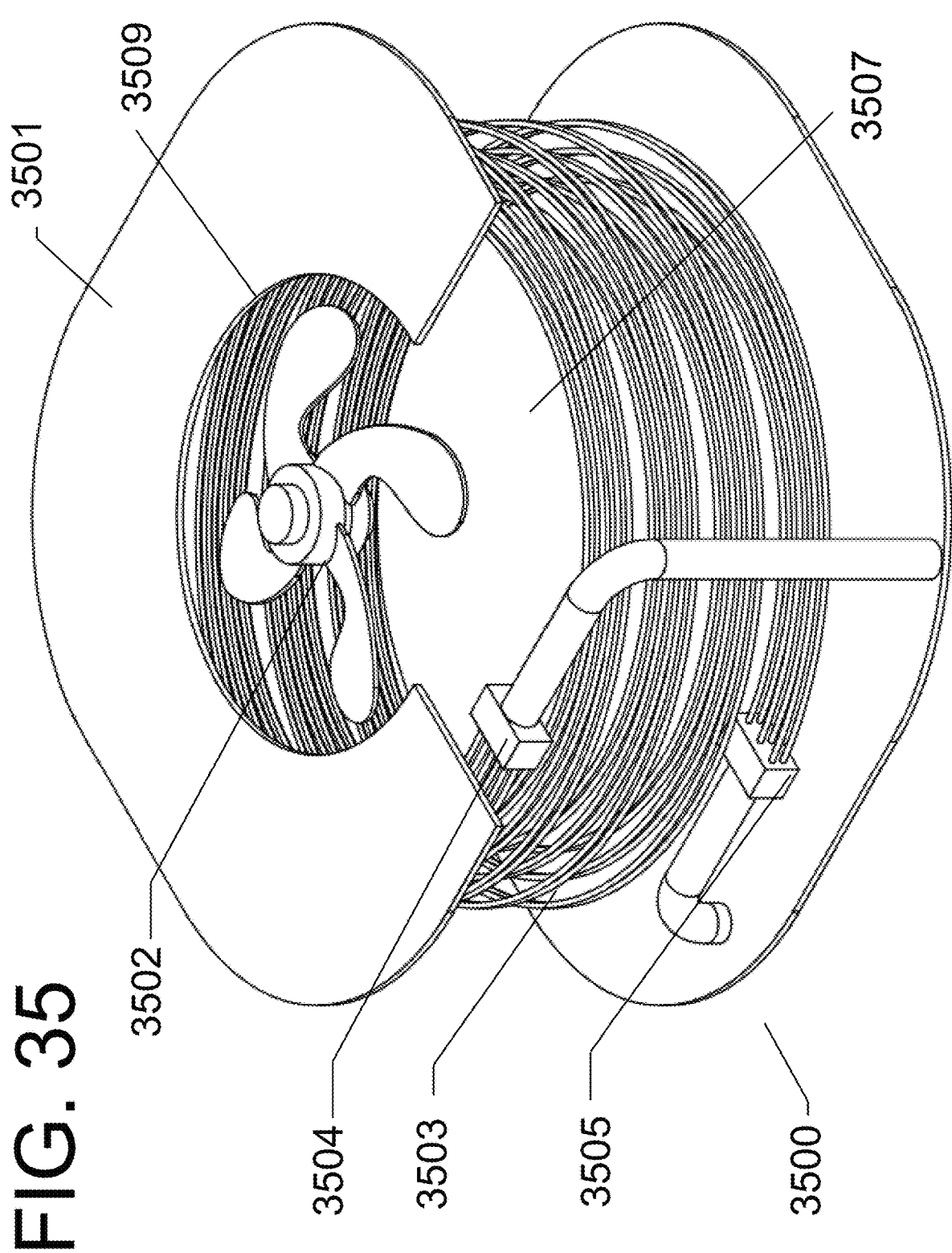
FIG. 35 is a schematic view of a tubular membrane assembly having helical tubular membranes.

Regarding FIG. 35, a tubular membrane heat exchanger 3500 is provided having a support frame 3501 with a portion removed in the figure for illustrative purposes. The tubular membrane heat exchanger 3500 has a fan 3502, an outlet header 3504, an inlet header 3505, and tubular membranes 3503. The tubular membranes 3503 are helical and extend about a plenum or central space 3507. The fan 3502 is operable to direct air across the tubular membranes 3503 and into the central space 3507 before the fan 3502 directs the air through outlet 3509.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A membrane tube heat exchanger module comprising:

an inlet header having an inlet body with an inlet recess to receive a first fluid, the inlet body having an inlet body wall portion and at least one wall portion extending upstream from the inlet body wall portion that define at least a portion of the inlet recess, the inlet body having an inlet opening opposite the inlet body wall portion that opens to the inlet recess;

an outlet header having an outlet body with an outlet recess to receive the first fluid, the outlet body having an outlet body wall portion and at least one side wall portion extending downstream from the outlet body wall portion that define at least a portion of the outlet recess, the outlet body having an outlet opening opposite the outlet body wall portion that opens to the outlet recess;

openings of the inlet body wall portion and the outlet body wall portion;

membrane tubes connecting the openings of the inlet body wall portion and the outlet body wall portion, the membrane tubes facilitating flow of the first fluid from the inlet recess of the inlet header to the outlet recess of the outlet header;

the inlet body configured to direct all of the first fluid received at the inlet opening downstream toward the inlet body wall portion and into the membrane tubes;

the outlet body configured to direct all of the first fluid received at the outlet recess from the membrane tubes downstream toward the outlet opening;

the membrane tubes permitting mass transfer between the first fluid in the membrane tubes and a second fluid contacting outer surfaces of the membranes tubes; and the membrane tubes are permeable to water vapor and are impermeable to liquid water.

2. A membrane tube heat exchanger module comprising:

an inlet header having an inlet body with an inlet recess to receive a first fluid, the inlet body having an inlet body wall portion and at least one wall portion extending upstream from the inlet body wall portion that define at least a portion of the inlet recess, the inlet body having an inlet opening opposite the inlet body wall portion that opens to the inlet recess;

an outlet header having an outlet body with an outlet recess to receive the first fluid, the outlet body having an outlet body wall portion and at least one side wall portion extending downstream from the outlet body wall portion that define at least a portion of the outlet recess, the outlet body having an outlet opening opposite the outlet body wall portion that opens to the outlet recess;

openings of the inlet body wall portion and the outlet body wall portion;

membrane tubes connecting the openings of the inlet body wall portion and the outlet body wall portion, the membrane tubes facilitating flow of the first fluid from the inlet recess of the inlet header to the outlet recess of the outlet header;

the inlet body configured to direct all of the first fluid received at the inlet opening downstream toward the inlet body wall portion and into the membrane tubes;

the outlet body configured to direct all of the first fluid received at the outlet recess from the membrane tubes downstream toward the outlet opening; and the membrane tubes permitting mass transfer between the first fluid in the membrane tubes and a second fluid contacting outer surfaces of the membranes tubes;

wherein the inlet body includes a flange extending about the inlet opening for connecting to an adjacent upstream membrane tube heat exchanger module.

3. A membrane tube heat exchanger module of claim 1 comprising:

an inlet header having an inlet body with an inlet recess to receive a first fluid, the inlet body having an inlet body wall portion and at least one wall portion extending upstream from the inlet body wall portion that define at least a portion of the inlet recess, the inlet body having an inlet opening opposite the inlet body wall portion that opens to the inlet recess;

an outlet header having an outlet body with an outlet recess to receive the first fluid, the outlet body having an outlet body wall portion and at least one side wall portion extending downstream from the outlet body wall portion that define at least a portion of the outlet recess, the outlet body having an outlet opening opposite the outlet body wall portion that opens to the outlet recess;

openings of the inlet body wall portion and the outlet body wall portion;

membrane tubes connecting the openings of the inlet body wall portion and the outlet body wall portion, the membrane tubes facilitating flow of the first fluid from the inlet recess of the inlet header to the outlet recess of the outlet header;

the inlet body configured to direct all of the first fluid received at the inlet opening downstream toward the inlet body wall portion and into the membrane tubes;

the outlet body configured to direct all of the first fluid received at the outlet recess from the membrane tubes downstream toward the outlet opening; and the membrane tubes permitting mass transfer between the first fluid in the membrane tubes and a second fluid contacting outer surfaces of the membranes tubes;

wherein the outlet body includes a flange extending about the outlet opening for connecting to an adjacent downstream membrane tube heat exchanger module.

4. The membrane tube heat exchanger module of claim 1 wherein the inlet header and the outlet header include connecting portions configured to form snap-fit connections with adjacent upstream and downstream membrane tube heat exchanger modules.

5. The membrane tube heat exchanger module of claim 1 wherein the inlet header and the outlet header include a projection and a recess configured to engage a corresponding recess and projection of adjacent upstream and downstream membrane tube heat exchanger modules.

6. The membrane tube heat exchanger module of claim 1 wherein the inlet header and the outlet header have identical connecting portions configured to be connected to adjacent tubular membrane heat exchanger modules.

7. The membrane tube heat exchanger module of claim 1 wherein the inlet body wall portion includes an inlet plate;

wherein the outlet body wall portion includes an outlet plate; and wherein the inlet and outlet plates include the openings therein.

8. The membrane tube heat exchanger module of claim 1 wherein the inlet and outlet headers each include at least one of:

a snap-fit member;

a snap-fit member receiving recess;

a flange; and a fastener.

9. The membrane tube heat exchanger module of claim 1 wherein at least one of the membrane tubes each have a lumen to receive the first fluid and a pressure vessel in the lumen to receive a secondary fluid.

10. The membrane tube heat exchanger module of claim 1 wherein at least one of the membrane tubes has a lumen to receive the first fluid, a side wall extending about the lumen, and a support in the lumen to resist deformation of the side wall.

11. The membrane tube heat exchanger module of claim 1 wherein the membrane tubes have side walls with openings having diameters in a range of 1 nanometer to 20 nanometers.

12. The membrane tube heat exchanger module of claim 1 wherein the inlet header includes potting securing the membrane tubes to the inlet body and wherein the outlet header includes potting securing the membrane tubes to the outlet body of the outlet header.

13. The membrane tube heat exchanger module of claim 1 wherein the inlet and outlet headers include:

fittings connecting the membrane tubes to the inlet and outlet bodies; and potting securing the membrane tubes, fittings, and inlet and outlet bodies.

14. The membrane tube heat exchanger module of claim 1 wherein the membrane tubes include at least one of:

polypropylene;

polydimethylsiloxane;

polytetrafluoroethylene;

hydrophobic polysulfone; and graphene oxide.

15. The membrane tube heat exchanger module of claim 1 wherein the membrane tubes are gas-permeable and liquid-impermeable.

16. The membrane tube heat exchanger module of claim 1 further comprising a screen to protect the membrane tubes.

17. The membrane tube heat exchanger module of claim 1 further comprising a support maintaining spacings between the membrane tubes.

* * * * *